(12) United States Patent
Ahmed et al.

(10) Patent No.: US 7,685,605 B1
(45) Date of Patent: *Mar. 23, 2010

(54) DISTRIBUTED FRAMEWORK FOR INTERTASK COMMUNICATION BETWEEN WORKSTATION APPLICATIONS

(75) Inventors: Shamim Ahmed, Cedar Park, TX (US); Serge J. Dacic, Austin, TX (US)

(73) Assignee: Schlumberger Technology Corporation, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/250,027

(22) Filed: Feb. 11, 1999

Related U.S. Application Data

(60) Provisional application No. 60/023,945, filed on Aug. 19, 1996.

(51) Int. Cl.
G06F 9/44 (2006.01)
G06F 15/16 (2006.01)
(52) U.S. Cl. .................. 719/318; 719/313; 709/203
(58) Field of Classification Search .......... 709/310.332, 709/200, 203, 202; 719/310, 313, 316, 318
See application file for complete search history.

(56) References Cited

U.S. PATENT DOCUMENTS

| | | | | |
|---|---|---|---|---|
| 5,214,756 A | * | 5/1993 | Franklin et al. | 345/839 |
| 5,566,330 A | * | 10/1996 | Sheffield | 707/4 |
| 5,581,684 A | * | 12/1996 | Dudzik et al. | 345/708 |
| 5,606,699 A | * | 2/1997 | De Pauw et al. | 719/315 |
| 5,634,010 A | * | 5/1997 | Ciscon et al. | 709/223 |
| 6,073,139 A | * | 6/2000 | Jain et al. | 707/203 |
| 6,256,678 B1 | * | 7/2001 | Traughber et al. | 709/310 |
| 6,532,498 B1 | * | 3/2003 | Hager et al. | 719/318 |
| 6,647,432 B1 | * | 11/2003 | Ahmed et al. | 719/318 |

\* cited by examiner

Primary Examiner—Van H Nguyen

(57) ABSTRACT

In a workstation environment, several applications operate concurrently and it is desirable to communicate between applications. The present invention provides an apparatus for communicating between applications by using an extensible communication protocol with a graphical user interface. The user transmits an interest object associated with an event from a second application to a server, which forwards the interest object to a first application. When the first application practices the event, information concerning the practice of the event is transmitted from the first application to the second application without going through the server.

9 Claims, 24 Drawing Sheets

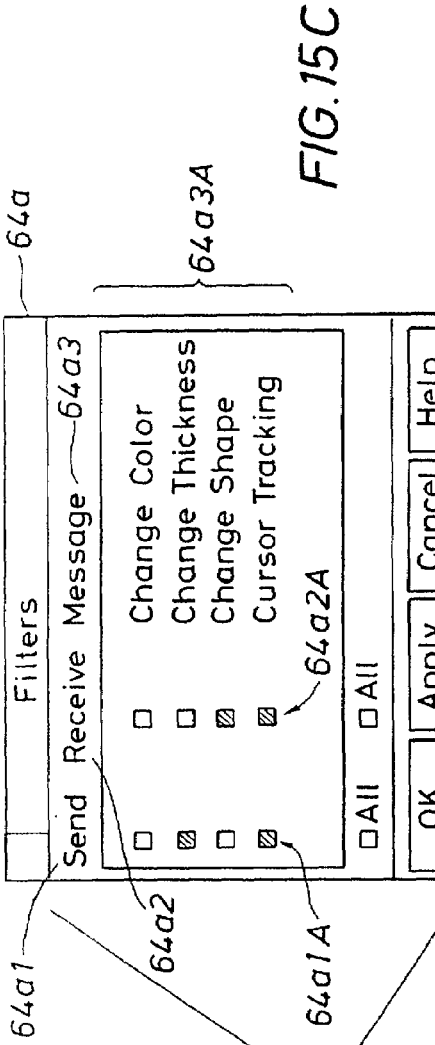
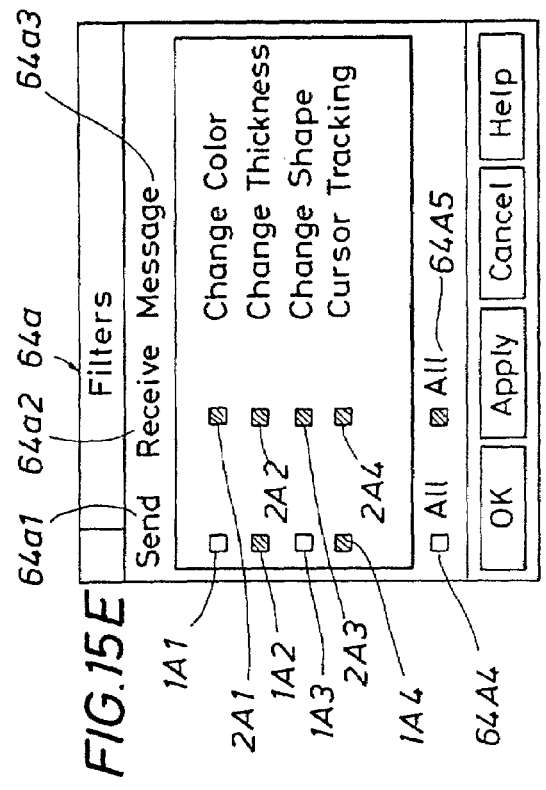
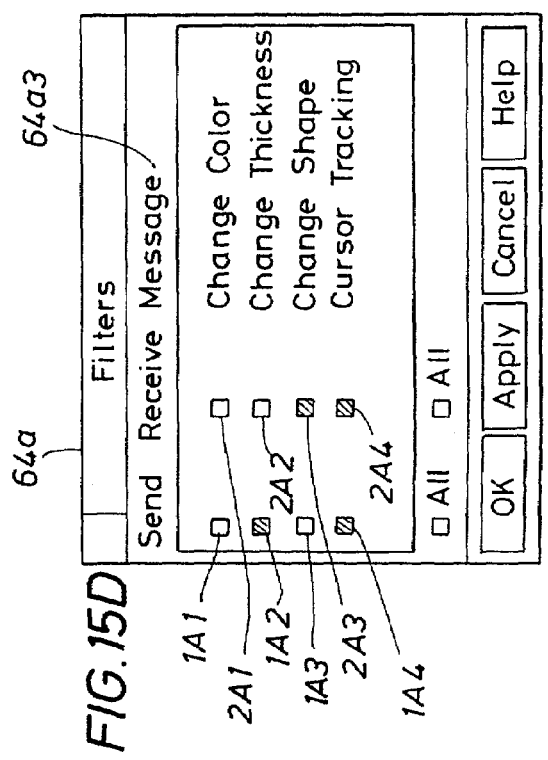

FIG. 17

Array Selection

Query from: Well Sketch [M2752679]

Array Code: C*

Arrays:

| Code | Modifier | Start | Stop | Service Run | Description |
|------|----------|-------|------|-------------|-------------|
| CALI | DITE | 3949.5 ft | 3900 ft | DITE__.011 | Caliper |
| CCSW | DITE | 3949.5 ft | 3900 ft | DITE__.011 | Composite CCS/CTS Telemetr. |
| CFTC | DITE | 3949.5 ft | 3900 ft | DITE__.011 | Corrected Far Thermal Counts |
| CILD | DITE | 3949.5 ft | 3900 ft | DITE__.011 | Calibrated Induction Deep... |
| CILM | DITE | 3949.5 ft | 3900 ft | DITE__.011 | Calibrated Induction Mediu... |
| CNTC | DITE | 3949.5 ft | 3900 ft | DITE__.011 | Corrected Near Thermal Counts |
| CS | DITE | 3949.5 ft | 3900 ft | DITE__.011 | Cable Speed |
| CSFA | DITE | 3949.5 ft | 3900 ft | DITE__.011 | SFL Conductivity (Averaged) |
| CSFL | DITE | 3949.5 ft | 3900 ft | DITE__.011 | SFL Conductivity |

Selection: [CILM.DITE__.011.DITE [A2468008]]

OK    Cancel    Help

Open/Close ITC Connection

FIG. 21

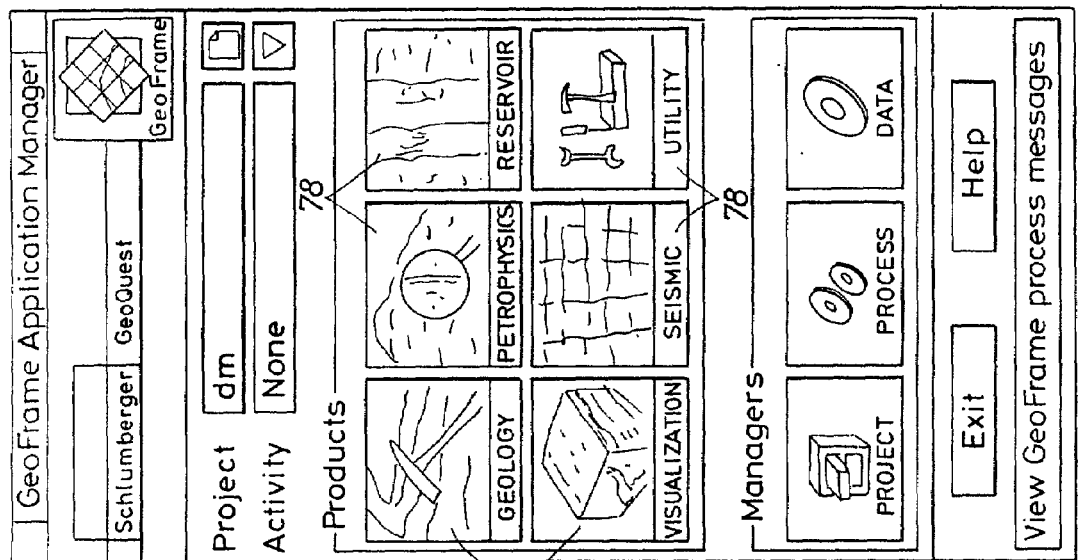

FIG.27

```
#include <wk_itc_hi/itc_hi_public.h>
#include <wk_itc_hi/itc_hi_synonym.h>
#include <wk_itc_data/itc_diselection.h>
...
void
udm_SingleDIEditor::PopulateEventList(void)
{
    itc_hi_EventInfo_t Event;

/* Initialize the filter info list */
    Event =
(itc_hi_EventInfo_t)utl_CallocBlock(sizeof(itc_hi_EventInfo_st));

Event->EventToken      = qITC_DISELECTION;
    Event->EventHIName     = qDISELECTION;
    Event->SendToggleState = ITC_ON;
    Event->ReceiveToggleState= ITC_ON;
    Event->ReceiveEventCB  = ReceiveDISelection_cb;
    Event->ReceiveEventCBData= (vt_Datum_t) this;

EventList = (itc_hi_EventInfoL_t)vt_CreateList(vt_DatumL_vt, 1);
        vt_AddToList((itc_hi_EventInfoL_t)EventList, (vt_Datum_t)Event);
} void
udm_SingleDIEditor::SetupITC(void)
{
    itc_Status_t MyStat;

...
    //Populate the eventlist
    PopulateEventList();

//Set ITC HI for this SubModule Run
    ITCBanner   = itc_hi_FilterAndSession(
                            SubModuleRun,
                            ITCForm,
                            OneLineHelp,
                            EventList,
                            ITC_CLOSED,
                            BroadcastDISelection_cb,
                            (XtPointer) this,
                            &MyStat);

...
    //Free Event List and elements itc_hi_EventInfo_t Event = (itc_hi_EventInfo_t) vt_Nth(EventList, 0);
    if(Event)
        utl_FreeBlock(Event);
    vt_DeleteList(EventList);
    EventList = NULL;
    ....
```

32a points to the "Initialize the filter info list" section.

FIG.28

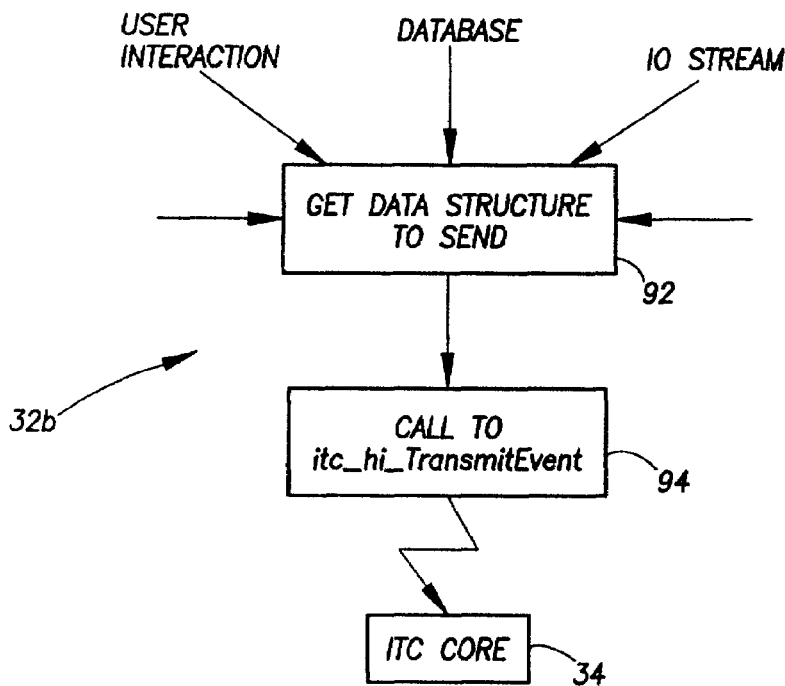

FIG.29

```
#include <wk_itc_hi/itc_hi_public.h>
...
void
udm_ObjectListInfo::SendSubDI(void)
{
    itc_Status_t ITCStat;
    aqi_DataItemL_t DIsToSend = GetSelection();
    itc_hi_t Banner = NULL;

if (!DIsToSend)
        DIsToSend = (aqi_DataItemL_t)vt_CreateList(vt_DatumL_vt, 2);
    DIsToSend = (aqi_DataItemL_t)vt_AddToList((vt_DatumL_t)DIsToSend,
                                    (vt_Datum_t)DataItem);

Banner = Manager->GetITCBanner();

if (Banner && DISToSend)
    {
        itc_hi_TransmitEvent(
                    Banner,
                    EventHIName,
                    (vt_Datum_t)DIsToSend,
                    &ITCStat);
        vt_DeleteList(DISToSend);
    }
}
```

FIG. 30

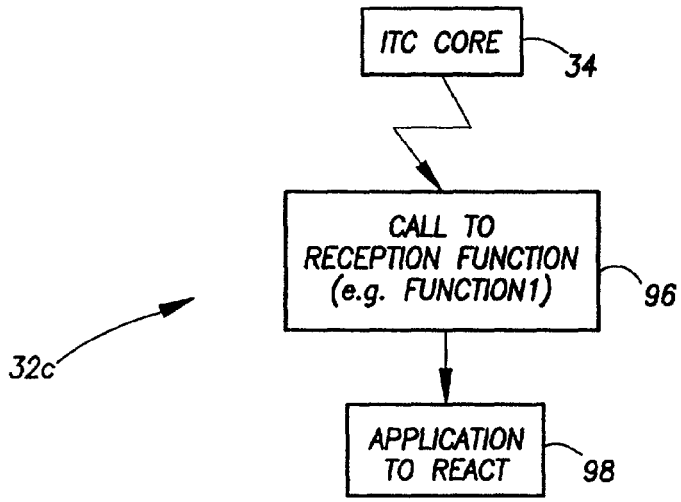

FIG. 31

```
void
udm_WellDataManager::CheckAndReact (aqi_Data_ItemL_t SelectDataItems)
{
    Int32_t Count = vt_LengthList(SelectedDataItems);
    for(int i = 0; i < Count; i++)
    {
        aqi_DataItem_t DI = (aqi_DataItem_t)vt_Nth(SelectedDataItems, i);
        DIType = gdm_GetDIType(DI);

// I do nothing if I receive "myself"
        if(DI != DataItem)
        {
            if(DIType == qWell)
            {
                SwitchDataItem(DI);
                break;
            }
            if(DIType == qBorehole)
            {
                vt_DatumL_t ObjList = GetSubList();
                if(ObjList)
                {
                    Int32_t Count2 = vt_LengthList(ObjList);
                    for(int j = 0; j < Count2; j++)
                    {
                        udm_OjectListInfo *Elt =
                            (udm_ObjectListInfo*)vt_Nth(ObjList, j);
                        Elt->Select(DI);
                    }
                }
                break;
            }
        }
    }
}
```

DISTRIBUTED FRAMEWORK FOR INTERTASK COMMUNICATION BETWEEN WORKSTATION APPLICATIONS

CROSS REFERENCE TO RELATED APPLICATIONS

This specification was filed under 35 USC 119(e) (1) within one year following the filing of a corresponding Provisional Application Ser. No. 60/023,945, filed Aug. 19, 1996, and entitled "A Distributed Framework for Inter-Process Communication Between Workstation Applications".

BACKGROUND OF THE INVENTION

The subject matter of the present invention relates to a method and apparatus for providing direct inter-process communications between computer program applications executing in computer workstations that provide a window display interface to an operator, and, more particularly, to an intertask communication framework and associated human interface method and apparatus, disposed in association with each of a plurality of client applications executing in a plurality of workstations, for transmitting an event between two or more computer program applications executing in one or more of the workstations without requiring the transmitted event to pass through an intervening server or dispatcher program executing in one of the workstations.

Computer programs that operate with a network often have multiple programs operating concurrently. It is frequently necessary for information, such as events, to be transferred from one program to another, either within a single workstation or across a network of interconnected computer workstations. An operator at one of the workstations may process information by using different programs operating concurrently in the workstation or across the network of workstations. The operator may also retrieve information by using a multiple number of computer programs executing concurrently in the single workstation or across the network of interconnected workstations. It is therefore important that information be quickly and easily transferred between the multiple number of programs operating in the one or more interconnected workstations.

Windowing software technology is applied where it is important for an operator to display and interact with multiple programs executing concurrently in a computer system comprising one or more interconnected workstations. A "window" is defined to be a portion of a display screen, such as a cathode ray tube (CRT). The window covers less than the entirety of the screen. As a result, there may be a multiple number of windows on the screen at one time. Typically, the user moves a cursor around the screen by use of an input device known as a mouse or by use of multiple keys on a keyboard. The cursor can be moved from one window to another on the screen, and, when the cursor is present within a particular window on the screen, the user/operator is placed in communication with the application program which generated that particular window on the screen. As a result, the operator may access a multiple number of different application programs thereby accomplishing multiple tasks without having to load a new program each time a new task must be performed.

However, when concurrently accessing a multiple number of different application programs executing in a workstation or across a network of workstations, is is often necessary for a user/operator to transfer information from one windowed program executing in a first workstation to another windowed program executing in either the first workstation or in a second, different workstation connected to the first workstation across the network. Transferring information between programs operating in a windowing environment is disclosed in the preferred embodiment of the present invention; however, such a windowing environment is not necessary in order to practice the invention of this specification as claimed.

There are at least three conventional techniques for transferring information between concurrently operating programs in a computer system.

The first conventional technique is called "cut and paste". This comprises pointing to and selecting information such as text or data in one window to highlight it and thereby separate it from the remaining information in the window. The user presses a special button or key which moves the selected information to an area of memory specially designated by the operating system and known as the "paste memory" or "clipboard". The user then moves the cursor to another window which is adapted to receive the information. A "paste button" or command is invoked by the user to retrieve the stored information from the designated memory area and place it at the location of the cursor. Note that all steps of this process are carried out by the user.

The second conventional technique establishes a programmed connection between two programs, each of which may display information in a window. Both programs must be designed to respond to a predetermined input command that causes information to be shifted from one program to another. This operation may also be entirely under the control of the user and requires a user input in order to function. Each communication path between pairs of programs must be programmed into the code of both programs, which creates an inflexible system. It is also difficult to add new communication paths or to change existing communication paths.

The third conventional technique is described in U.S. Pat. No. 5,448,738 to Good et al issued Sep. 5, 1995, and in European Patent Application number 0 380 211 published on Aug. 1, 1990 and entitled "Method for Information Communication between Concurrently Operating Computer Programs" to William E. Good et al (hereinafter called "the Good et al disclosure"), the disclosures of which are incorporated by reference into the specification of this application. In the Good et al disclosure, the user interfaces with application programs through one or more window displays and an input device on a computer workstation. One or more information codes and one or more corresponding application programs are registered with a dispatcher program (otherwise known as a "server"). As a result, a list is formed in the dispatcher program, the list including a plurality of information codes and a corresponding plurality of application program identifiers. Then, when a first application program wants to send event information to another concurrently executing second application program, a template, which includes event information and a corresponding information code, is generated by the first application program and the template is transmitted by the first application program to the dispatcher program. The information code in the template from the first application program is compared with the information code in the list registered with the dispatcher program. If a match between information codes is found, the event information associated with the information code in the template is transmitted to the application program that is associated with the information code in the list registered with the dispatcher program.

The Good et al disclosure is similar to other conventional, prior art tools for enabling inter-process communication between application programs, all of which are based on "client-server techniques". Examples of such conventional tools include the "X Window System" and Sun's "Tooltalk".

In the Good et al disclosure and the other conventional tools, when using the prior art client-server techniques, all of the data to be communicated between concurrently executing computer program applications must be routed through a server program (the "server program" being similar to the "dispatcher program" in the Good et al disclosure). If many concurrently executing program applications exist in the network, the server or dispatcher may have too many event messages to transmit at any one time. This results in slower throughput as well as increased network traffic. In addition, when using the prior art client-server technique, the user operator executing a first application program can send only certain preselected event information messages to a second application program. That is, the user can send only a fixed set of predefined event information messages which are allowed by the system network; he cannot define or customize his own event information messages for transmission to the second application program. For example, if a font size was changed in one application, using the conventional client-server technique (where all event messages must be routed through the server), there was no way to communicate the changed font size, changed in one application, to any other application in the network because the "changed font size" was not among the fixed set of predefined event information messages allowed for transmission from one application to another application in the network. In addition, when using the conventional client-server technique, particular event information data must always be communicated from a first computer program application to a server program and from the server program to a second program application. Yet, that server program may not know if any other program applications are interested in receiving that particular event data. As a result, when the server receives the particular event information data from the first program application, the server must then determine if any other applications are interested in receiving that particular event data. If no other applications are interested in receiving the particular event data, the server program wasted its resources in handling the particular event data because it will never be communicated to any other application.

Furthermore, data communicated while using the conventional tools are poorly structured (forming "globs") and provide no mechanism for checking for errors in the data communicated. It is the responsibility of the application programs to interpret the data in the correct manner and handle error conditions. Therefore, when using the conventional tools, the ability of the application programmer to inter-communicate complex data structures between concurrently executing computer program applications is very limited.

As noted earlier, the conventional tools do not provide a mechanism which would allow application programmers to selectively extend or customize the type of events and/or data which could be inter-communicated between concurrently executing applications executing in one or more computer workstations. As a result, the absence of a sufficiently high level of programming abstraction in these conventional tools requires application programmers to be concerned with low level issues, such as data formats on various platforms and communication rendevous (such as, a known property name of a known window, as in the prior art "X Window System"). Finally, these conventional tools provide no easy way for end-users of applications to control the flow of data and visualize the connectivity between applications.

Therefore, there is a need for a framework that will: allow fast communication and sharing of complex data, allow strong typing of data structures, and provide a degree of extensibility when using application-defined data types and events.

In addition, there is a need for a framework that will allow end users of workstation applications to visualize the connectivity network between workstation applications and will enable the end users sitting at those workstations to control the inter-process data communication between computer program applications which are concurrently executing in one or more computer workstation environments.

SUMMARY OF THE INVENTION

Accordingly, it is a primary object of the present invention to provide an extensible intertask communication method and apparatus that is adapted for transmitting and communicating event data between a first client application and a plurality of second client applications concurrently executing in one or more workstations of a network without requiring that event data to pass through and register with an intervening server or dispatcher application, the intertask communication method and apparatus being adapted to be interconnected between the first and the second client applications during the communication of that event data between the first client application and the second client applications.

It is a further object of the present invention to provide an extensible intertask communication method and apparatus adapted for transmitting and communicating event data between a first client application and a plurality of second client applications concurrently executing in one or more workstations of a network without requiring that event data to pass through and register with an intervening server or dispatcher application, the intertask communication method and apparatus including means for predefining in each client application a selected set of events and interest objects and functions, a first client application being interested in receiving a first event and a second client application transmitting the first event to the first client application without registering the first event with the server when the second client application practices the first event.

It is a further object of the present invention to provide an extensible intertask communication method and apparatus adapted for transmitting and communicating event data between a first client application and a plurality of second client applications concurrently executing in one or more workstations of a network without requiring that event data to pass through and register with an intervening server or dispatcher application, the intertask communication method and apparatus including means for predefining in each client application a selected set of events and interest objects and functions, a first client application being interested in receiving a first event and a second client application transmitting the first event to the first client application without registering the first event with the server when the second client application practices the first event and means for advising the second client application that the first client application is interested in the selected set of event data messages.

It is a further object of the present invention to provide an extensible intertask communication method and apparatus adapted for transmitting and communicating event data between a first client application and a plurality of second client applications concurrently executing in one or more workstations of a network without requiring that event data to pass through and register with an intervening server or dispatcher application, the intertask communication method and apparatus including: means for predefining in each client application a selected set of events and functions and interest objects where a first client application is interested in receiving an event data message associated with a first event and a second client application is adapted to transmit the first event data message to the first client application without registering the first event data message with the server when the second client application practices the first event; means for advising the second client application that the first client application is interested in receiving the first event data message; means for transmitting the first event data message directly from the second client application to the first client application when the first event is practiced by the second client application; means for selectively determining which ones, if any, of the selected set of event data messages predefined in the first client application will be received in the first client application; and means for selectively determining which ones, if any, of the selected set of event data messages predefined in the second client application, where an interest object was sent from the first client application to the second client application, will be transmitted from the second client application to the first client application.

It is a further object of the present invention to provide an extensible intertask communication method and apparatus adapted for transmitting and communicating event data between a first client application and a plurality of second client applications, where the intertask communication method and apparatus further includes means for completely preventing any of the selected set of event data messages predefined in the first client application from being received into the first client application from the second client application, and means for completely preventing any of the selected set of event data messages predefined in the second client application, where an interest object was sent from the first client application to the second client application via the server, from being transmitted from the second client application.

It is a further object of the present invention to provide an extensible intertask communication method and apparatus adapted for transmitting and communicating event data between a first client application and a plurality of second client applications, where the intertask communication method and apparatus further includes means for completely allowing all of the selected set of event data messages predefined in the first client application to be received into the first client application from the second client application, and means for completely allowing all of the selected set of event data messages predefined in the second client application, where an interest object was sent from the first client application to the second client application via the server, to be transmitted from the second client application.

It is a further object of the present invention to provide an extensible intertask communication method and apparatus adapted for transmitting and communicating event data between a first client application and a plurality of second client applications, where the intertask communication method and apparatus further includes means for preventing any event data messages from being received in or transmitted from a first client application, and means for subsequently broadcasting a plurality of the event data messages from the first client application to the second client application following the practice by the first client application of the plurality of events associated with the plurality of event data messages.

It is a further object of the present invention to provide an easy to use graphical user interface for use with the intertask communication method and apparatus of the present invention in order to allow the user/operator to easily visualize and control the functional operation of the Framework portion of each client application.

In accordance with these and other objects of the present invention, one or more workstations are interconnected together by an extensible intertask communication (ITC) apparatus. A workstation has a display, and the display will present one or more windows to an operator. Each window is being generated on the workstation display in response to the execution of an application program which is stored in the workstation memory and is being executed by the workstation processor. The application program is hereinafter called a "client application". The intertask communication (ITC) apparatus actually includes at least a first and a second client application, stored in either one workstation memory or in a pair of workstation memories, and a separate server program stored in one of the workstation memories. Each client application will include a Human Interface Code and a Framework Code.

The Framework Code of each client application in conjunction with the server program, of the intertask communication (ITC) method and apparatus in accordance with the present invention, will transmit and communicate event information directly between the first client application and the second client application, of a plurality of client application programs concurrently executing in one or more workstations of a network of interconnected workstations, without requiring that event information to pass through and register with an intervening server or dispatcher application program, if and when an interest object is initially transmitted between the first client application and the second client application via the server program.

An event is defined to be a change or an action taken by one operator at a workstation. For example, that operator may drag the cursor by moving a mouse or perhaps the operator will delete data or create new data. That event information, being practiced by one operator in one program application at one workstation, may be needed by another operator in another program application at another workstation. The interprocess communication method and apparatus of the present invention can transmit that event information from the one program application to all other program applications in the network of workstations, without requiring that event information to register with an intervening server or dispatcher program, provided that an interest object(s) was initially transmitted between the one program application and all the other program applications via a server which are concurrently executing in all of the workstations in the network of workstations.

Hereinafter, one program application, executing in one workstation in the network, will be called a "first client application", and another program application, executing in the one workstation or in any other workstation in the network of workstations, will be called a "second client application". If a second client application executing in a second workstation is programmed to receive a certain plurality of events, and if an interest object associated with the plurality of events was transmitted from the second client application to a first client application (executing in either the second workstation or a first workstation) via a server program, and when a first event of the plurality of events is being practiced by an operator in a first client application, a set of information associated with that first event will be transmitted from the first client application in a first workstation directly to a second client application executing in either the first workstation or another workstation in the network. However, the set of information associated with that first event will not pass through and register with the server program. As a result, the application programmer can customize the type of and number of events which he requires to be transmitted between client applications by simply pre-programming a particular client application to receive event information associated with a preselected plurality of events.

More particularly, before event information can be transmitted directly between client applications, the following steps must be taken:

1. Each client application in a plurality of client applications are programmed to receive one or more events and to practice one or more functions associated, respectively, with the one or more events (hereinafter called, a "list of events"). When the one or more events and the one or more functions associated with the one or more events are programmed into a particular client application's list of events, that particular client application is said to be interested in receiving event information from other concurrently executing client applications when the events being practiced by the other client applications correspond to the one or more events which are programmed into the particular client application's list of events.

2. Since each event of the one or more events programmed into the particular client application's list of events includes an event identifier or "interest object", the interest objects associated, respectively, with the one or more events are transmitted from the particular client application to an intervening server or dispatcher program which may be resident in another workstation or in the workstation executing the particular client application.

3. The intervening server will re-transmit the interest objects, of the one or more events, to all other concurrently executing client applications which are executing in all the other workstations of the network of workstations. Similarly, all client applications transmit their interests through the server.

4. If a first particular client application program practices an event which corresponds to a previously received interest object which was transmitted from a second particular client application to the first client application via the server, event information associated with that event being practiced by the first particular client application (including the interest object) will be sent out along the network of workstations directly to the second particular client application. Note that the event information associated with the event being practiced by the first particular client application will not be routed through the intervening server or dispatcher program. As a result, when the event is being practiced in the first particular client application, the event information associated with that same event will be approximately simultaneously practiced in the second particular client application. By building the list of events in each client application, the client application developer can customize the type and quantity of events which the client application will send to or receive from other client applications. Since the server program is avoided when the event information is transmitted directly between client applications, valuable processing time is conserved.

However, even though the information associated with the event being practiced by the first particular client application is transmitted directly to the second particular client application, the second particular client application is not required to actually receive the information associated with the event being practiced by the first particular client application. That is, an operator monitoring the second particular client application can use a mouse to click on certain icons which appear in the bottom right hand corner of a window which is displayed in response to the execution of the second particular client application.

For example, the operator can click on a first type of icon called the "status icon". There are three types of "status icons": an "open state" status icon, a "closed state" status icon, and a "locked state" status icon. If the operator clicks on the "open state" status icon for a second particular client application, the second particular client application is open and it will receive all of the event information associated with the event being practiced by the first particular client application. If the operator clicks on the "closed state" status icon for the second particular client application, the second particular client application is closed and it will not receive any of the information associated with the event being practiced by the first particular client application. The operator can click on the "locked state" status icon of the second particular client application although the internal "icon generation" program code for the second particular client application can decide if the locked state status icon is either "on" or "off". That is, with regard to the "locked state" status icon, the application developer can decide that, in certain circumstances, the second particular client application will be closed, will not receive any of the event information associated with the event being practiced by the first particular client application, and will remain closed even if and when the operator at the workstation monitoring the second particular client application clicks on the "open state" status icon.

The operator at the workstation monitoring the first particular client application can click on a second type of icon called the "broadcast" icon. If the status icons for the first particular client application are in the "closed state" for a particular period of time, absolutely no event information associated with any of the events practiced by the first particular client application will be transmitted out to the network by the first particular client application to any other client applications, including the second particular client application, for that particular period of time. However, assume that, following the expiration of that particular period of time, the operator at the workstation monitoring the first particular client application decides to transmit all event information to the second client application associated with events which were practiced by the first particular client application during the particular period of time. In order to transmit all such event information to the second particular client application, the operator at the workstation monitoring the first particular client application clicks on the "broadcast" icon. When the operator monitoring the first particular client application clicks on the "broadcast" icon, event information associated with a plurality of events which were practiced by the first particular client application during the particular period of time when the first particular client application was "closed" will be transmitted to the second particular client application, provided that interest objects associated with those plurality of events were previously transmitted from the second particular client application to the server and from the server to the first particular client application.

The operator at the workstation monitoring the first particular client application can click on still another type of icon called the "event filter" icon. The "event filter" icon appears in the bottom right hand corner of each window on a workstation display, the event filter enabling the operator to selectively choose which events of a plurality of events (being practiced by a particular client application) will be transmitted to another client application(s) and which events of the plurality of events will be received from the other client applications.

Further scope of applicability of the present invention will become apparent from the detailed description presented hereinafter. It should be understood, however, that the detailed description and the specific examples, while representing a preferred embodiment of the present invention, are given by way of illustration only, since various changes and modifications within the spirit and scope of the invention will become obvious to one skilled in the art from a reading of the following detailed description.

BRIEF DESCRIPTION OF THE DRAWINGS

A full understanding of the present invention will be obtained from the detailed description of the preferred embodiment presented hereinbelow, and the accompanying drawings, which are given by way of illustration only and are not intended to be limitative of the present invention, and wherein:

FIGS. 14 through 25 illustrate a detailed construction of the Operator Interaction Display Software of FIG. 5, FIG. 14 illustrating the status icons and the broadcast icon, FIGS. 15a through 15e illustrating the event filter icon with its subwindow display, and FIGS. 16-25 illustrate the use of these icons on a window display being displayed on a display screen of a workstation;

FIGS. 26 and 27 illustrate a detailed construction of the ITC HI Setup software of FIG. 5;

FIGS. 28 and 29 illustrate a detailed construction of the Send An Event Software of FIG. 5;

FIGS. 30 and 31 illustrate a detailed construction of the Receive An Event Software of FIG. 5.

DESCRIPTION OF THE PREFERRED EMBODIMENT

This specification is divided into two parts: (1) a Description of the Preferred Embodiment, which will provide a broader overview of the structure and the functional operation of the Distributed Framework for Intertask Communication Between Workstation Applications of the present invention, and (2) a Detailed Description of the Preferred Embodiment, which will provide a detailed description of the structure and the functional operation of the Distributed Framework for Intertask Communication Between Workstation Applications of the present invention.

The following paragraphs of this "Description of the Preferred Embodiment" will present the broader overview of the structure and the functional operation of the Distributed Framework for Interprocess Communication Between Workstation Applications of the present invention.

Figure 1:
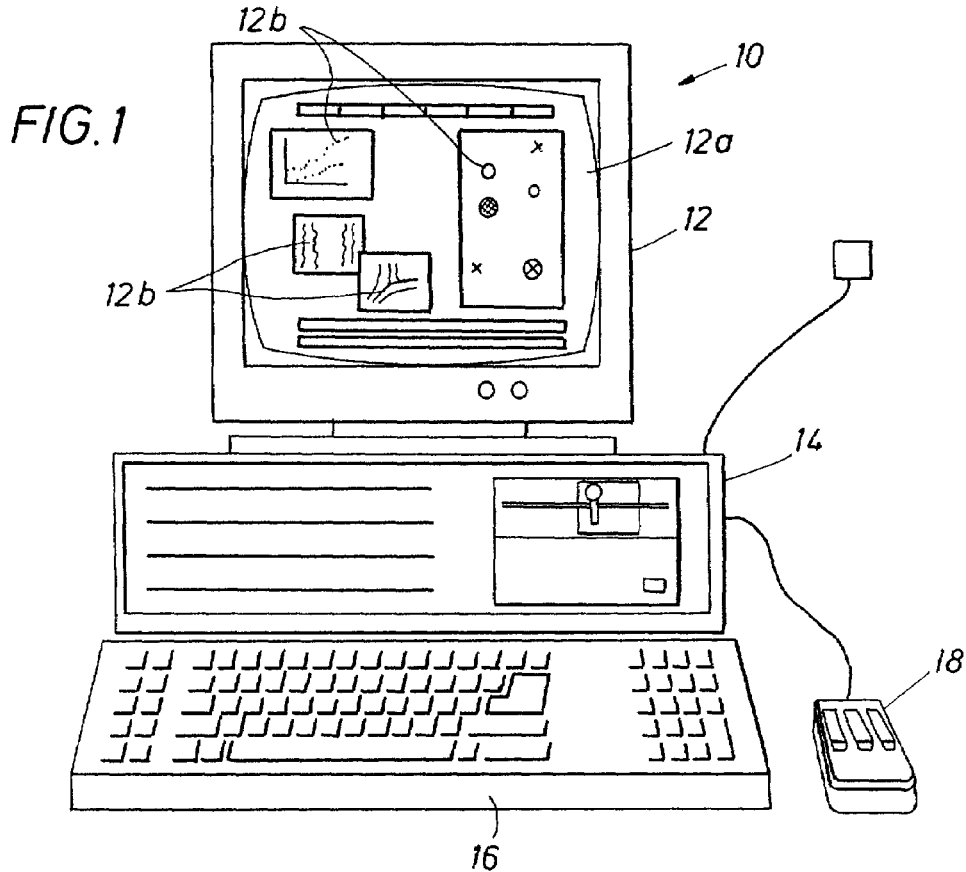
FIG. 1 illustrates a computer workstation having a display which includes one or more window displays representing the execution of one or more client application programs.

Referring to FIG. 1, a computer workstation is illustrated which has a display that includes one or more window displays representing the execution of one or more client application programs.

In FIG. 1, a computer workstation 10 is illustrated. The workstation includes a monitor 12, a processor 14, a keyboard 16, and a mouse 18. The monitor 12 includes a cathode ray tube (CRT) that provides a display screen 12a. In FIG. 1, the display screen 12a has a plurality of windows 12b displayed thereon, each window 12b being displayed on the display screen 12a in response to the execution, within the workstation 10, of a separate client application program. As noted below in FIG. 2, each of the plurality of windows 12b provide a different display of wellbore-related data from which an operator can interpret whether or not underground deposits of hydrocarbons are present within an earth formation. An operator sitting at the workstation 10 will use the mouse 18 to select various ones of the windows 12b for viewing and/or manipulation or selection of the data in that window.

Figure 2:
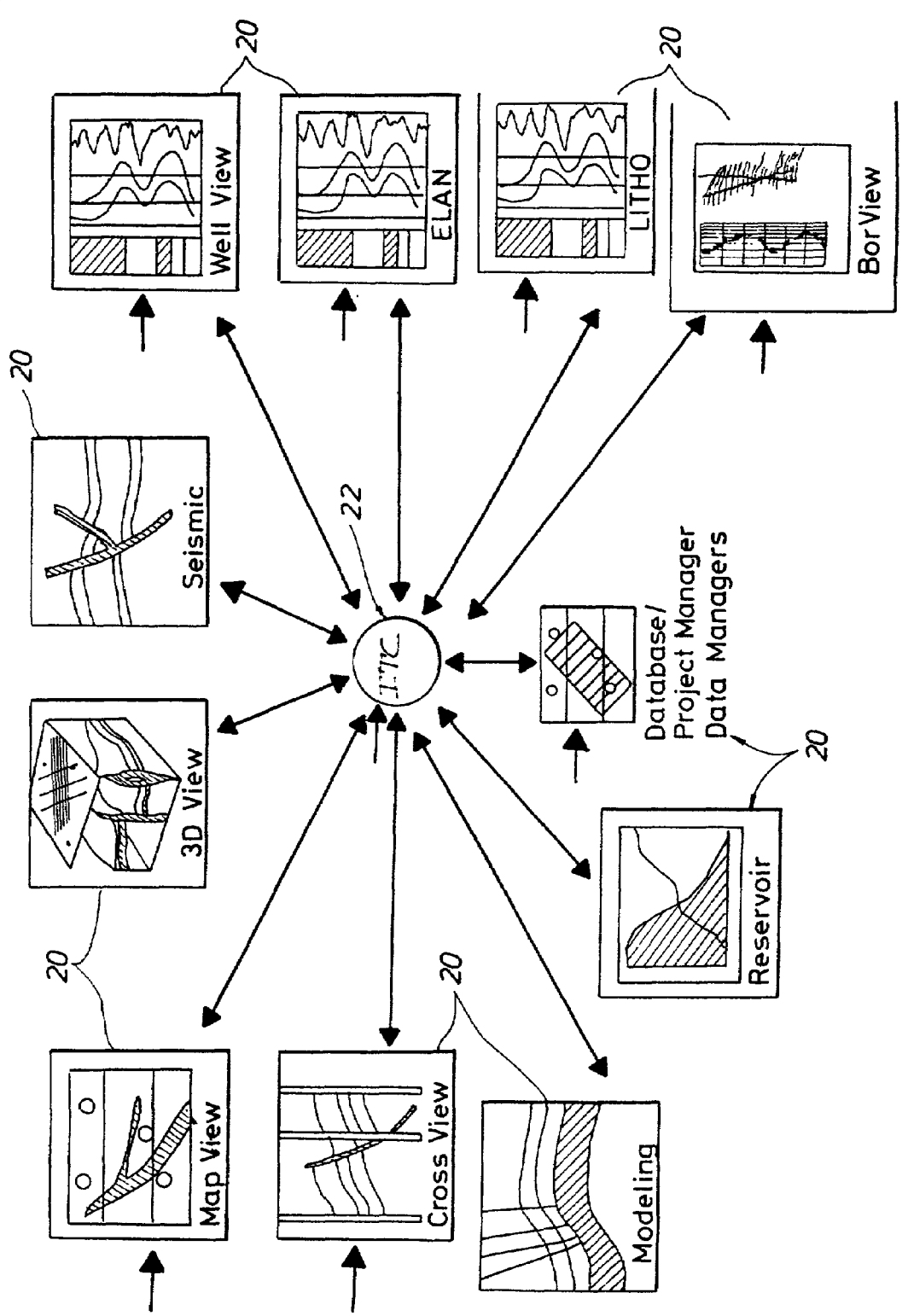
FIG. 2 illustrates a plurality of client application programs which display a corresponding plurality of window displays on one or a plurality of workstations similar to that shown in FIG. 1, each of the plurality of client applications being interconnected together by an intertask communication (ITC) apparatus which comprises a server program application and one or more individual client applications.

Referring to FIG. 2, a plurality of client application programs (hereinafter called "client applications") are illustrated which display a corresponding plurality of window displays on one of a plurality of workstations similar to the workstation 10 shown in FIG. 1 and which are interconnected together by an intertask communication (ITC) apparatus.

Figure 6:
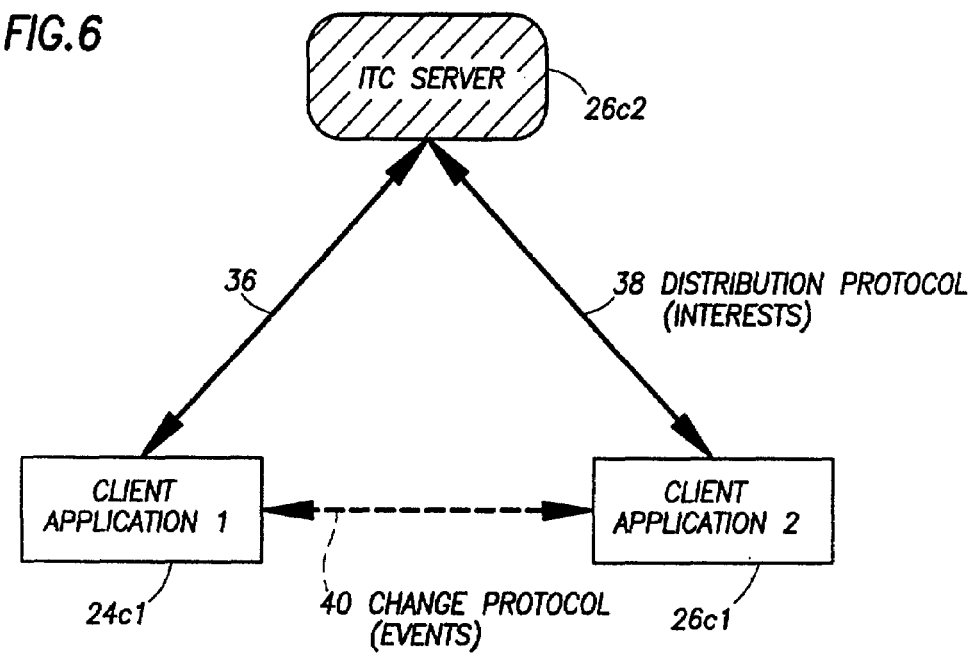
FIGS. 6 through 13b illustrate a detailed construction and the functional operation of the ITC Framework (ITC Core) of FIG. 4.

In FIG. 2, a plurality of client applications 20 are interconnected together by an intertask communication (ITC) apparatus 22. Recall that a "client application" is a computer program which is executing in the workstation 10 of FIG. 1 and which is responsible for displaying one of the windows 12b on the display screen 12a of the monitor 12 of the workstation 10 of FIG. 1. The ITC apparatus 22 of FIG. 2 allows each of the client applications 20 to communicate directly with one another. In general, as shown in FIG. 6, the ITC apparatus 22 is a generic term which includes a first client application and a second client application which are interconnected together in the manner shown in FIG. 6. The ITC apparatus 22 of FIG. 2 enables all of the client applications 20 to communicate directly and simultaneously with one another. As a result, events being practiced in one client application 20 can be viewed simultaneously in another client application 20. This functional capability will be discussed in more detail later in this specification.

Figure 3:
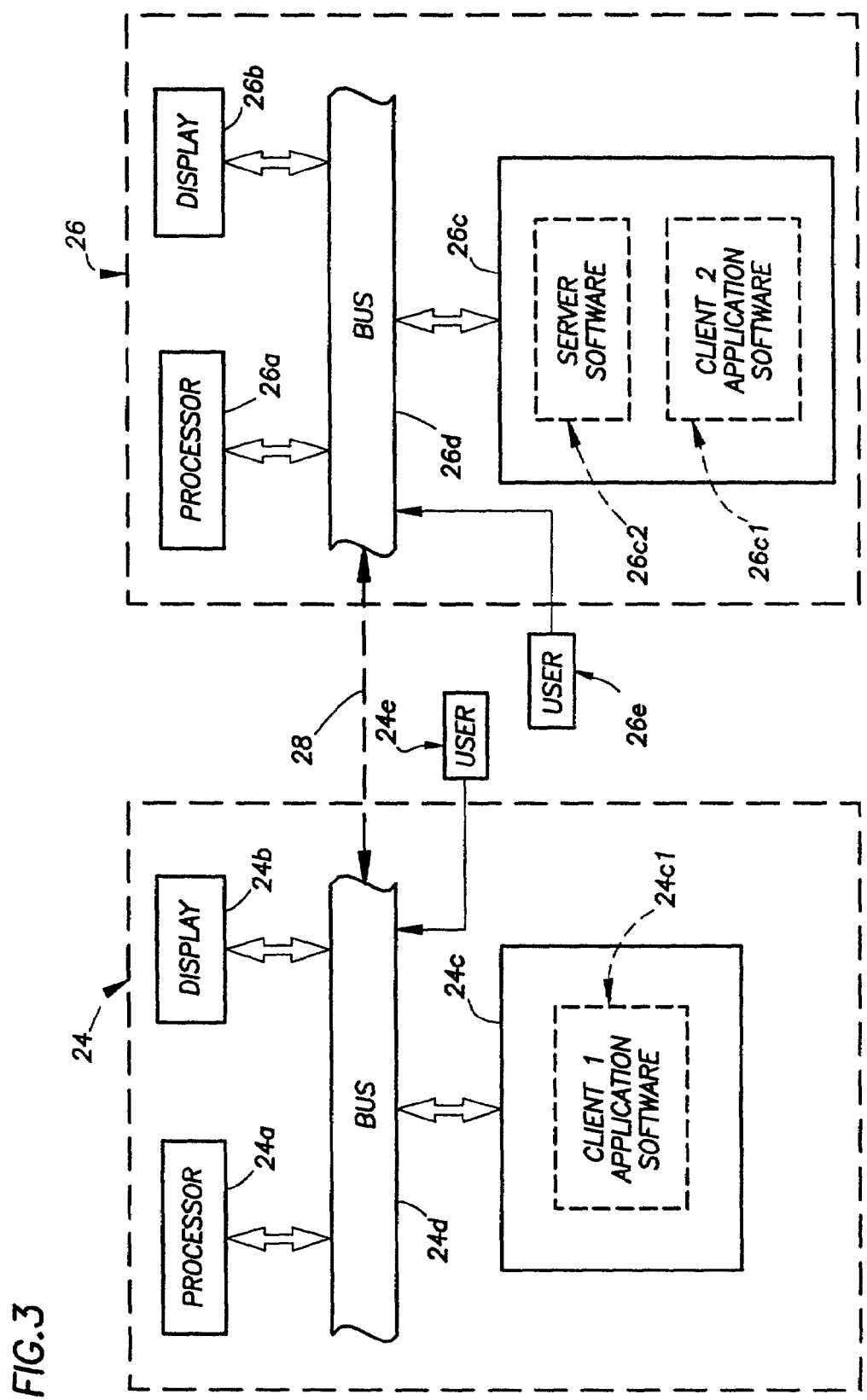
FIG. 3 illustrates a first workstation executing a first client application and a second workstation executing a second client application and also storing the server application software.

Referring to FIG. 3, a system including a pair of interconnected workstations (each of which are similar to the workstation 10 of FIG. 1) is illustrated.

In FIG. 3, a first workstation 24 is interconnected to a second workstation 26. The first workstation 24 includes a processor 24a connected to a system bus 24d, a display 24b (similar to the display screen 12a of FIG. 1) connected to the system bus 24b, a memory 24c connected to the system bus 24d, and a user interface 24e (the mouse 18 and keyboard 16 of FIG. 1) connected to the system bus 24d. The second workstation 26 includes a processor 26a connected to a system bus 26d, a display 26b (similar to the display screen 12a of FIG. 1) connected to the system bus 26b, a memory 26c connected to the system bus 26d and a user interface 26e (the mouse 18 and keyboard 16 of FIG. 1) connected to the system bus 26d. The first workstation 24 is electrically or optically connected to the second workstation 26 via a communication link 28. The memory 24c of the first workstation 24 stores a first client application program called the "client 1 application software" 24c1, and the memory 26c of the second workstation 26 stores a second client application program called the "client 2 application software" 26c1. However, the memory 26c of the second workstation 26 also stores a server software 26c2. The server software 26c2 distributes interest objects between client applications. See the "dispatcher program" which is discussed in the Good et al disclosure (i.e.—in U.S. Pat. No. 5,448,738 entitled "Method for Information Communication between Concurrently Operating Computer Programs"), the disclosure of which has already been incorporated herein by reference. The client 1 application software 24c1, when executed by the processor 24a, generates a visual image on the display 24b which is similar to one of the client applications 20 shown in FIG. 2. Similarly, the client 2 application software 26c1, when executed by the processor 26a, generates a visual image on the display 26b which is similar to one of the other client applications 20 shown in FIG. 2. The function of the system shown in FIG. 3 will become apparent from a reading of the remaining parts of this specification.

Figure 4:
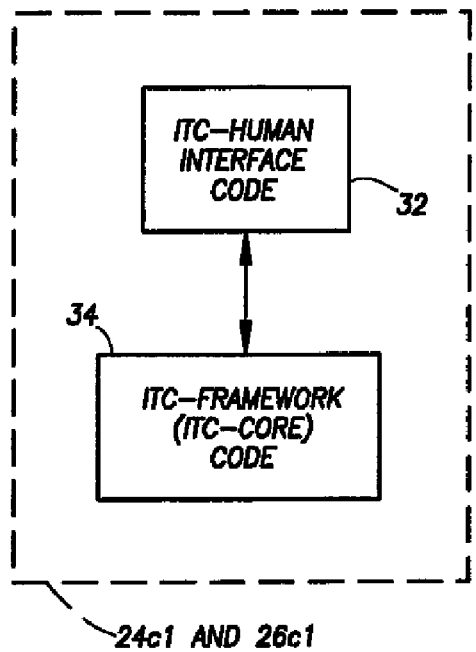
FIG. 4 illustrates a more detailed construction of the first client application (client 1 software) and the second client application (client 2 software) in the first and second workstations of FIG. 3.

Referring to FIG. 4, a more detailed construction of the client 1 application software 24c1 and the client 2 application software 26c1 of FIG. 3 is illustrated.

In FIG. 4, the client 1 application software 24c1 and the client 2 application software 26c1 each include: (1) a first set of software hereinafter known as the "ITC Human Interface Code" 32, and (2) a second set of software hereinafter known as the "ITC Framework (ITC Core) Code" 34. From a functional standpoint, an internal application code invokes the Human Interface Code 32, and the Human Interface Code 32 invokes the Framework Code 34. The ITC Human Interface code 32 and the ITC Framework Code 34 are discussed in greater detail later in this specification and the function of the Human Interface code 32 and the Framework Code 34 will become apparent from a reading of the remaining parts of this specification.

Figure 5:
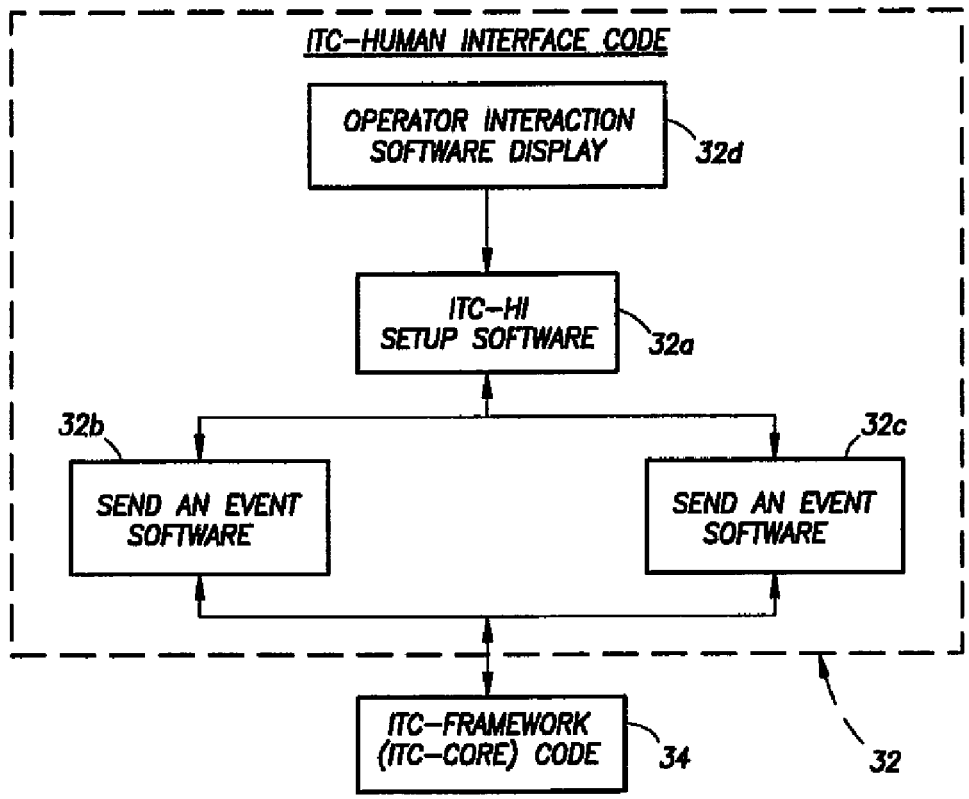
FIG. 5 illustrates a more detailed construction of the ITC-Human Interface Code of FIG. 4.

Referring to FIG. 5, a more detailed construction of the ITC Human Interface Code 32 of FIG. 4 is illustrated.

In FIG. 5, the Human Interface Code 32 of FIG. 4 is comprised of four parts: (1) an Operator Interaction Display Software 32d, (2) an ITC-HI Setup software 32a operatively connected to the Operator Interaction Display software 32d, (3) a Send An Event software 32b operatively connected to the ITC HI Setup software 32a, and (4) a Receive An Event Software 32c operatively connected to the ITC HI Setup software 32a. The ITC Framework (ITC Core) code 34 will be operatively connected to both the Send an Event software 32b and the Receive an Event software 32c. The Operator Interaction Display software 32d will generate displays of icons on the windows 12b of the display screen 12a, and it will also display, on the windows 12b, the "event information" which is requested from other client applications (this will be discussed later in this specification).

In operation, referring to FIG. 5, an operator at workstation 10 of FIG. 1, which is executing a particular client application, will view a variety of icons on a window display 12b on the display screen 12a of the FIG. 1 workstation for that particular client application. The operator will click "on" one or more of the icons thereby allowing an interest object in particular "event information" to be transmitted from the particular client application (e.g.—from the client 1 application 24c1 of FIG. 3) to other client applications (e.g.—client 2 application 26c1 of FIG. 3) via the server 26c2. The operator interaction display software 32d of FIG. 5 will display the window display 12b and the one or more icons in the window display 12b on the display screen 12a of the FIG. 1 workstation. When the operator clicks "on" the one or more icons in the window display 12b, the operator interaction display software 32d will inform the ITC-HI Setup Software 32a, and the ITC-HI Setup Software 32a will drive the Send An Event software 32b. The Send An Event Software 32b will instruct the ITC-Framework Code 34 of the particular client application (e.g.—client 1 application) to send the interest object in the particular event information to the other client applications (e.g.—client 2 application) via the server 26c2. When the other client applications generate the requested event information, the other client applications will send the requested event information directly to the ITC Framework Code 34 of the particular client application without passing through and registering with the server 26c2. When the requested event information is received by the particular client application (e.g.—client 1), the ITC Framework Code 34 of the particular client application will, in turn, inform the Receive An Event Software 32c of the particular client application. The Receive An Event Software 32c of the particular client application will inform the ITC-HI Setup Software 32a of the particular client application that the requested event information has been received from another client application. The ITC HI Setup Software 32a of the particular client application will, in turn, instruct the Operator Interation Display Software 32d of the particular client application to display the requested "event information" on the display screen 12a of the workstation 10 of FIG. 1.

Each of these four parts of the Human Interface Code 32 will be discussed later in this specification.

Referring to FIGS. 3, and 6 through 13b, a functional operation of the ITC Framework (ITC Core) Code 34 of each client application, such as the client 1 application 24c1 and the client 2 application 26c1, is illustrated.

Each client application includes the ITC Framework (ITC Core) Code 34. For example, the client 1 application software 24c1 and the client 2 application software 26c1 of FIG. 3 each include an ITC Framework Code 34. The ITC Framework code 34 associated with any particular client application interacts functionally with the server 26c2 and the ITC Framework code 34 associated with each other client application. For example, the ITC Framework code 34 of the client 1 application 24c1 in the first workstation 24 of FIG. 3 interacts functionally with the server software 26c2 and the ITC Framework code 34 of the client 2 application software 26c1 in the second workstation 26. The Framework code 34 of a first client application 24c1 will transmit interest objects to the server 26c2; it will transmit event information associated with an event "X" to the Framework code 34 of a second client application 26c1; and it will receive event information associated with an event "X" from the Framework code 34 of the second client application 26c1. This functional interaction between the Framework code 34 of one client application 24c1 and the server 26c2 and the Framework code 34 of other client applications 26c1 is discussed in further detail in the following paragraphs with reference to FIGS. 3 and 6 through 13b of the drawings.

In FIGS. 3 and 6, referring initially to FIG. 6, a high level schematic for distribution of events and interests is illustrated.

In FIG. 3, note the location of the client 1 application software 24c1 in the first workstation 24, and note the location of the client 2 application software 26c1 and the server software 26c2 in the second workstation 26.

In FIG. 6, a Client Application 1 24c1 (hereinafter called "Application 1") is interconnected to a Client Application 2 26c1 (hereinafter called "Application 2"), both Application 1 and Application 2 being connected to an ITC server 26c2. The "Client Application 1" 24c1 of FIG. 6 represents the client 1 application software 24c1 of FIG. 3, the "Client Application 2" 26c1 of FIG. 6 representing the client 2 application software 26c1 of FIG. 3, and the ITC server 26c2 of FIG. 6 representing the server software 26c2 of FIG. 3. When the Client Application 1 24c1 of FIG. 6 is executing in the first workstation 24 of FIG. 3, a window display (similar to one of the window displays 12b of FIG. 1) will appear on the display screen of the monitor of the first workstation 24. Similarly, when the Client Application 2 26c1 of FIG. 6 is executing in the second workstation 26 of FIG. 3, another window display (similar to one of the window displays 12b of FIG. 1) will appear on the display screen of the monitor of the second workstation 26. The window displays appearing on both monitors of the first and second workstations 24 and 26 could be any of those shown in FIG. 2.

In FIG. 6, assume that the Client Application 1 24c1 ("Application 1") is executing a first client application. In addition, assume that the Client Application 2 26c1 ("Application 2") is executing a second client application and, during the execution of the second client application by Application 2, certain "event information" will be generated by Application 2.

The term "event information" and/or the term "event" will be defined in the next three paragraphs by way of the following three examples.

For a first example, during the execution of the second client application by Application 2 at workstation 26, the operator sitting at the Workstation 26 may use the mouse 18 of FIG. 1 to place a cursor over one of the windows 12b of FIG. 1 and to thereby select certain information in that window 12b. The "selection" of certain information on that window 12b by Application 2 at workstation 26 may involve either dragging the cursor or deleting information or creating information. The "selection" of that certain information in that window 12b would be an "event" and that event would generate "event information". Application 1 may be interested in receiving that event information.

For a second example, Application 1 is being executed in France and it involves an examination of the geology of the earth. Application 2 is being executed in Houston and it involves a petrophysical application that is examining a pressure in a wellbore. There is nothing in common between Application 1 and Application 2 except for one one parameter: the pressure at a certain depth in the earth. The Application 1 may want to examine the pressure v. depth curve being generated in Application 2. Therefore, the pressure v. depth curve in Application 2 and any changes made thereto by an operator at the second workstation 26 would constitute "event information". Application 1 would be interested in receiving that event information.

For a third example, called "cursor tracking", Application 1, executing in the first workstation 24 of FIG. 3, is displaying a map having x, y, and z coordinates and an operator at the first workstation 24 can move a cursor across the map which would generate x, y, and z "event information". However, Application 2, executing the second workstation 26 of FIG. 3, is viewing a three-dimensional "cube" representation of an underground reservoir and Application 2 may be interested in receiving the x, y, and z "event information" from Application 1 whenever that event information is generated by Application 1. Therefore, when the operator at the first workstation 24 executing Application 1 moves the cursor across the map, the x, y, and z "event information" is generated from Application 1. If Application 2 previously expressed an interest in receiving that "event information" and when the event information is generated by Application 1, the Application 1 in the first workstation 24 would send that "event information" to Application 2 in the second workstation 26.

In FIG. 6, when Application 1 24c1 is executing the first client application, assume that Application 1 is interested in receiving certain "particular event information" from Application 2 26c1 when Application 2 generates that particular event information. In that case, Application 1 24c1 generates an "interest object" signal (which is propagated along line 36 in FIG. 6) from Application 1 24c1 to the ITC server 26c2. The server 26c2 informs Application 2 26c1 of the Application 1 interest in the particular event information by re-propagating the aforementioned "interest object" signal from the server 26c2 to the Application 2 26c1 (along line 38 in FIG. 6). The interest object signal from Application 1 contains an identifier which uniquely identifies Application 1. Therefore, when Application 2 receives the interest object signal (from line 38 in FIG. 6), Application 2 26c1 knows that Application 1 24c1 was interested in receiving the "particular event information" when the particular event information is generated by Application 2. As a result, when Application 2 generates the "particular event information" (i.e.—the operator at workstation 26 selects something by placing the mouse 18 in a window 12b and depressing a key on the mouse), since Application 2 knows that Application 1 is interested in receiving the particular event information, Application 2 will send that particular event information "directly" to Application 1 (via line 40). That is, the particular event information will not be sent from Application 2 26c1 to the server 26c2 (via line 38) and from the server 26c2 to Application 1 24c1 (via the line 36). Because the server 26c2 is not involved in the transfer of the particular event information from Application 2 to Application 1, valuable processing time is saved. As a result, the "Distributed Framework for Intertask Communication Between Workstation Applications" of the present invention is "extensible". That is, for any particular client application program executing in a workstation as represented by one of the windows 12b being displayed in FIG. 1, an application developer can define: (1) the type of events that the particular client application will receive from another concurrently executing client application, and (2) the type of data associated with those events that will be received from the other client application whenever those events are transmitted from the other client applications.

Figure 7:
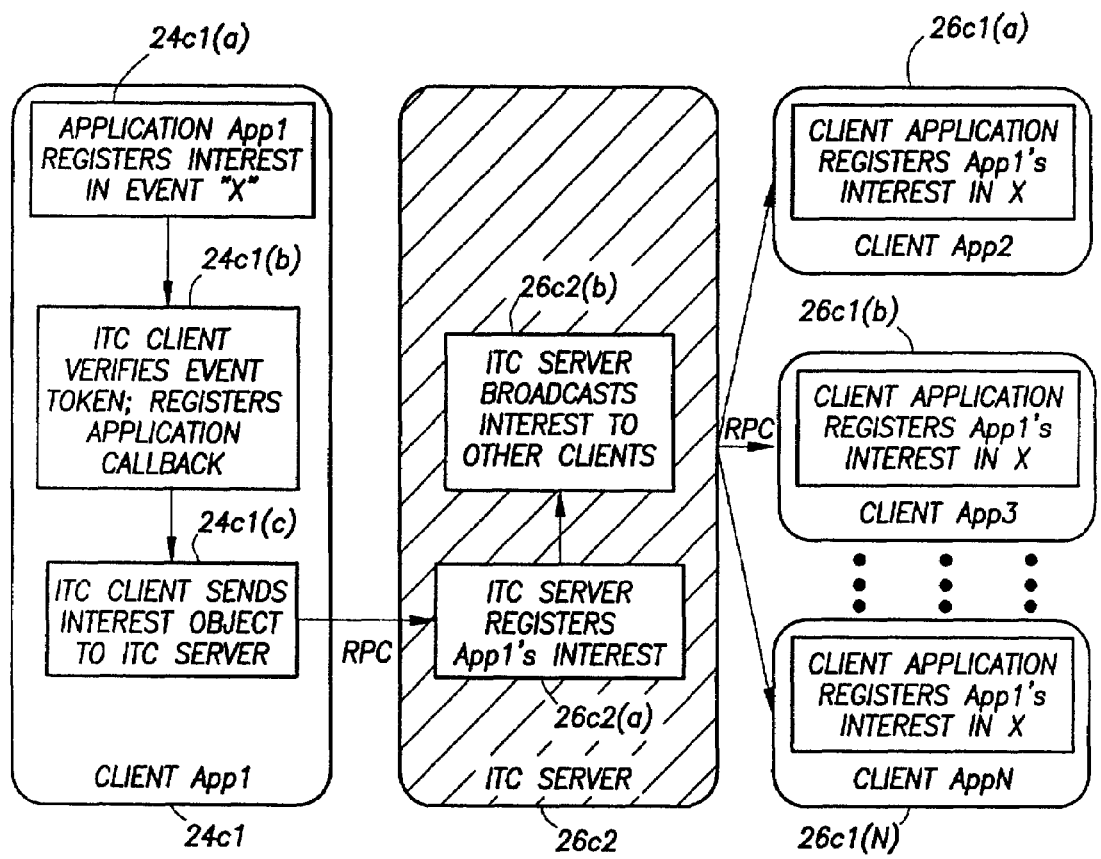

In FIG. 7, a flowchart of interest registration and distribution is illustrated. This flowchart discusses some of the concepts discussed above with reference to FIG. 6. In FIG. 7, when Client Application 1 24c1 wants to register an interest in an event (i.e.—Application 1 wants to register an interest in an event because it wants to receive information from one or more other client applications when the other client applications practice or execute the event), a number of process steps are practiced by Application 1 24c1, the server 26c2, and Application 2 26c1:

1. In FIG. 7, block 24c1(a), the Client Application 1 24c1 ("Application 1") includes two parts: (1) a first client application ("client application 1"), and (2) an Intertask Communication (ITC) client ("ITC client"). When Application 1 is executing the first client application and if the first client application requires information concerning an event which will hereinafter be called "event X", the first client application will register an interest in event X with the ITC client by sending an "interest object" to the ITC client. The interest object contains an "event token".

2. In FIG. 7, block 24c1(b), the ITC client stores certain event tokens. When the ITC client receives the interest object from the first client application, the ITC client will verify the event token present in the interest object by locating a match between the event token in the interest object with an event token catalogued in a database. When a match between event tokens is located, the ITC client will "register an application callback"; that is, the ITC will send an acknowledgement signal back to the first client application.

3. In FIG. 7, block 24c1(c), the ITC client will then send an "interest object" signal to the ITC server 26c2.

4. In FIG. 7, block 26c2(a), the ITC server will receive the interest object signal from the ITC client and, in response thereto, the ITC server will register within itself (i.e., the ITC server will store within itself) data or information regarding the interest in event X which the "first client application" of "Application 1" had previously generated. Recall that the first client application of Application 1 previously indicated (by sending the interest object signal to the ITC server) that it wants to receive certain information from the other client applications that is generated when the "event X" is executed or practiced by the other client applications.

5. In FIG. 7, block 26c2(b), when the ITC server registers within itself the information regarding the first client application's interest in receiving the event X information from other client applications pursuant to block 26c2(a), the ITC server will broadcast to all such other client applications such first client application's interest. As a result, all the other client applications (i.e.—all the other client application programs being executed in all of the workstations in the network of workstations) will know that the first client application of Application 1 24c1 is interested in receiving certain specific information from the other client applications, the specific information being generated from the other client applications only when the "event X" is executed or practiced by the other client applications.

6. In FIG. 7, blocks 24c1(a), 24c1(b), . . . , and 24c1(N), all of the other client applications ("client application 2" 26c1 (a), "client application 3" 26c1(b), . . . , and "client application N" 26c1(N)) will register therein (that is, store therein) the first client application's interest in receiving information regarding "event X" whenever any one or all of client application 2, client application 3, . . . , or client application N practice or execute the "event X".

Figure 8A:
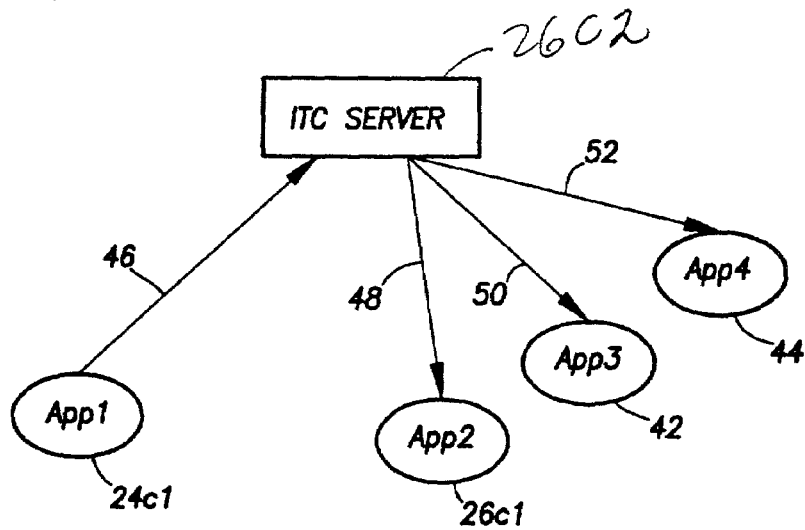
Figure 8B:
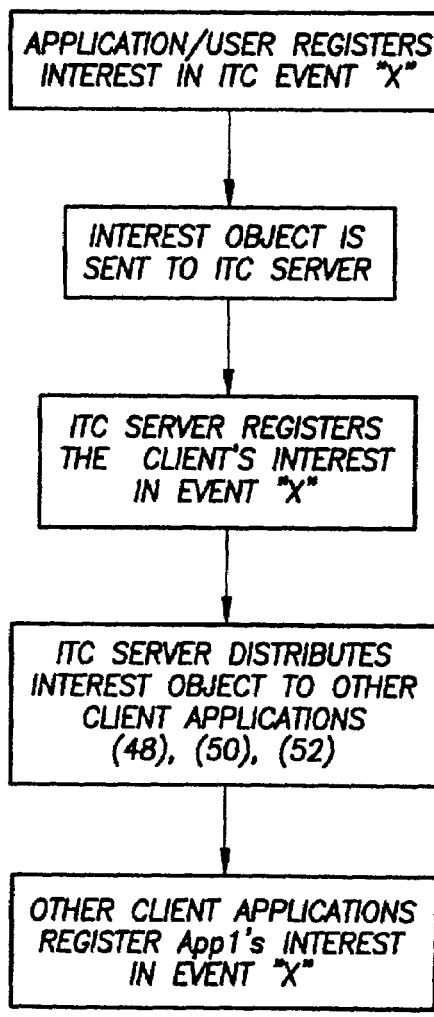

In FIGS. 8a-8b, another flowchart of interest registration and distribution (which will discuss concepts similar to the concepts discussed above in connection with the flowcharts of FIGS. 6 and 7) is illustrated. In the flowchart of FIGS. 8a-8b, the "client application 1" 24c1 ("Application 1") is shown to be communicating with the server 26c2 and the "client application 2" 26c1 ("Application 2") as previously illustrated in FIGS. 6 and 7. However, in addition, in FIGS. 8a-8b, two other client applications are illustrated: "client application 3" 42 ("Application 3") and "client application 4" 44 ("Application 4"). In operation, referring to FIGS. 8a-8b, assume for purposes of discussion that Application 1, Application 2, Application 3, and Application 4 represent client application programs which are executing in four (4) different workstations similar to the workstation of FIG. 1. Assume further that each of the four applications (Application 1 through Application 4) generate a window display at their respective workstations similar to the window display 12b shown in FIG. 1. Assume further that the Application 1 of FIG. 8a is represented by the "client 1 software" 24c1 in FIG. 3, the Application 2 of FIG. 8a is represented by the "client 2 software" 26c1 in FIG. 3, and the server 26c2 of FIG. 8a is represented by the "server software" 26c2 in FIG. 3. In FIGS. 8a-8b, Application 1 24c1 registers an interest in an ITC event called "event X" (the actual mechanics behind the registration of that interest will be better understood with reference to FIG. 14). An interest object is sent from Application 1 24c1 to the server 26c2 via line 46 in FIG. 8a. When the interest object is received by the server 26c2, the server 26c2 will register, within itself, the interest from Application 1 24c1 in event X. The server 26c2 will then re-distribute the interest object to: "Application 2" 26c1 via line 48, "Application 3" 42 via line 50, and "Application 4" 44 via line 52. When the server 26c2 re-distributes the interest object from Application 1 to the other client applications, Applications 2, 3, and 4, the other client applications (Applications 2, 3, and 4) will register within themselves Application 1's interest in the event X.

Figure 9A:
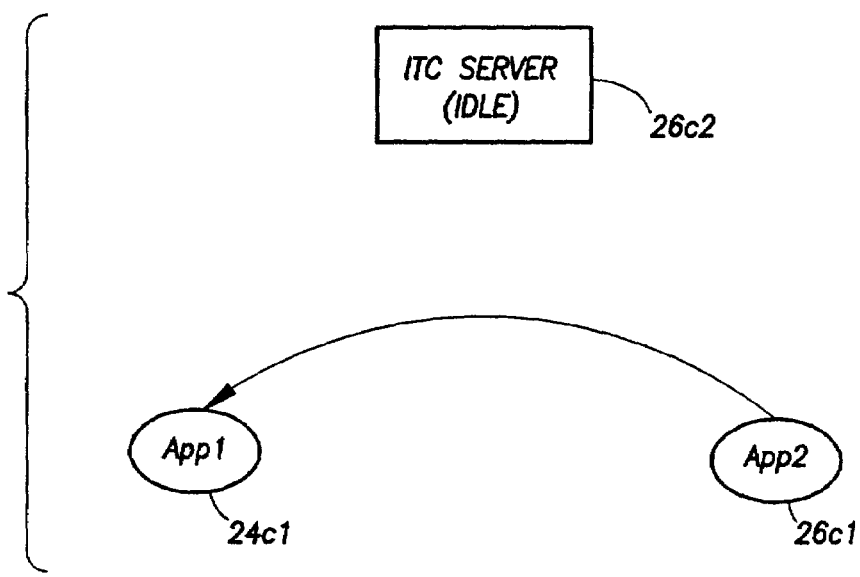
Figure 9B:
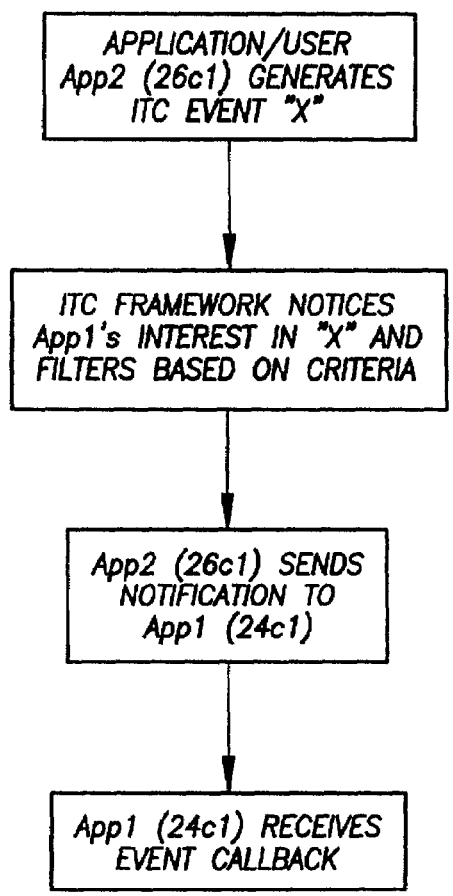

In FIGS. 9a-9b, a high level schematic of event propagation using peer to peer communication is illustrated. Recall from FIGS. 8a-8b that Application 1 24c1 transmitted an interest object signal to the server 26c2 and the server 26c2 redistributed that interest object signal to Application 2 26c1. The interest object signal (which identifies Application 1 as being its originator) was registered in Application 2 as originating from Application 1 and it expressed an interest by Application 1 in certain specific information which would be generated by Application 2 when an "event X" is practiced or executed by Application 2. As a result, in FIGS. 9a-9b, since the interest object signal previously sent to Application 2 by the server 26c2 identified Application 1 as being the requestor of such specific information concerning "event X", when Application 2 26c1 practices or executes the "event X", the aforesaid certain specific information concerning the execution or practice of "event X" will be sent directly from "Application 2" 26c1 to "Application 1" 24c1 (that is, the aforesaid certain specific information will not be transmitted from Application 2 to the server 26c2 and from the server 26c2 to Application 1; the server 26c2 has been bypassed).

The transmission of the aforementioned certain specific information (concerning the practice by Application 2 of event X) directly from Application 2 to Application 1, without passing through and registering with the server, is an improvement over the Good et al disclosure of the prior art, referenced in the background section of this specification. Recall that, in the Good et al disclosure, all of the data to be communicated between concurrently executing computer program applications must be routed through an intervening server program or dispatcher program.

Figure 10A:
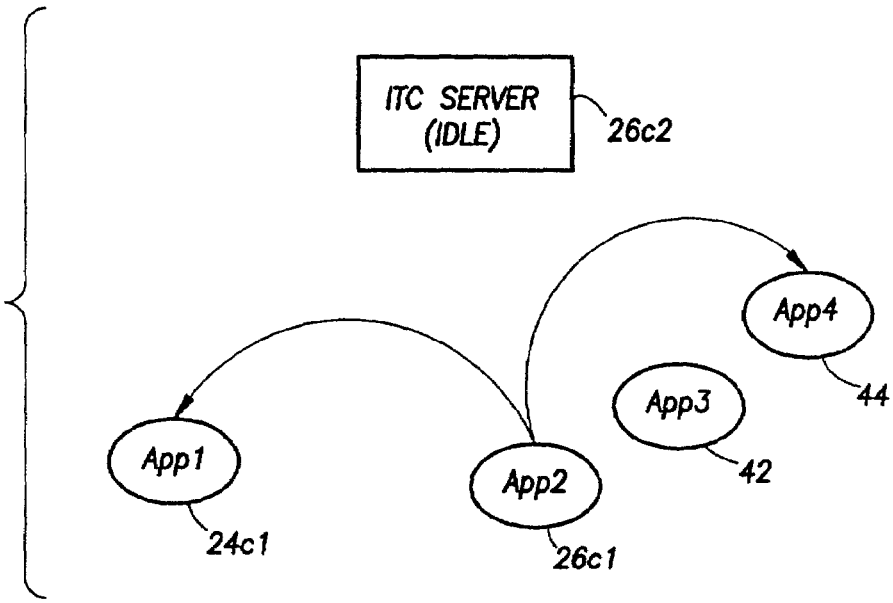
Figure 10B:
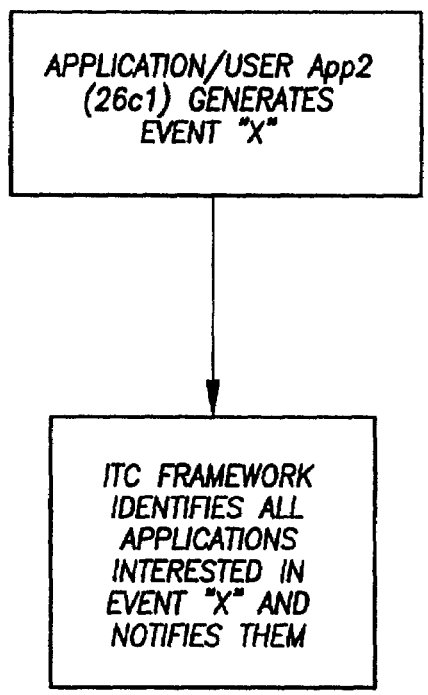

In FIGS. 10a-10b, a high level schematic depicting the multi-casting of event information from Application 2 to other multiple interested client applications is illustrated.

Referring briefly to FIGS. 8a-8b, recall that an interest object was sent from Application 1 24c1 to the server 26c2 via line 46 in FIG. 8a. Recall further that, when the interest object was received by the server 26c2, the server 26c2 registered, within itself, the interest from Application 1 24c1 in event X. The server 26c2 then re-distributed the interest object to: "Application 2" 26c1 via line 48, "Application 3" 42 via line 50, and "Application 4" 44 via line 52. However, now that the interest object, in "event X", was re-distributed from the server 26c2 to Applications 2, 3, and 4, if any one or all of Applications 2, 3, and/or 4 practice or execute the "event X", the responsible Application (2, 3, and/or 4) will transmit information concerning the "event X" directly back to the requestor, which is Application 1 24c1, without re-registering with or passing through the server 26c2 (the server 26c2 remains idle).

Therefore, in FIGS. 10a-10b, assume that the requestor of event X was both "Application 1" 24c1 and "Application 4" 44 (Application 1 and Application 4 both previously sent an interest object in "event X" to the server 26c2, and the server 26c2 redistributed that interest object in event X to Application 2). Therefore, Application 2 knows that Applications 1 and 4 are interested in receiving information concerning the practice of "event X". As a result, when "Application 2" 26c1 practices or executes the "event X", information concerning the execution of "event X" will be sent directly from Application 2 to both "Application 1" 24c1 and "Application 4" 44 (that information regarding the execution of event X will not re-register with or be routed through the server 26c2 and, as a result, the server 26c2 will be bypassed).

Figure 11A:
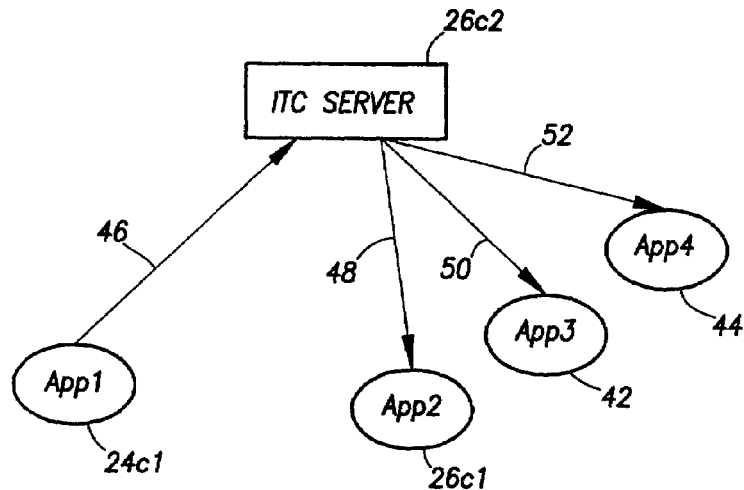
Figure 11B:
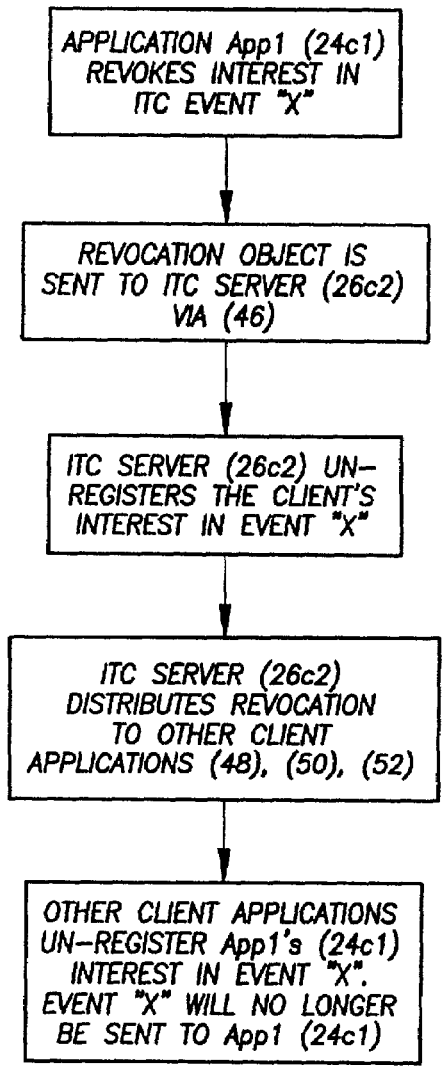

In FIGS. 11a-11b, a high level schematic showing "interest revocation" is illustrated. Assume that Client Application 1 24c1 (Application 1) previously registered an interest in event X with the server 26c2 (by sending an interest object to the server), and then the server 26c2 redistributed that interest object in event X to Client Application 2 26c1 (Application 2), Client Application 3 42 (Application 3), and Client Application 4 44 (Application 4). Then, assume that Application 1 wants to revoke its interest in "event X". In order to revoke its interest in "event X", the Application 1 will send a "revocation object" to the server 26c2 (via line 46 in FIG. 11), the "revocation object" representing Application 1's indication to other client applications that is no longer wants to receive any information concerning the practice or execution, by other applications, of the "event X". In response to the receipt of the revocation object, the server 26c2 un-registers, within itself, Application 1's interest in receiving information regarding the execution, by other client applications, of "event X" when event X is practiced by other applications. Then, the server 26c2 re-distributes the revocation object, originating from Application 1, to all the other client applications; that is, in FIG. 11a, the server 26c2 re-distributes the revocation object to Application 2 (via line 48), Application 3 (via line 50) and Application 4 (via line 52). When the other client applications (Applications 2, 3, and 4) receive the "revocation object", the other client applications (Applications 2, 3, and 4) will un-register Application 1's interest in "event X". As a result, information concerning the practice or execution, by the other Client Applications 2, 3, or 4, of event X, will no longer be sent to Application 1.

Figure 12A:
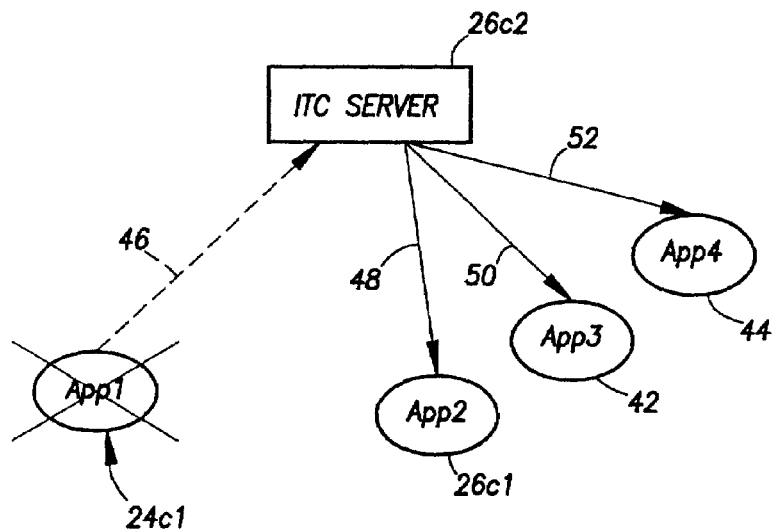
Figure 12B:
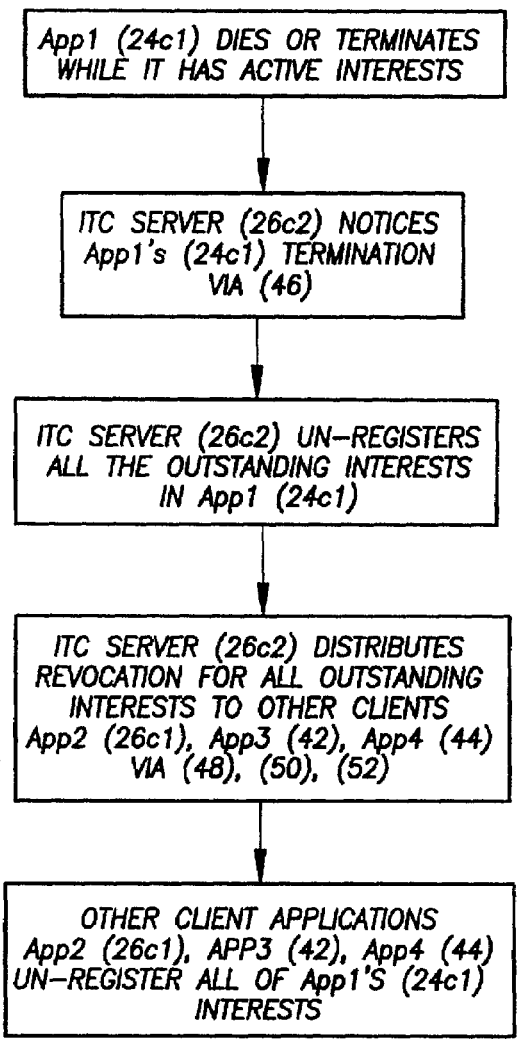

In FIGS. 12a-12b, a high level schematic of implicit interest revocation for a terminated client is illustrated. Assume that Application 1 24c1 dies or terminates while it has active interests outstanding. Recall that Application 1 has active interests outstanding because Application 1 previously transmitted an interest object in "event X" (and perhaps other events) to the server 26c2 and the server 26c2 previously redistributed that interest object in event X, and other events, to the other client applications, "Application 2" 26c1, "Application 3" 42, and "Application 4" 44. In FIGS. 12a-12b, if Application 1 dies or terminates, the server 26c2 will notice Application 1's termination. When the server 26c2 notices the termination of Application 1 24c1 (the Application 1 program ceases to execute), the server 26c2 will un-register, within itself, all of the outstanding interests which Application 1 previously sent to the server 26c2 (via line 46). Then, the server 26c2 will distribute a "revocation object" corresponding to all of Application 1's outstanding interests in all events to all other client applications, that is, to "Application 2" 26c1, "Application 3" 42, and "Application 4" 44 in FIG. 12. When the other client applications (Applications 2, 3, and 4) receive the revocation object from the server 26c2 associated with all of Application 1's outstanding interests in all events, the other client applications (Applications 2, 3, and 4 in FIG. 12) will un-register all of the interests in all events which "Client Application 1" 24c1 had previously transmitted to Applications 2, 3, and 4 via the server 26c2.

Figure 13A:
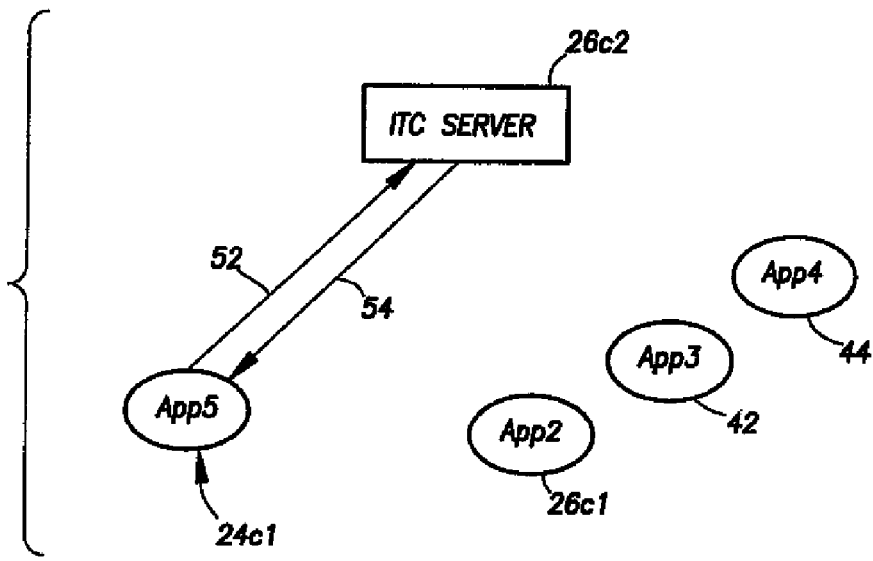
Figure 13B:
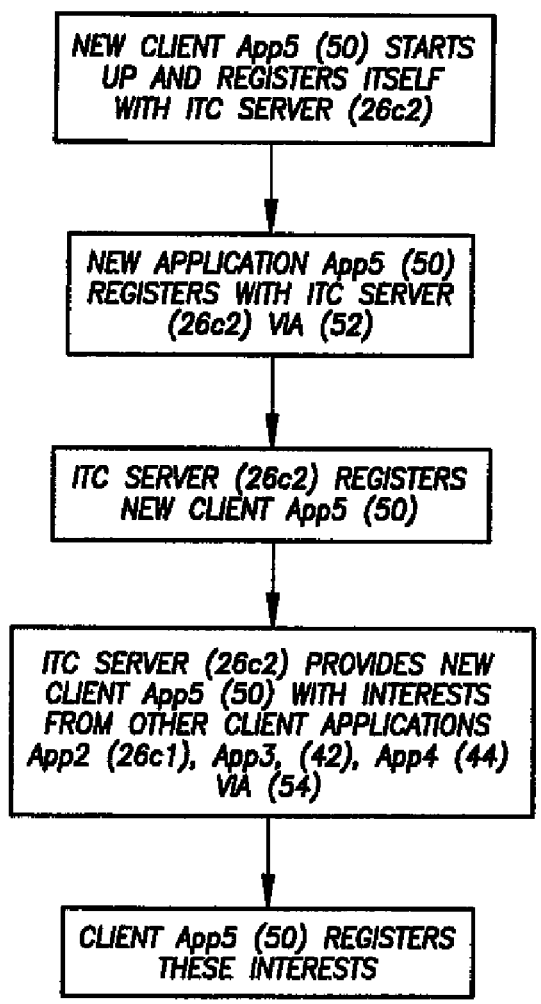

In FIGS. 13a-13b, a high level schematic showing the distribution of outstanding interests in a new client application is illustrated. Assume now that a new client application, "Client Application 5" 50 ("Application 5"), in FIG. 13a, begins execution in a workstation in the network of workstations, similar to the workstation 10 of FIG. 1. When the Application 5 program executes, a window would be displayed on the workstation similar to the window displays 12b of FIG. 1. When Application 5 begins to execute, Application 5 will register itself with the server 26c2 in FIG. 13 by sending a "registration signal" (via line 52 in FIG. 13) from the "Application 5" 50 to the server 26c2. In response to the "registration signal", the server 26c2 will register, within itself, the existance of the new client application, "Application 5" 50. Assume now that "Application 2" 26c1, "Application 3" 42, and "Application 4" 44 in FIG. 13 previously sent to the server 26c2 an "interest object" in an event, called "event X", and perhaps other events. In that case, after the server 26c2 registers within itself the existance of the new client "Application 5", the server 26c2 will redistribute the interest objects originating from all the other client applications (Applications 2, 3, and 4) to the new client "Application 5" (via line 54 in FIG. 13a). In the example of FIG. 13a, the server 26c2 will redistribute to Application 5: (1) the Application 2's previously expressed interest in event X and other events, (2) the Application 3's previously expressed interest in event X and other events, and (3) the Application 4's previously expressed interest in event X and other events (hereinafter called "previously expressed interests"). When new client "Application 5" 50 receives the previously expressed interests (i.e.—the interest objects) in event X and other events (which originated from Application's 2, 3, and 4) from the server 26c2, the "Application 5" will register, within itself, the previously expressed interests. When such previously expressed interests (i.e.—the interest objects) from Applications 2, 3, and 4 are registered within Application 5, the Application 5 will know that Applications 2, 3 and 4 require certain specific information regarding the execution and/or practice of the "event X" and other events. As a result, when the event X or other events are executed by Application 5, the Application 5 will send that certain specific information directly to Applications 2, 3, and 4 (that certain specific information will not pass through and register with the server 26c2 like it did in the Good et al disclosure).

Referring to FIGS. 14 through 25, a detailed discussion and a functional operation of the Operator Interaction Display Software 32d of FIG. 5 is illustrated.

In the above paragraphs, the functional operation of the ITC Framework 34 in FIG. 4 was discussed in connection with the client 1 application software and the client 2 application software 24c1 and 26c1 stored in the workstations of FIG. 3. Recall that the ITC Framework 34 of the client application 1 24c1 in FIG. 6 sent any requests for event information (associated with "event X") to the server 26c2, whereupon the server 26c2 sent that request for event information to client application 2 26c1. However, when the client application 2 practices or executes the "event X", the event information associated with event X was sent directly from client application 2 to client application 1 (via line 40 in FIG. 6) without passing through or registering with the server 26c2.

However, the operator sitting at the second workstation 26 in FIG. 3 can decide how much, if any, of the event information associated with "event X" will be transmitted from the second workstation 26, and the operator sitting at the first workstation 24 in FIG. 3 can decide how much, if any, of the event information associated with "event X" will be received in the first workstation 24.

The operators can make that decision and act upon that decision by utilizing certain "icons" which appear within each window display (12b of FIG. 1) on the display screen (12a of FIG. 1) of their particular workstation (10 of FIG. 1).

For example, the operator at a workstation can click on a first icon and enable the transmission or reception of all event information to and from his client application, or the operator can click on a second icon and completely disable the transmission or reception of all event information to or from his client application, or the operator can click on a third icon and selectively choose how much of what kind of event information will be transmitted from or received into his client application.

The following paragraphs will describe each icon and its function. The icons will appear at the bottom right hand corner of each window display (12b of FIG. 1) on the display screen (12a of FIG. 1) of the workstation 10. There are three main types of icons: the status icon 60, the broadcast icon 62, and the event filter icon 64. There are three types of status icon: the open state icon 60a, the closed state icon 60b, and the locked state icon 60c.

Figure 14:
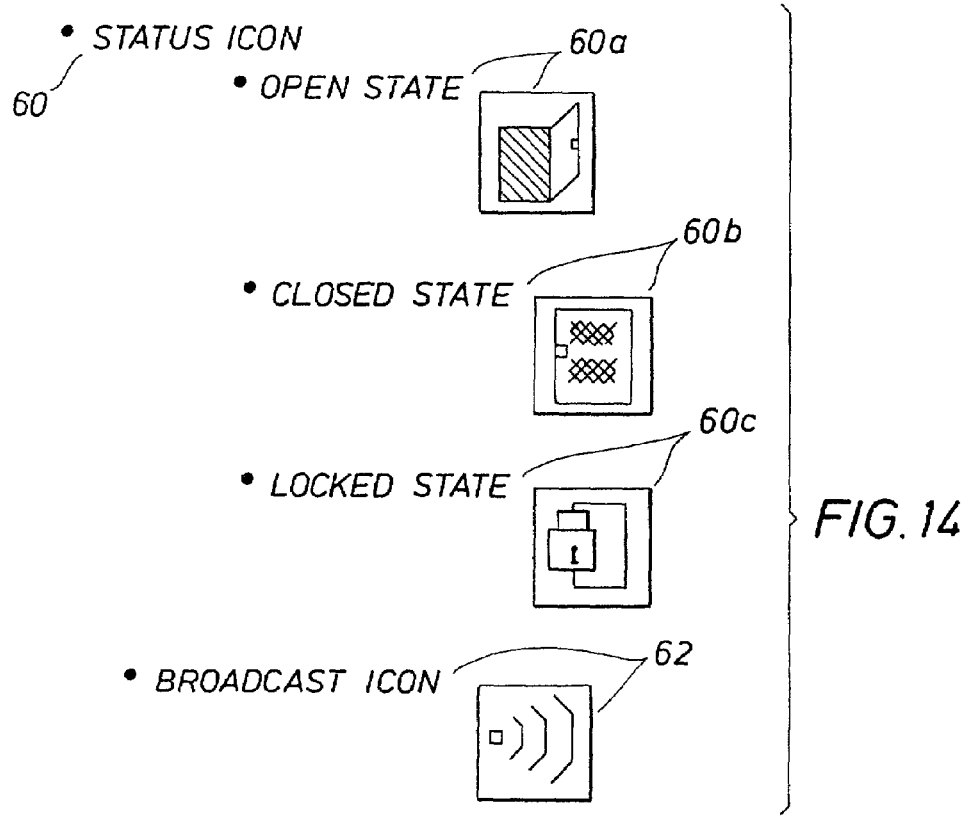

In FIG. 14, the status icons 60 and the broadcast icon 62 are illustrated. The status icons 60 include the open state status icon 60a, the closed state status icon 60b, and the locked state status icon 60c. Each of these icons will be discussed below.

Open State Status Icon 60a of FIG. 14

The open state status icon 60a is accessible to an operator and it will appear on the bottom right hand corner of a window display (similar to window display 12b of FIG. 1). The operator sitting at a workstation (like workstation 24 or 26 in FIG. 3) would locate a window display (12b of FIG. 1) on the display screen (12a of FIG. 1) and click on the open state status icon 60a which appears at the bottom right hand corner of the window display 12b. When the operator clicks on the open state status icon 60a of a window display 12b for a particular client application, that particular client application is open and it will receive all event information from other client applications; furthermore, that particular client application is open and it will transmit all event information to other client applications. For example, an operator may change a font size (which is an "event" that generates "event information"). If the open state status icon 60a is clicked "on" by the operator for a particular client application program, the font size change event information will be transmitted to all the other interested client applications that requested the font size change event information (via an interest object in the font size change event sent from the other client applications to the particular client application by way of the intervening server).

For example, if an operator sitting at the workstation 24 of FIG. 3 clicks on the open state status icon 60a on the window display 12b of FIG. 1 for the client 1 application 24c1 of FIG. 3, the client 1 application 24c1 will receive all requested event information from the client 2 application 26c1 of FIG. 3, and the client 1 application will transmit all requested event information to the client 2 application 26c1.

Closed State Status Icon 60b of FIG. 14

The closed state status icon 60b is accessible to an operator and it will appear on the bottom right hand corner of a window display (similar to window display 12b of FIG. 1). The operator sitting at a workstation (like workstation 24 or 26 in FIG. 3) can locate a window display (12b of FIG. 1) on the display screen (12a of FIG. 1) and click on the closed state status icon 60b which appears at the bottom right hand corner of the window display. When the operator clicks on the closed state status icon 60b of a window display 12b for a particular client application, that particular client application is closed and it will not receive any event information from other client applications, and that particular client application is closed and it will not transmit any event information to other client applications.

For example, if an operator sitting at the workstation 24 of FIG. 3 clicks on the closed state status icon 60b on the window display 12b of FIG. 1 for the client 1 application 24c1 of FIG. 3, the client 1 application 24c1 will not receive any requested event information from the client 2 application 26c1 of FIG. 3, and the client 1 application will not transmit any requested event information to the client 2 application 26c1.

Locked State Status Icon 60c

The locked state status icon 60c is accessible to both an operator and to the programmer of a particular client application. The locked state status icon 60c will appear at the bottom right hand corner of a window display (12b of FIG. 1) of the particular client application. In some cases, the operator at a workstation may click "on" the open state status icon 60a in a window display 12b for the particular client application. However, the application programmer may have previously decided that, for the aforementioned particular client application, absolutely no event information can be transmitted from or received in that particular client application. As a result, the application programmer, that programmed the particular client application, may have required (internally within the particular client application code) that the particular client application be closed (as if the closed state status icon 60b were clicked "on"). In that event, the locked state status icon 60c will appear to click "on", by itself, in response to the requirement to close the particular client application, which requirement would be placed inside the particular client application code. An unstable state could cause the locked state status icon 60c to automatically click "on".

However, the operator could also click "on" the locked state status icon 60c. When the locked state status icon 60c is clicked "on", this is equivalent to clicking "on" the closed state status icon 60b. That is, when the locked state status icon 60c is clicked "on", event information will not be received by a particular client application from other client applications (via line 40 in FIG. 6), event information will not be sent from the particular client application to other client applications, and an interest object associated with a particular event will not be send by the particular client application to the server 26c2 (via line 36 in FIG. 6) for further transmission to other client applications (via line 38 in FIG. 6).

Broadcast Icon 62

The broadcast icon 62 will appear at the bottom right hand corner of a particular window display (12b of FIG. 1) which is generated by a particular client application program, such as client 1 or client 2 of FIG. 3, executing within a workstation (10 of FIG. 1). Assume that, for that particular client application program, the closed state status icon 60b has been clicked "on" for a period of time. A plurality of newly created events (such as, changes to font size, changes to color, or dashed lines) which were generated during that period of time will not be transmitted by the particular client application to other interested client applications executing in the subject workstation or other workstations in the network of workstations. However, when the broadcast icon 62 is clicked "on" within the window display (12b) by an operator sitting at the workstation (10 of FIG. 1) using the mouse (18 of FIG. 1), all of the plurality of newly created events in the particular client application (12b), which were generated by an operator at the workstation 10 during the aforementioned period of time when the closed state status icon 60b was clicked "on", will be transmitted simultaneously from the particular client application to all other "interested client applications" executing in the network of workstations (the wards "interested client applications" indicating that "interest objects" in the newly created events were previously transmitted from the other client applications to the server 26c2 and from the server 26c2 to the particular client application).

In FIGS. 15a through 15e, the Event Filter icon 64 is illustrated. The event filter icon 64 will be discussed in the following paragraph.

Event Filter Icon 64

In FIG. 5, recall that each client application, such as the client 1 application 24c1 and the client 2 application 26c1 of FIG. 3, include an ITC-HI Setup software 32a (FIG. 5). The ITC-Setup software 32a includes a coded and stored "list of events" and a "list of functions" corresponding, respectively, to the "list of events" (this list of events and corresponding list of functions will be discussed in greater detail in this specification with reference to FIG. 26 of the drawings).

Therefore, when a particular client application (such as the client 1 or client 2 application of FIG. 3) sends an interest object in an "event X" to another client application via the server 26c2 for the purpose of receiving event information from the other client applications regarding the practice of that event X, the "event X" must, of necessity, be one of the events in the "list of events" (of FIG. 26) coded within the ITC Setup Software 32a of FIG. 5 for that particular client application.

Similarly, if a particular client application intends to send "event information" to other client applications that is associated with the practice by the particular client application of a "particular event", that "particular event" must be one of the events stored in the "list of events" (of FIG. 26) coded within the ITC Setup Software 32a of FIG. 5 for that particular client application.

Consequently, since each particular client application is said to be "interested" in receiving a plurality of "event information" associated with a plurality of events from other client applications, the plurality of events are stored in the "list of events" coded within the ITC Setup software 32a (see FIG. 26 for the "list of events") for said each particular client application. Similarly, since each particular client application will send "event information" associated with a plurality of events to other interested client applications, those plurality of events are stored in the "list of events" coded within the ITC Setup software 32a.

However, by using the "Event Filter" icon 64 of FIG. 15, an operator or user, monitoring the particular client application on a window display (12b of FIG. 1) at his workstation (10 of FIG. 1), can selectively decide how many of the plurality of events in the list of events coded within the ITC Setup software 32a he will transmit to other client applications via the server 26c2 and how many of the plurality of events in the list of events coded within the ITC Setup software 32a he will receive from the other client applications via the server 26c2.

In FIGS. 15a through 15e, the event filter icon 64 of FIGS. 15a and 15b will be located at the bottom right hand corner of each window display (12b) on the display screen (12a) of a workstation (10). As shown in FIG. 15b, when the operator at the workstation (10) uses the mouse 18 to click "on" the event filter 64 which appear on a window display 12b, a subwindow display 64a shown in FIG. 15c will be presented to the operator on the display screen (12a).

In FIG. 15c, the subwindow display 64a (which appears on the display screen 12a of the workstation 10 when the event filter icon 64 in a window display 12b for a particular client application is clicked "on" by an operator) includes three columns: (1) the send column 64a1, (2) the receive column 64a2, and (3) the message or event column 64a3. A plurality of messages or events 64a3A are printed under the message column 64a3. These plurality of messages or events 64a3A represent a plurality of events for which: (1) a corresponding plurality of event information could be received from other client applications, and (2) a corresponding plurality of event information could be sent or transmitted to other client applications. A plurality of send boxes 64a1A appear under the send column 64a1, and a plurality of receive boxes 64a2A appear under the receive column 64a2. For each of the plurality of messages 64a3A, there is one send box 64a1A and one receive box 64a2A. An operator would use the mouse 18 of FIG. 1 to click within a send box and/or a receive box for each of the plurality of events 64a3A.

If the operator clicked within a send box 64a1A for a particular message or event (one of events 64a3A in FIG. 15c) for a particular client application, "event information" associated with that particular event will, in fact, be sent from the particular client application to the other client applications that registered an interest in the particular event with the particular client application; however, if the operator did not click within the send box 64a1A for that particular event 64a3A for that particular client application, "event information" associated with that particular event 64a3A will not be sent from the particular client application to the other client applications that registered an interest in the particular event with the particular client application.

In addition, If the operator clicked within a receive box 64a2A for a particular message or event 64a3A for a particular client application, "event information" associated with that particular event 64a3A will, in fact, be received from other client applications in response to the registry by the particular client application with the other client applications in that particular event; however, if the operator did not click within the receive box 64a2A for that particular event 64a3A for that particular client application, "event information" associated with that particular event 64a3A will not be received from the other client applications in response to the registry by the particular client application with the other client applications in that particular event.

In FIGS. 15d and 15e, consider the examples of the use of the event filter 64 and the subsequent use of the subwindow display 64a for that event filter 64 illustrated in FIGS. 15d and 15e.

In the example of FIG. 15d, four events appear under the events column 64a3 of the subwindow display 64a of the event filter 64 (appearing in a window display 12b on the display screen 12a of a workstation 10 for a particular client application): (1) change color, (2) change thickness, (3) change shape, and (4) cursor tracking. Note, for each of these events, whether the send boxes 64a1A and/or the receive boxes 64a2A are clicked "on" (by placing a black mark in the box).

In FIG. 15d, taking each event in order, for the "change color" event of FIG. 15d, the send box 1A1 is not clicked, and the receive box 2A1 is not clicked. As a result, for the "change color" event for the particular client application, event information for the "change color" event will not be transmitted to other client applications, and event information for the "change color" event will not be received from other client applications.

In FIG. 15d, for the "change thickness" event, the send box 1A2 is clicked, but the receive box 2A2 is not clicked. As a result, for the "change thickness" event for the particular client application, event information for the "change thickness" event will be transmitted to other client applications, but event information for the "change thickness" event will not be received from other client applications.

In FIG. 15d, for the "change shape" event, the send box 1A3 is not clicked, but the receive box 2A3 is clicked. As a result, for the "change shape" event for the particular client application, event information for the "change shape" event will be not transmitted to other client applications, but event information for the "change shape" event will be received from other client applications.

In FIG. 15d, for the "cursor tracking" event, the send box 1A4 is clicked, and the receive box 2A4 is clicked. As a result, for the "cursor tracking" event for the particular client application, event information for the "cursor tracking" event will be transmitted to other client applications, and event information for the "cursor tracking" event will be received from other client applications.

However, in the example of FIG. 15e, the same four events appear under the events column 64a3 of the subwindow display 64a of the event filter 64 (appearing in a window display 12b on the display screen 12a of a workstation 10 for a particular client application): (1) change color, (2) change thickness, (3) change shape, and (4) cursor tracking. The subwindow display 64a in FIG. 15e further includes an "all" box 64a4 under the "send" column 64a1 and another "all" box 64a5 under the "receive" column 64a2. When an "all" box is clicked "on", each of the individual (send or receive) boxes above the "all" box will be clicked "on"; however, if the "all" box is not clicked "on", each of the individual boxes above the "all" box must be individually clicked "on" or "off". For example, note that the "all" box 64a5 under the receive column 64a2 is clicked "on", but the "all" box 64a4 under the send column 64a1 is not clicked "on". Since the "all" box 64a5 under the receive column 64a2 is clicked "on", all of the receive boxes 2A1, 2A2, 2A3, and 2A4 in the subwindow display 64a in FIG. 15e are clicked "on". However, since the "all" box 64a4 under the "send" column 64a1 is not clicked "on", each of the individual boxes 1A1, 1A2, 1A3, and 1A4 must be individually clicked as either "on" or "off". As a result, in FIG. 15e, the "change color" event will not be sent from the particular client application to other client applications but it will be received by the particular client application from other client applications. In addition, the "change thickness" event will be sent from the particular client application to other client applications and it will be received by the particular client application from the other client applications. The "change shape" event will not be sent by the particular client application to other client applications, but it will be received by the particular client application from other client applications. The "cursor tracking" event will be sent by the particular client application to the other client applications and it will be received by the particular client application from the other client applications.

The functional operation of the event filter 64 and its subwindow 64a will be set forth again below in connection with a discussion of FIG. 26 and the functional operation of the present invention.

In FIGS. 16 through 23, examples of the use of all the icons of FIGS. 14 and 15a, including the open state icon 60a, the closed state icon 60b, the locked state icon 60c, the broadcast icon 62, and the event filter icon 64, are illustrated.

Figure 16:
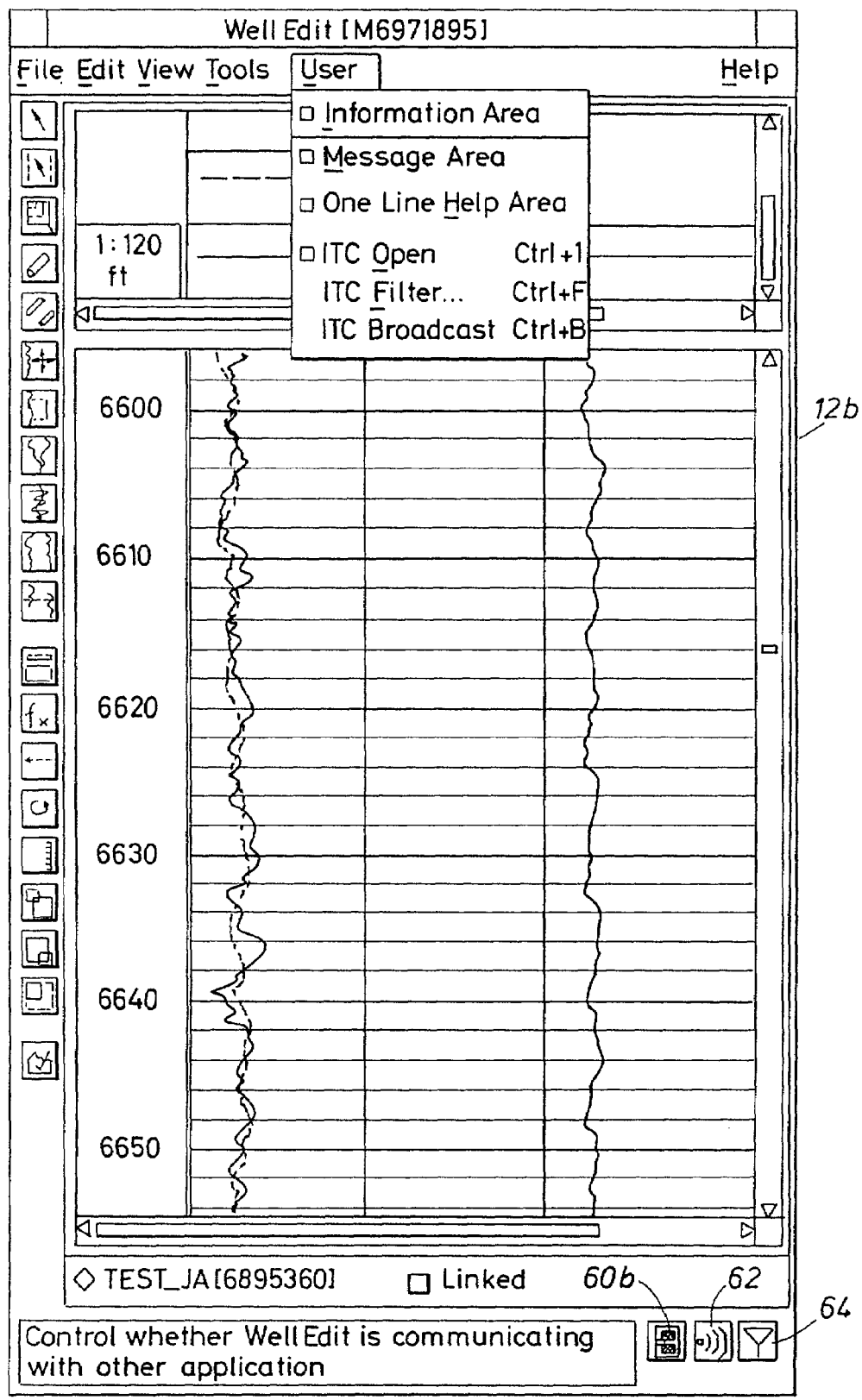

In FIG. 16, a window display, which could be one of the window displays 12b of FIG. 1, has a group of icons in the bottom right hand corner of the window display, the icons including a closed state status icon 60b, a broadcast icon 62, and an event filter 64.

In FIG. 17, another window display 12b has a closed state status icon 60b and a broadcast icon 62 in the bottom right hand corner of the window display 12b.

Figure 18:
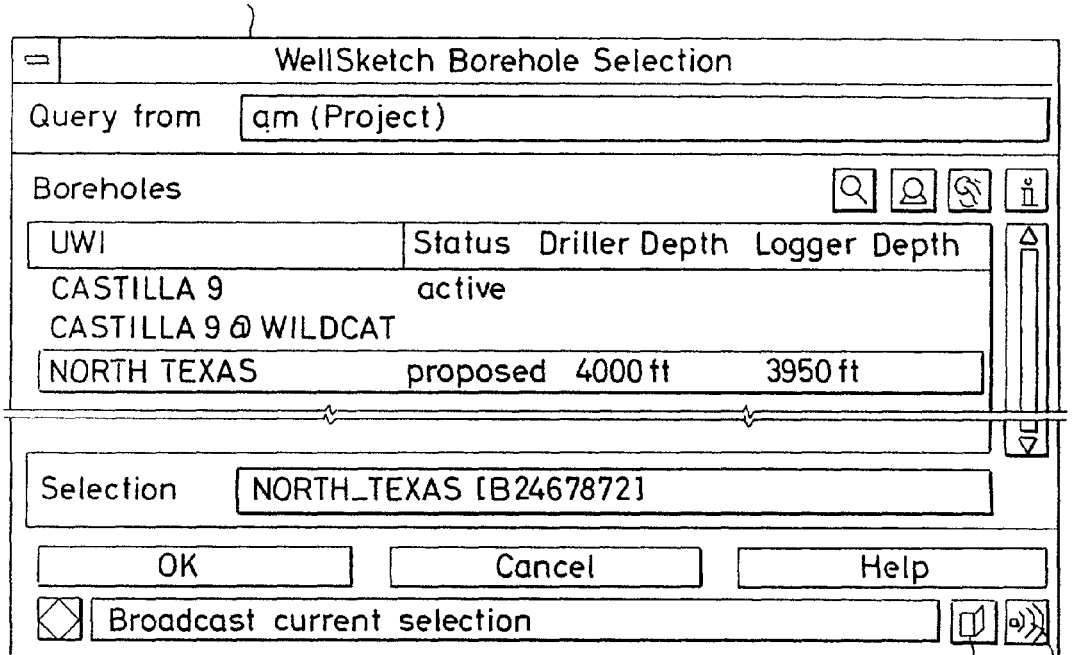

In FIG. 18, another window display 12b has an open state status icon 60a and a broadcast icon 62 in the bottom right hand corner of the window display 12b.

Figure 19:
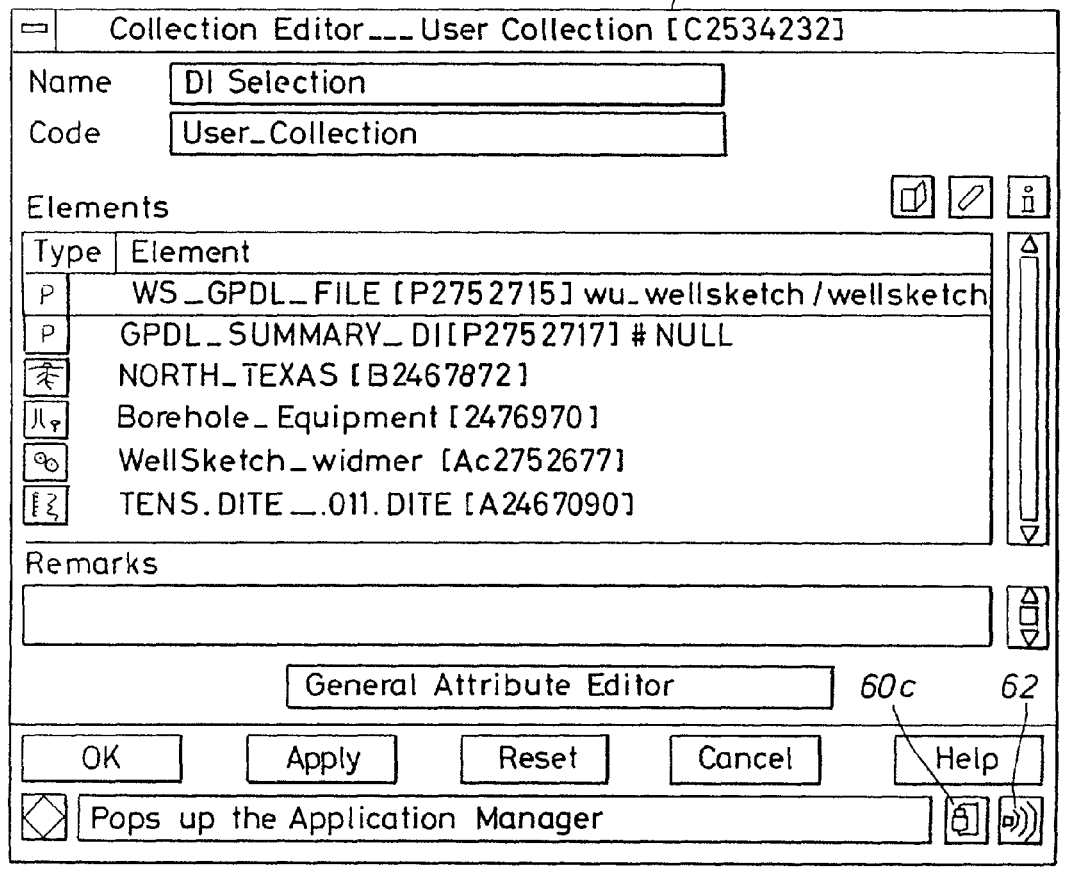

In FIG. 19, another window display 12b has a locked state status icon 60c and a broadcast icon 62 in the bottom right hand corner of the window display 12b.

Figure 20:
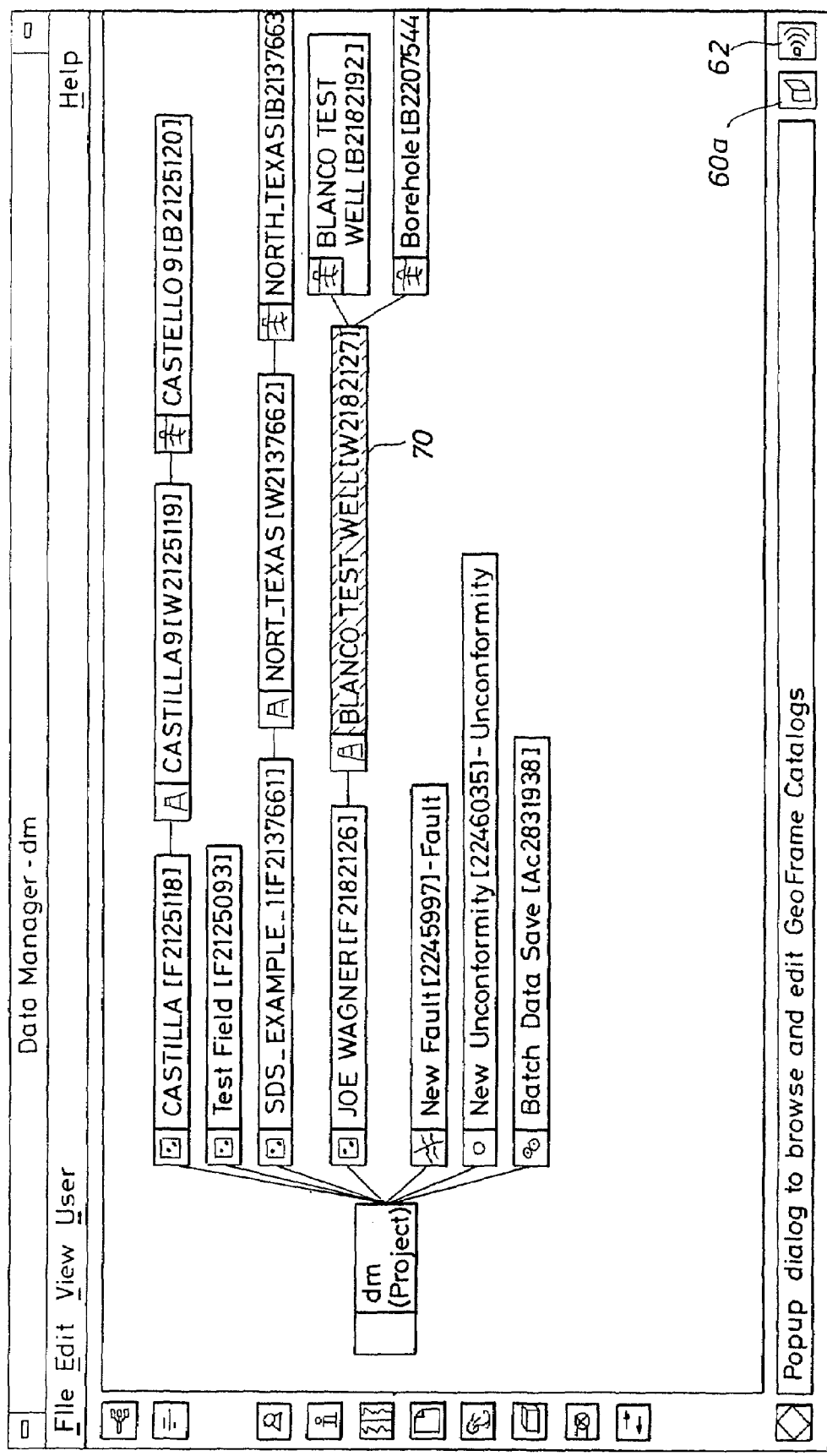
Figure 21:
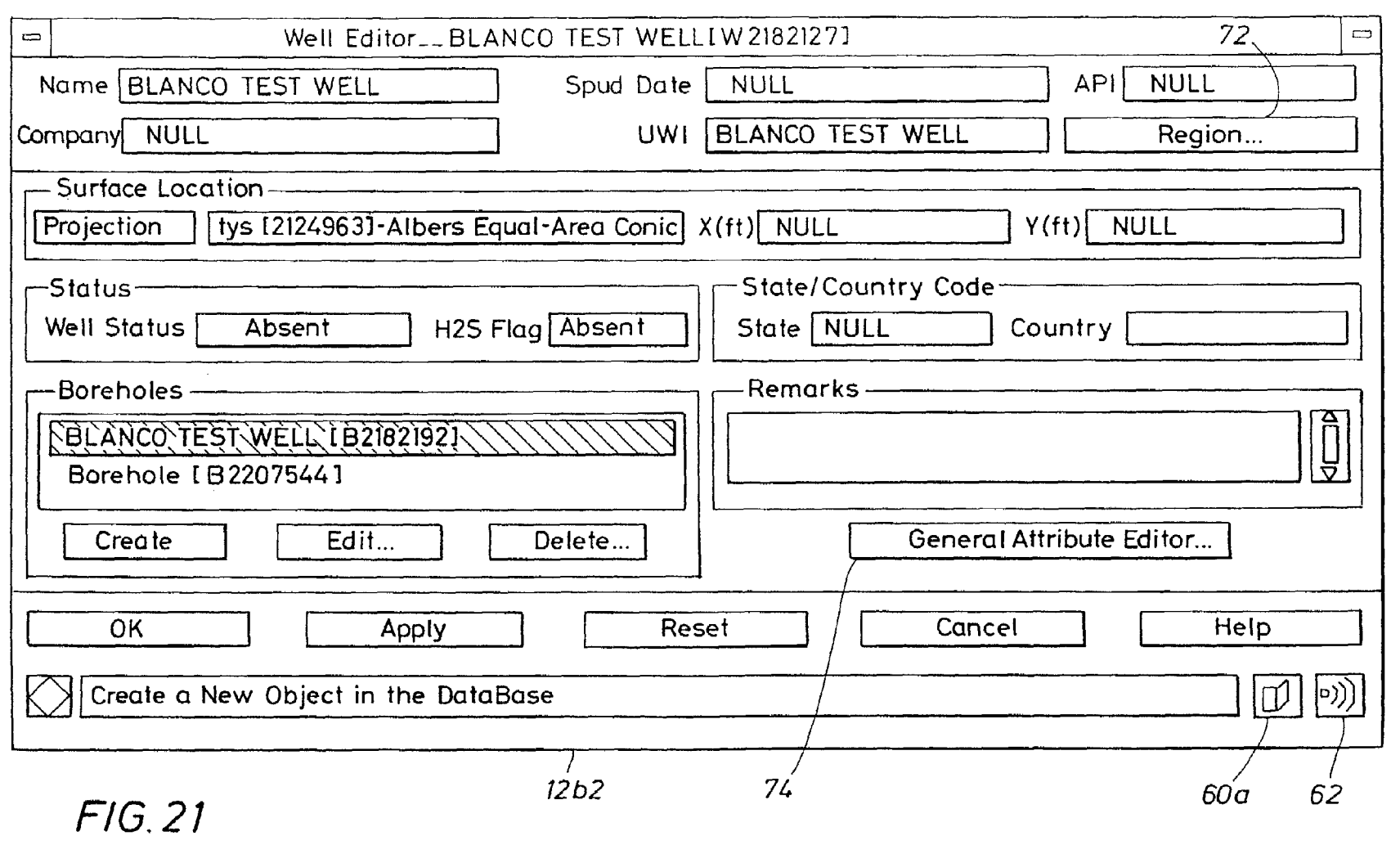
Figure 22:
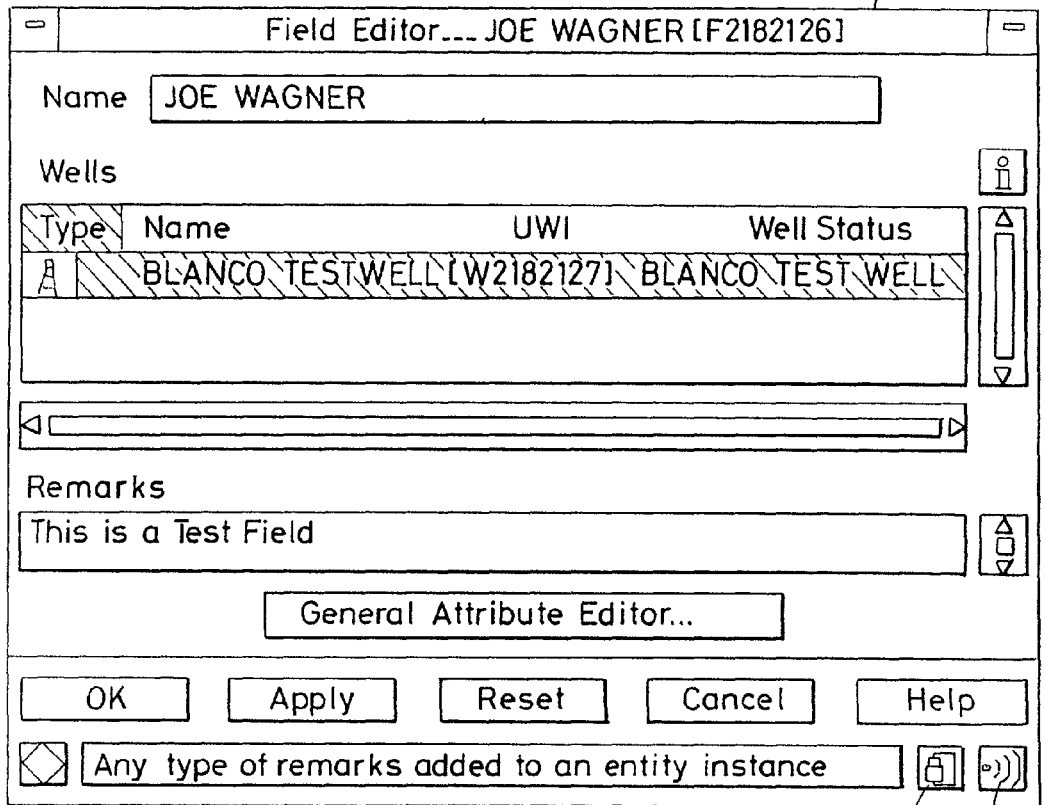
Figure 23:
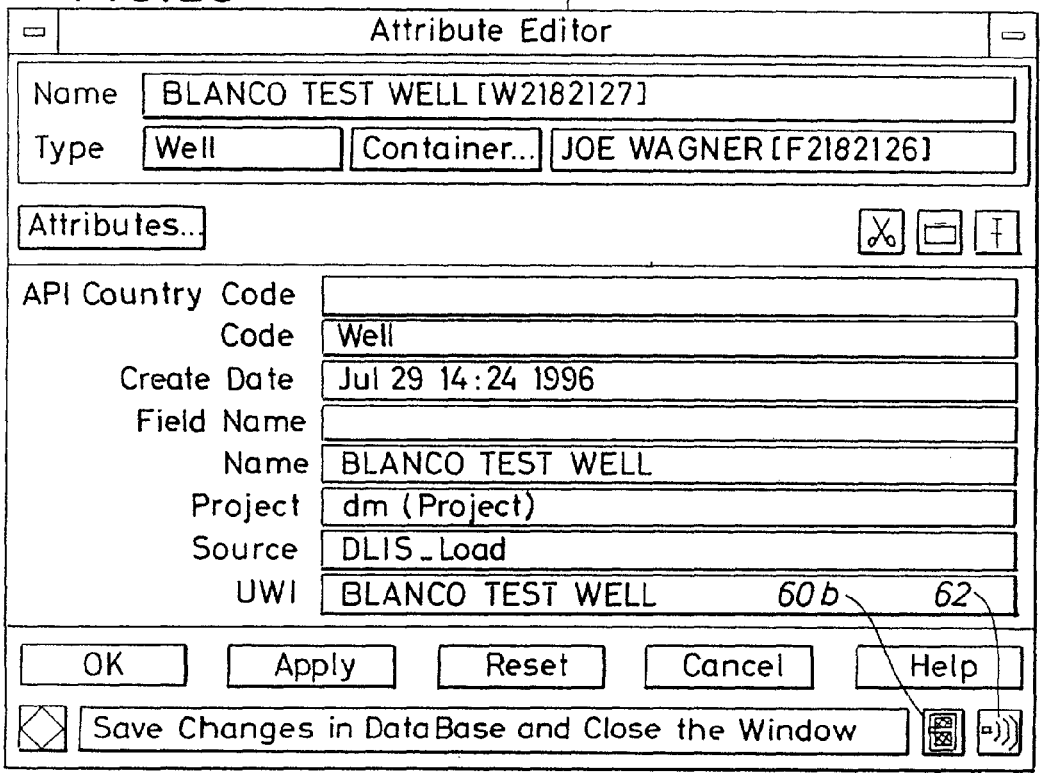

In FIGS. 20 through 23, referring initially to FIG. 20, an operator will view a master window 12b1 on the display screen 12a of FIG. 1 and, by using the mouse 18 of FIG. 1, the operator can subsequently obtain a number of sub-windows shown in FIGS. 21, 22, and 23. For example, the master window 12b1 of FIG. 20 includes an open state status icon 60a and a broadcast icon 62 in the bottom right hand corner of the window. However, the master window 12b1 of FIG. 20 also includes a box 70. If the operator uses the mouse 18 to click on the box 70 in the master window 12b1 of FIG. 20, in addition to the master window 12b1, a first sub-window 12b2 shown in FIG. 21 will be presented to the operator on the display screen 12a of the workstation 10 of FIG. 1. The first sub-window 12b2 includes an open state status icon 60a and a broadcast icon 62 in the bottom right hand corner of the first sub-window 12b2. The first sub-window 12b2 includes a second box 72 and a third box 74. If the operator uses the mouse 18 to click on the second box 72 in the first sub-window 12b2 of FIG. 21, a second sub-window 12b3 shown in FIG. 22 will be presented to the operator on the display screen 12a of the workstation 10 of FIG. 1. The second sub-window 12b3 includes a locked state status icon 60c and a broadcast icon 62 in the bottom right hand corner of the second sub-window 12b3. If the operator uses the mouse 18 to click on the third box 74 in the first sub-window 12b2 of FIG. 21, a third sub-window 12b4 shown in FIG. 23 will be presented to the operator on the display screen 12a of the workstation 10 of FIG. 1. The third sub-window 12b4 includes a closed state status icon 60b and a broadcast icon 62 in the bottom right hand corner of the third sub-window 12b4.

The above paragraphs have discussed the structure and function of the status icons which includes the open state status 60a, the closed state status icon 60b, and the locked state status icon 60c, in addition to the broadcast icon 62 and the event filter icon 64. Each of these icons would appear on the bottom right hand corner of a window 12b of FIG. 1. However, there is one additional icon to be disclosed, called the "Raised Application Manager Event" icon, that would appear on the bottom left hand corner of the window display 12b of FIG. 1 (not the right hand corner where the other icons discussed above appear). The "Raised Application Manager Event" icon is discussed in detail, as follows.

Raised Application Manager Event Icon 76

In FIGS. 1, 24 and 25, each of the windows 12b of FIG. 1 include a "Raised Application Manager Event" icon 76 (of FIG. 24) which is located in the bottom left hand corner of the window 12b. For example, one of the windows 12b of FIG. 1 could include the window 12b5 of FIG. 24.

In FIG. 24, the window 12b5 includes the Raised Application Manager Event icon 76 in the bottom left hand corner of the window 12b5. Assume now that a multitude of windows 12b are being presented to the operator on the display screen 12a of the workstation 10 of FIG. 1. Assume further that the operator wants to access a particular client application from the workstation 10; however, the multitude of windows 12b on the display screen 12a is obscuring the display screen 12a and, as a result, it is very difficult for the operator to access the particular client application.

In FIGS. 1 and 24, order to access the particular client application, the operator will find the "Raised Application Manager Event" icon 76 in the bottom left hand corner of any window 12b on the display screen 12a of FIG. 1 One of the windows 12b of FIG. 1 could include the window 12b5 of FIG. 24. The window 12b5 of FIG. 24 includes the "Raised Application Manager Event" icon 76 in the bottom left hand corner and a locked state status icon 60c and a broadcast icon 62 in the bottom right hand corner of the window 12b5. Using the mouse 18, the operator clicks "on" the Raised Application Manager Event icon 76 of FIG. 24. In response, a main launch window 12b6, illustrated in FIG. 25, is displayed on the display screen 12a of the workstation 10 of FIG. 1.

In FIGS. 2 and 25, the main launch window 12b6 of FIG. 25 includes a plurality of different client application icons 78 representing a respective plurality of different client application programs. The workstation 10 of FIG. 1 will execute any particular one of the different client application programs if and when the operator at the workstation 10 of FIG. 1 uses the mouse 18 to click "on" the client application icon 78 of FIG. 25 which corresponds to that particular client application program. See, for example, the different client applications 20 shown in FIG. 2. Each of the plurality of different client applications 78 shown in FIG. 25 could represent one of the plurality of client applications 20 shown in FIG. 2.

Figure 26:
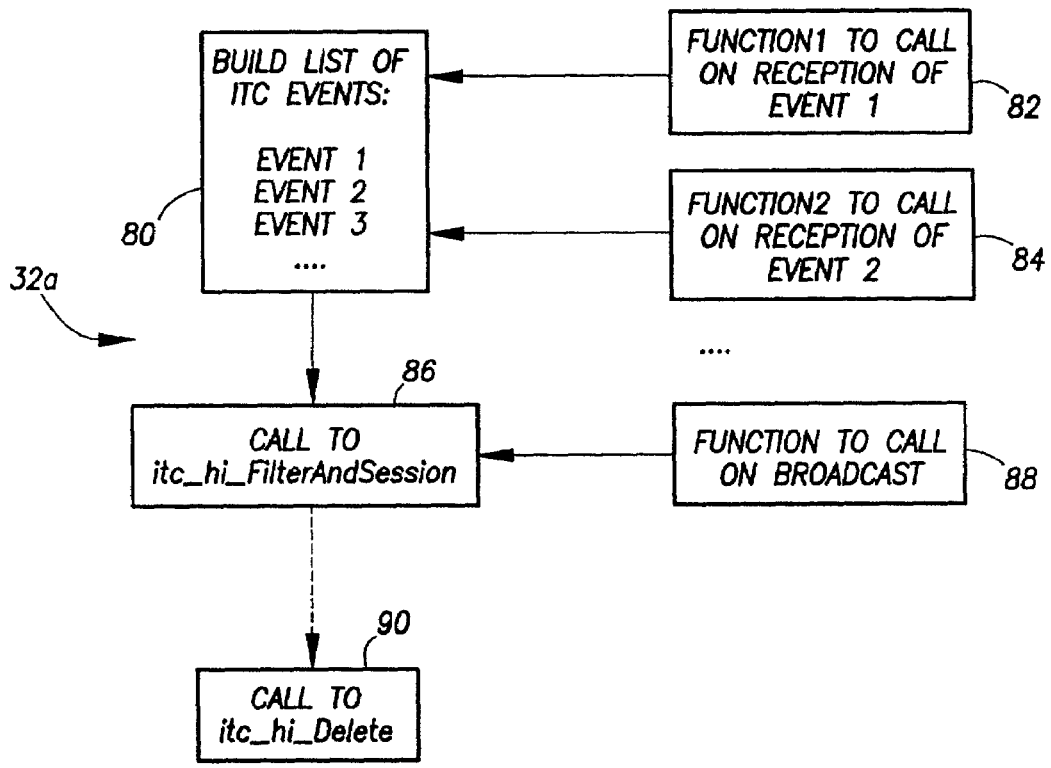
Figure 26A:
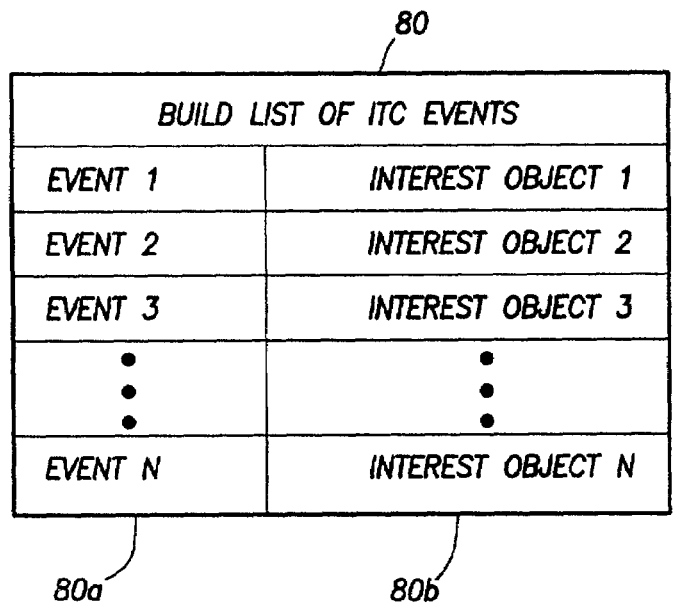
FIG. 26A illustrates a detailed construction of the "Build List of ITC Events" 80 which is illustrated in FIG. 26.

Referring to FIGS. 26, 26A, and 27, a detailed construction and a functional operation of the ITC HI Setup software 32a of FIG. 5 is illustrated.

In FIG. 26, the ITC HI Setup Software 32a of FIG. 5 includes (but is not limited to) the following blocks of code:
(1) "Build List of ITC Events" 80,
(2) "Function 1 to call on reception of Event 1" 82,
(3) "Function 2 to call on reception of Event 2" 84,
(4) "Call to itc_hi_Filter And Session" 86,
(5) "Function to call on Broadcast" 88, and
(6) "Call to itc_hi_Delete" 90.

The "Build List of ITC Events" 80 block of FIG. 26 is illustrated in greater detail in FIG. 26A.

Each of these blocks of code is discussed below.

Build List of ITC Events 80

Function 1 to Call on Reception of Event 1 82

Function 2 to Call on Reception of Event 2 84

In FIGS. 3, 4, 5, and 6 recall from FIGS. 3 and 4 that the client 1 application 24c1 was stored in the memory 24c of the first workstation 24 of FIG. 3 and the client 2 application 26c1 was stored in the memory 26c of the second workstation 26 of FIG. 3. The client 1 application 24c1 and the client 2 application 26c1 each include: (1) the ITC Human Interface Code 32, and (2) the ITC Framework (ITC-Core) Code 34 of FIG. 4. The ITC Framework (ITC-Core) Code 34 was discussed above with reference to FIGS. 6 through 13. The ITC Human Interface Code 32 of FIG. 4 includes four parts: the ITC HI Setup software 32a of FIG. 5, the Send An Event software 32b of FIG. 5, the Receive An Event software 32c of FIG. 5, and the Operator Interaction Display Software 32d of FIG. 5.

When the client 1 application 24c1 wants to receive "event information" regarding "event X" from the client 2 application 26c1, the client 1 application 24c1 will send an "interest object" in event X to the server 26c2 in FIGS. 3 and 6. In response to the receipt by the server 26c2 of the "interest object" in event X from client 1, the server 26c2 will: (1) register within itself the client 1's interest in event X, and (2) redistribute that interest object in event X from the server 26c2 to the client 2 application 26c1. When the client 2 application 26c1 practices or executes the event X, the event information associated with the practice of event X in client 2 will be sent directly from client 2 to client 1 (via line 40 in FIG. 6) without passing through and registering with the server 26c2.

Similarly, the client 2 application 26c1 of FIG. 3 will send an interest object in event X to the server 26c2, and the server 26c2 will: (1) register within itself client 2's interest in the event information associated with event X, and (2) send the interest object in event X to the client 1 application 24c1. When the client 1 application 24c1 practices or executes the event X, the event information associated with the event X will be sent directly by client 1 24c1 to client 2 26c1 (via line 40 in FIG. 6) without passing through and registering with the server 26c2.

Therefore, each client application program, including the client 1 application 24c1 and the client 2 application 26c1 of FIG. 3, must record and store within itself the identity of all of the specific events (such as "event X"), as well as their interest objects and their functions, in which that particular client application is interested.

In FIG. 26, each particular client application program, including the client 1 application 24c1 and the client 2 application 26c1 of FIG. 3 which generated two of the window displays 12b of FIG. 1, stores within itself a "list of ITC events" 80, a "list of functions" 82, 84 corresponding, respectively, to the "list of ITC events" 80, and a "list of interest objects" corresponding, respectively, to the "list of functions" and the "list of ITC events" 80.

As a result, in FIG. 26, block 80 stores a list of events called "Build a list of ITC Events" wherein a plurality of events (i.e., event 1, event 2, event 3, . . . , event N) are stored. Blocks 80, 84 will store a plurality of functions (i.e., function 1, function 2, function 3, . . . , function N), which correspond, respectively, to the plurality of events of block 80, the plurality of functions being retrieved from memory and executed in response to the reception (by the ITC Framework 34 of FIG. 5 of a particular client application) of a respective plurality of events transmitted to the particular client application from the other client applications.

For example, a first function in FIG. 26 called "Function 1 to call on reception of Event 1" 82 represents the function associated with "event 1" in the block "Build a list of ITC Events" 80. A second function in FIG. 26 called "Function 2 to call on reception of Event 2" 84 represents the function associated with "event 2" in the block "Build a list of ITC Events" 80.

In addition, in FIG. 26A, the block 80 of FIG. 26 will also store a plurality of "interest objects" corresponding, respectively, to the plurality of "events". For example, in FIG. 26A, the block 80 of FIG. 26, which is called "Build List of ITC Events", will have at least two columns of stored information: (1) a first column 80a storing a plurality of events 80a, such as Event 1, Event 2, Event 3, . . . , and Event N; and (2) a second column 80b storing a plurality of interest objects 80b which correspond, respectively, to the plurality of events 80a, such as "Interest Object 1" associated with "Event 1", "Interest Object 2" associated with "Event 2", "Interest Object 3" associated with "Event 3", . . . , and "Interest Object N" associated with "Event N". Therefore, when the particular client application program begins to execute, since the particular client application stored within itself a "list of ITC events" 80, the particular client application will send the interest object, associated with each of the events in the stored "list of ITC events" 80, from the particular client application to the other client applications via the server 26c2 as shown in FIG. 6.

In addition, if the a particular set of interest objects corresponding to a particular set of events are sent by the particular client application 24c1 to the other client applications 26c1 via the server 26c2, if the "Build a list of events" 80 in the other client applications 26c1 include the aforesaid particular set of events, and when the other client applications 26c1 practice or execute the particular set of events, the other client applications 26c1 will send a particular set of event information associated with the particular set of events directly to the particular client application (via line 40 in FIG. 6) without registering that event information with the server 26c2 and the particular client application will receive that particular set of event information.

In addition, when other client applications send an interest object in an event X to the particular client application via the server 26c2, since the particular client application stores within itself a "list of ITC events" 80 and a corresponding list of "interest objects" associated with the list of ITC events 80, the received interest object from the other client application is compared by the particular client application with the "list of interest objects" 80 of FIG. 26A stored in the particular client application, and, if a match if found, the event which corresponds to the matched interest object (i.e., "event X") will be transmitted from the particular client application directly to the other client applications (directly via line 40 in FIG. 6).

In addition, for each particular client application wherein a "list of ITC events" 80 is stored, a corresponding "list of functions" 82, 84 must be stored corresponding, respectively, to the stored "list of ITC events" 80. As a result, when another client application practices or executes the requested "event X", the event information associated with that event X will be sent directly from that other client application to the particular client application (via line 40 in FIG. 6) without passing through and registering with the server. When the event information associated with event X is received by the particular client application, the received event information will be compared by the particular client application with the "list of ITC events" 80 and their corresponding "list of functions" 82, 84 stored in the particular client application. When a match is found, by the particular client application, between the event information received from the other client application and "one particular event" in the "list of ITC events" 80, the "particular function" 82, 84 which is associated with that "one particular event" will be automatically recalled from memory 24c, 26c, the "particular function" 82, 84 being executed by the processor 24a or 26a of FIG. 3 in the workstation 10 which is executing the particular client application. The Operator Interation Display Software 32d of FIG. 5 will ensure that the "particular function" (i.e, the received event information, such as depth change or color change or line thickness change) will be displayed on the display screen 12a of the workstation 10 of FIG. 1.

Call to itc hi Filter And Session 86

In FIG. 26, the "Call to itc hi Filter And Session" 86 is the portion of the ITC-HI Setup software 32a of FIG. 5 which performs the "human interface" function.

In FIG. 5, note the intermediate location of the ITC-HI Setup" 32a between the "Operator Interaction Display software" 32d, which displays the icons and the event information, and the "Send An Event" 32b and the "Receive An Event" 32c software which sends event information to and receives event information from other client applications.

In FIG. 26, since the "Call to itc Filter And Session" 86 is an integral part of the ITC-HI Setup software 32a, it is evident from the intermediate location of the ITC-HI Setup 32a software in FIG. 5 (between the "Operator Interaction Display software" 32d and the "Send An Event" 32b and the "Receive An Event" 32c software) that the "Call to itc hi Filter And Session" 86 portion of the ITC-HI Setup Software 32a in FIG. 26 will function as a coordinator located between two ends for receiving information from one end and, in response thereto, for instructing the other end.

For example, in FIGS. 5 and 26, the "Call to itc hi Filter And Session" 86 will receive event information from the "Receive An Event" software 32c (where the event information originated from another client application and is associated with an event X) and, in response thereto, will drive the "Operator Interaction Display" software 32d for displaying that event information associated with the event X on the display screen 12a of FIG. 1 for a particular client application.

In addition, in FIGS. 5 and 26, the "Call to itc hi Filter And Session" 86 will receive event information (e.g.—changed parameters, color, thickness, font size) from the "Operator Interaction Display" software 32d of a particular client application and, in response thereto, will drive the "Send An Event" software 32b which will further instruct the ITC Framework 34 to send the aforementioned event information to other interested client applications.

Therefore, the "Call to itc hi Filter And Session" 86 will make all the connections; that is: it will send all interest objects from the "Build list of ITC Events" 80 of a particular client application to the server 26c2 for further transmission to other client applications; it will associate event information received from other client applications with a particular function 82, 84 of FIG. 26 in a particular client application for executing that particular function in the particular client application; it will cause the Operator Interaction Display Software 32d to build the various icons (status icons 60, broadcast icon 62, event filter icon 64) for display in a particular client application on the display screen 12a; and it will notify the ITC Framework (ITC Core) 34 of FIG. 5 of a particular client application which will, in turn, notify the server 26c2 that the particular client application is interested in the plurality of events that are listed in its "Build list of ITC Events" 80 of FIG. 26.

Function to Call on Broadcast 88

In FIG. 26, the "Function to call on Broadcast" 88 part of the ITC-HI Setup Software 32a of FIG. 5 is associated with the "Call to itc_hi_Filter And Session" 86. In order to explain the function of the "Function to callon Broadcast" 88, it is necessary to recall the function of the "Broadcast" Icon 62 of FIG. 14.

When the broadcast icon 62 for a particular client application 12b is clicked "on" by an operator at workstation 10 using the mouse 18, in most cases, all of a plurality of newly created events in the particular client application, which were generated by an operator at the workstation 10 during a period of time after the closed state status icon 60b was clicked "on", will be simultaneously transmitted from the particular client application to all other "interested client applications" executing in the network of workstations.

For example, for a particular client application where particular events consisting of color events, font size events, and line thickness events can be transmitted to and received from other client applications, when the operator of the particular client application clicks "on" the broadcast icon 62 after a period of time elapses following the clicking "on" of the closed state status icon 60b, in most cases, event information associated with all of the particular events will be transmitted to the other client applications.

However, the "Function to call on Broadcast" 88 will allow the particular client application developer to decide whether or not event information associated with "all" of the particular events will be transmitted to the other client applications when the broadcast icon 62 is clicked "on" by the operator. More particularly, using the "Function to call on Broadcast" 88, event information associated with "some" of the particular events (which were newly created in the particular client application after the closed state status icon was clicked "on" by the operator) will be transmitted to the other client applications when the broadcast icon 62 is clicked "on" by the operator.

In FIGS. 5 and 26, when the operator clicks "on" the broadcast icon 62 for a particular client application after a period of time elapsed following the clicking "on" of the closed state status icon 60b, the "Operator Interaction Display" software 32d in FIG. 5 for that particular client application will notify the ITC-HI Setup Software 32a in FIG. 5 that the operator clicked "on" the broadcast icon 62. In response, the "Call to itc_hi_Filter And Session" 86 portion of the ITC-HI Setup Software 32a in FIG. 26 will refer to and call up the "Function to call on Broadcast" 88 part of the ITC-HI Setup Software 32a.

Assume that a "plurality of newly created events" were practiced and executed by the particular client application between the time when the closed state status icon 60b was clicked "on" and the time when the broadcast icon 62 was clicked "on" by the operator executing the particular client application.

The "Function to call on Broadcast" 88 will determine whether "all" or "some" of the "plurality of newly created events" will be transmitted to the other client applications in response to the clicking "on" of the broadcast icon 62 by the operator executing the particular client application. The "Function to call on Broadcast" 88 will determine how many events of the "plurality of newly created events" (i.e.—some, all, or none) will be transmitted to the other client applications.

In FIGS. 5 and 26, using the above example, for a particular client application where particular events consisting of color events, font size events, and line thickness events can be transmitted to and received from other client applications, when the operator of the particular client application clicks "on" the broadcast icon 62 after a period of time elapses following the clicking "on" of the closed state status icon 60b and when the Operator Interaction Display software 32d of FIG. 5 notifies the ITC-HI Setup Software 32a that the broadcast icon 62 has been clicked "on", the "Call to Itc_hi_Filter And Session" 86 will call up and retrieve the "Function to call on Broadcast" 88 part of the ITC-HI Setup Software 32a, and, in response thereto, the "Function to call on Broadcast" 88 can require that event information associated with only some of the events, such as only the color events for example, will be transmitted to the other client applications.

Call to itc_hi_Delete 90

In FIGS. 5 and 26, when the particular client application ceases to execute (i.e., the operator at the workstation 10 terminates a window display 12b representing the particular client application), the operator interaction display software 32d of FIG. 5 will notify the ITC-HI Setup software 32a. In response thereto, the "Call to itc_hi_Delete" 90 portion of the ITC-HI Setup software 32a will notify ITC Framework 34 and the ITC Framework 34 will notify the server 26c2 that the particular client application has terminated. In response, the server 26c2 will un-register any and all interest objects stored therein which are associated with the particular client application, and then the server 26c2 will notify all other client applications. In response, the other client applications will un-register the particular client application's interests in certain previously registered events. As a result, the other client applications will not send any event information corresponding to the previously registered events to the particular client application.

In FIG. 27, the actual program code which corresponds to the ITC-HI Setup software 32a of FIGS. 5 and 26 is illustrated.

Referring to FIGS. 28 and 29, a detailed construction and a functional operation of the Send An Event Software 32b of FIG. 5 is illustrated.

In FIG. 28, the Send An Event software 32b of FIG. 5 includes two blocks of code: (1) Get Data Structure to Send 92, and (2) Call to itc_hi_Transmit Event 94. Each of these blocks of code will be discussed individually.

Get Data Structure to Send 92

In FIG. 28, the "Get Data Structure to Send" 92 block of code responds to three different types of input data: (1) input data originating from a user interaction, (2) input data originating from a Database, and (3) input data originating from an I/O Stream.

In FIGS. 5 and 28, the Operator Interaction Display software 32d responds to any changes which are made to a particular client application by an operator at workstation 10 of FIG. 1 by generating the "user interaction" type of input data which is ultimately input to the "Get Data Structure to Send" 92 block of code associated with the Send An Event software 32b. For example, when the operator at workstation 10 of FIG. 1 is working with a particular client application as represented by one of the window displays 12b of FIG. 1, the operator may change the color, or the font size, or he may make some other change to the particular client application. If those changes are in the list of events in the "build list of events" 80 of FIG. 26 and when another client application has requested event information associated with those changes, the Operator Interaction Display software 32d of FIG. 5 will respond to the changes made by the operator to the particular client application by notifying the ITC-HI Setup software 32a.

The "Call to itc_hi_Filter and Session" 86 portion of the ITC-HI Setup software 32a will provide the following information to the "Get Data Structure to Send" 92 portion of the "Send An Event software" 32b of FIG. 28: (1) the name of the event which is associated with the aforementioned changes which were made by the operator to the particular client application, and (2) the data or event information which is associated with the aforementioned named event.

However, there are two other origins of the information (name of the event, and data or event information associated with the named event) which is provided by the ITC-HI Setup software 32a to the "Get Data Structure to Send" 92 portion of the "Send An Event software" 32b of FIG. 28: (1) input data originating from a Database, and (2) input data originating from an I/O Stream.

Call to itc hi Transmit Event 94

In FIG. 28, when the "Get Data Structure to Send" 92 portion of the "Send An Event software" 32b of FIG. 28 receives (1) the name of the event which is associated with the changes which were made by the operator to the particular client application, and (2) the data or event information which is associated with the aforementioned named event, a call is made to the "itc hi Transmit Event" 94 software. The "itc hi Transmit Event" 94 software will transmit the name of the event and the data or event information associated with that named event to the ITC-Framework (ITC Core) 34 of the particular client application of FIGS. 4 and 5. For example, for a depth event, the depth data and the depth event name will be sent, by the "itc hi Transmit Event" 94 software, to the ITC Framework (ITC Core) 34. For a color event, the new color data and the color event name will be sent, by the "itc hi Transmit Event" 94 software, to the ITC Core 34.

In FIG. 29, the actual program code which corresponds to the "Send An Event software" 32b of FIGS. 5 and 28 is illustrated.

Referring to FIGS. 30 and 31, a detailed construction and a functional operation of the "Receive An Event Software" 32c of FIG. 5 is illustrated.

In FIG. 30, assume that a particular client application sends a plurality of interest objects to the other client applications via the server 26c2, and that one or more of the other client applications will, in response thereto, send the requested events directly to the particular client application via line 40 in FIG. 6. The ITC Framework (otherwise known as the "ITC Core") 34 associated with the particular client application will receive the one or more events from the line 40 of FIG. 6 which originated from the other client applications.

Call to Reception Function 96

In FIGS. 5 and 30, the ITC Framework (Core) 34 of the particular client application will input the received events (which are received from the other client applications via line 40 of FIG. 6) to the "Receive An Event" software 32c of FIG. 5. The "Receive An Event" software 32c of FIG. 5 includes a block of code which is hereinafter called the "Call to Reception Function" 96 code.

Recall from FIGS. 26 and 26A that the block 80, stored in the ITC HI Setup 32a software of FIG. 5 of a particular client application and called the "Build List of ITC Events", stored a list of events, a list of functions corresponding respectively to the list of events, and a list of interest objects corresponding respectively to the list of events and the list of functions. The "Call to Reception function" 96 code of the Receive An Event 32c software of FIGS. 5 and 30 will compare the received events (received from the other client applications via the ITC Core 34) with the plurality of events listed in the "Build List of ITC Events" 80 stored in the ITC HI Setup software 32a of the particular client application, and, when one or more matches are found between a received event and an event stored in the "Build List of ITC Events" block 80, the "Call to Reception function" 96 code will cause the particular functions (82, 84 of FIG. 26) associated with the matched events to be executed by the processor (24a, 26a of FIG. 3) of the particular client application. In FIG. 30, when the functions associated with the matched events are executed by the processor of the particular client application, the particular client application will react accordingly, as indicated by the "Application to React" block 98 in FIG. 30; that is, the functions will be displayed on the window 12b of the display screen 12a.

In FIG. 31, the actual program code which corresponds to the "Receive An Event software" 32c of FIGS. 5 and 30 is illustrated.

Figure 32:
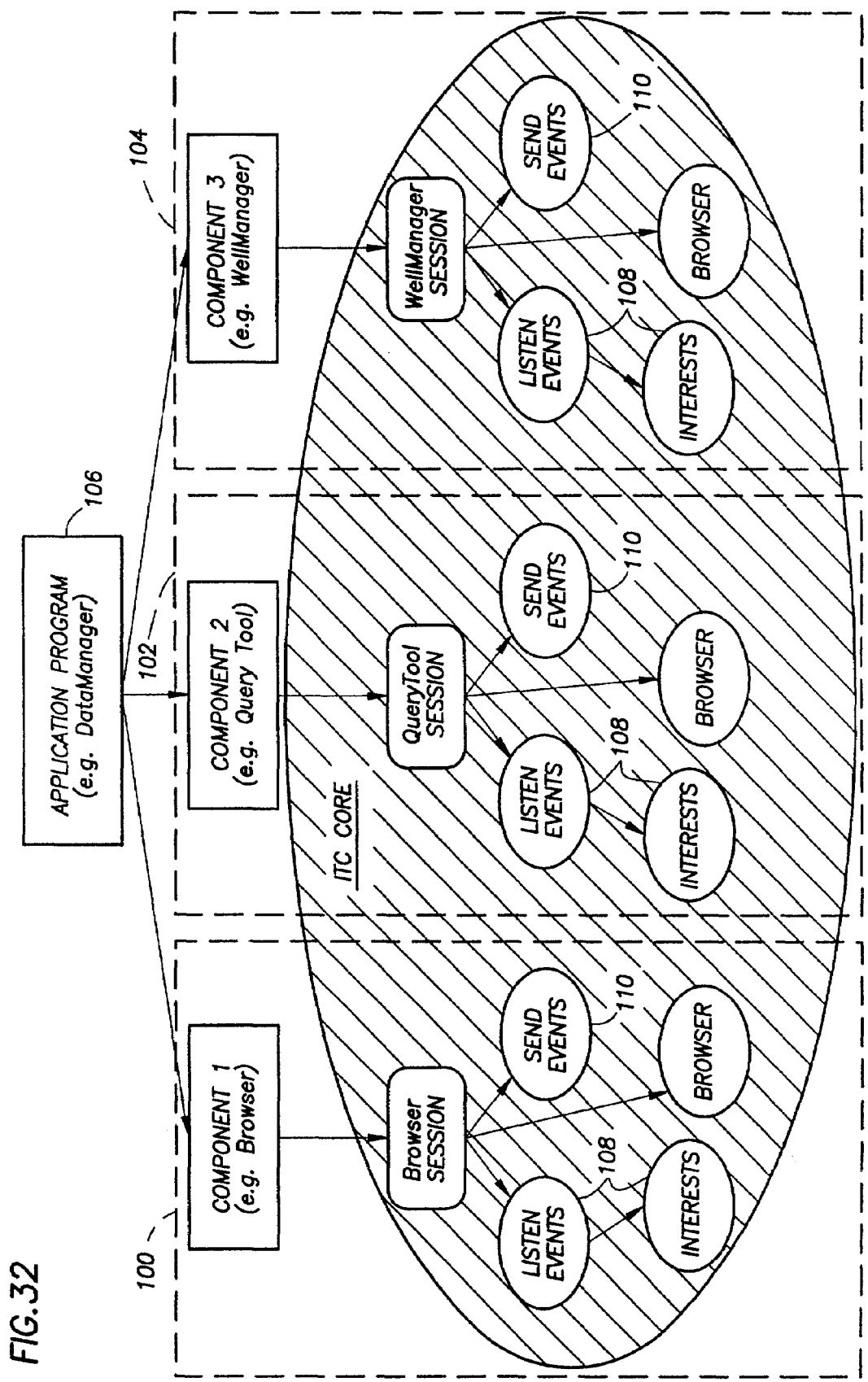
FIG. 32 illustrates an Intertask Communication (ITC) Sessions Model referenced in the ITC Framework portion of the "DETAILED DESCRIPTION OF THE PREFERRED EMBODIMENT".

Referring to FIG. 32, an Intertask Communication (ITC) Sessions Model is illustrated. In FIG. 1, a workstation 10 is illustrated having a screen display 12a which shows a plurality of different windows 12b. Since each window 12b represents a different client application program 10 executing in the workstation, a single workstation 10 can therefore simultaneously execute a plurality of different client application programs 20. In FIG. 2, the plurality of different windows 12b or client application programs 20 displayed on the display screen 12a could include or consist of a plurality of different client applications 20, such as modelling or Cross View or MapView or 3D View or Seismic or Well View or ELAN or Litho or Bor View.

FIG. 32 illustrates the plurality of different client applications 20 executing in the workstation 10. For example, in FIG. 32, a first client application 100, a second client application 102, and a third client application 104 can execute concurrently in the workstation 10 of FIG. 1. An application program data manager 106 manages the concurrently executing client applications 100, 102, 104. The client applications 100, 102, 104 can listen (108) for interest objects received from another client application via the server 26c2, and, when the interest objects associated with a particular event is received by the client applications 100, 102, 104, the client applications 100, 102, 104 will send (110) the particular event directly to the other client application (but not by way of the server).

A functional description of the operation of the Distributed Framework Method and Apparatus of the present invention for Intertask Communication between Workstation Applications is set forth in the following paragraphs with reference to FIGS. 1 through 31 of the drawings.

Assume that a plurality of workstations, similar to the workstation 10 of FIG. 1, are interconnected together in the manner shown in FIG. 2. Each workstation 10 of the plurality has at least one window display 12b presented to the operator on the display screen 12a of the workstation 10. Each window display 12b on each workstation 10 is being generated by the Operator Interaction Display software 32d of FIG. 5 of a "client application program" (otherwise known as a "client application") and each client application may present to an operator, sitting at the workstation 10, a different functional representation. For example, as shown in FIG. 2, one client application 20 may present to the operator at the workstation 10 a modelling functional representation, another client application 20 may present to the operator a Cross View functional representation, and another may present to the operator either a MapView or a 3D View or a Seismic or a Well View or an ELAN or a Litho or a Bor View functional representation. Therefore, as indicated in FIG. 2, a plurality of different client applications 20 are interconnected together by the "Distributed Framework" method and apparatus of the present invention adapted for providing an intertask communication between workstation applications.

One of the workstations 26 of FIG. 3, representing one client application 20 of FIG. 2, stores the server 26c2 as well as its own particular client application 26c1 as shown in FIG. 3, and the other workstation 24, representing another client application 20 of FIG. 2, stores its own particular client application 24c1 of FIG. 3.

Assume that an operator at workstation 24 of FIG. 3 is viewing the log chart 12b shown in FIG. 16 on a window display 12b of the display screen 12a of FIG. 1, the log chart 12b of FIG. 16 including the closed state status icon 60b, the broadcast icon 62, and the event filter icon 64 appearing on the bottom right hand corner of the log chart 12b. The operator does not click "on" the closed state icon 60b, and the operator does not click "on" either the broadcast icon 62 or the event filter icon 64. As a result, the operator's "door is open"; that is, all events previously requested from other client applications will be received by the log chart 12b client application from other client applications, and all events created by the operator on the log chart 12b client application, which were previously requested by other client applications, will be sent by the log chart 12b client application to the other interested client applications.

As a result, when the window display 12b, on the display screen 12a of the workstation 24 of FIG. 3 displaying the log chart 12b client application of FIG. 16, is called up by the operator, the operator interaction display software 32d of FIG. 5 will: (1) display the log chart 12b client application of FIG. 16 in the window 12b of the display screen 12a of the workstation 24 of FIG. 3, and (2) instruct the "Call to itc_hi_Filter and Session" 86 of FIG. 26 of the ITC-HI Setup software 32a of FIG. 5 to send the interest objects 80b of FIG. 26A, associated with the plurality of events 80a in the "list of ITC events" 80 in the ITC HI Setup software 32a of FIG. 5, to the Send An Event software 32b of FIG. 5. The Send An Event software 32b will, in turn, send the interest objects 80b to the ITC Framework 34, of the log chart 12b client application 24c1, of FIG. 5. The ITC Framework 34 of the log chart 12b client application 24c1 will send the interest objects 80b to the server 26c2 via line 36 of FIG. 6. The server 26c2 will register the interest objects therein and will send the interest objects to all other client applications 20 of FIG. 2 including the client application 2 26c1 shown in FIG. 6. The ITC Framework 34 of the client application 2 26c1 will send the received interest objects to the Receive An Event software 32c of FIG. 5, which will, in turn, send the received interest objects to the "Call to itc_hi_Filter And Session" 86 of FIG. 26 of the ITC HI Setup Software 32a of FIG. 5 of the client application 2 26c1. The "Call to itc_hi_filter And Session" 86 of client application 2 26c1 will compare the received interest objects with the interest objects 80b stored in the "Build List of ITC Events" 80 of FIGS. 26 and 26A of client application 2. When a match is found between a received interest object and one of the interest objects 80b of FIG. 26A for client application 2 corresponding to a particular event, such as "event N", the "Call to itc_hi_Filter and Session" 86 will send the "event N" to the Send An Event software 32b of FIG. 5 of the client application 2 26c1 which will, in turn, send the "event N" to the ITC Framework 34 of the client application 2 26c1 of FIG. 5. The ITC Framework 34 for client application 2 26c1 of FIG. 5 will send the "event N" directly to the log chart client application 24c1 of FIG. 6 via line 40 of FIG. 6 without requiring the "event N" to register with and pass through the intervening server 26c2.

Assume now that the operator at the workstation 24 of FIG. 3, viewing the log chart 12b client application of FIG. 16 on the window 12b of the display screen 12a, clicks "on" the event filter icon 64 in FIG. 16. The "clicking on" of the event filter icon 64 in FIG. 16 will call up the event filter subwindow 64a in FIGS. 15c, 15d, and 15e. The subwindow 64a will have a plurality of events listed therein, the plurality of events consisting of the events (event 1, event 2, event 3, . . . , and event N) shown in FIG. 26A.

In FIG. 15e, assume that the operator clicks "on" the "all" portion 64a4 and 64a5 in the "send" and "receive" column 64a1 and 64a2 of the event filter subwindow 64a. As a result, when the log chart 12b client application 24c1 sends the interest objects 80b of FIG. 26A to the server 26c2 of FIG. 6 and the server 26c2 sends the interest objects to the client application 2 26c1, the client application 2 will send event information associated with any one or all of the events 1, . . . , event N directly to the client application 1 via line 40 of FIG. 6 and the client application 1 24c1 will receive all of the events.

Conversely, when the client application 2 26c1 sends the interest objects 80b of FIG. 26A to the server 26c2 of FIG. 6 and the server 26c2 sends the interest objects to the log chart client application 1 24c1, the client application 1 will send event information associated with any one or all of the events 1, . . . , event N directly to the client application 2 via line 40 of FIG. 6 and the client application 2 26c1 will receive all of the events.

However, assume that the operator viewing the subwindow 64a of the event filter icon 64 of FIG. 15e (of the log chart 12b client application 24c1 of FIGS. 3 and 16 on the workstation 24 of FIG. 3) clicks "send" (1A1 of FIG. 15e) but not "receive" (2A1 of FIG. 15e) for event 1, but clicks both "send" (1A2, 1A3, 1A4) and "receive" (2A2, 2A3, and 2A4) for all other events, event 1, event 2, . . . , and event N in the event filter icon subwindow 64a of FIG. 15e. The log chart client application 24c1 will send the event 1 to the client application 2 26c1 of FIG. 3 via line 40 of FIG. 6 (when the client application 2 requested the event 1 from the log chart client application 1 via the server), but the log chart client application 24c1 will not receive the event 1 from the client application 2 26c1 of FIG. 3 via line 40 of FIG. 6 (when the log chart client application 1 requested the event 1 from the client application 2 via the server). However, all other events, event 2, event 3, . . . , and event N, will be received from client application 2 by the log chart client application 24c1 and will be sent to the client application 2 by the log chart client application 24c1.

DETAILED DESCRIPTION OF THE PREFERRED EMBODIMENT

The following paragraphs of this "Detailed Description of the Preferred Embodiment" will provide a detailed description of the structure and the functional operation of the Distributed Framework for Intertask Communication Between Workstation Applications of the present invention.

Introduction

The inter-task communications (ITC) facility is neither an application nor an agent but is an architecture for facilitating inter-process connectivity and communication between applications.

This document has two parts:

ITC Framework Core
    The ITC framework core includes:
        A shared library to which each ITC compliant application will link. This library contains the code for all of the ITC core and the ITC API.
        A system of database catalogs that needs to be populated by application programmers.
        A test and demonstration application that demonstrates the use of the framework (and the ITC API) and also tests its functionality.

ITC Framework Human Interface
    It describes what the user will see and manipulate in order to perform various inter-applications communications. The purpose of the human interface part of the ITC framework is:
        To detail the specific ITC features that we want the user to be responsible for controlling
        To standardize the user's view of ITC through all the applications
        To provide a shared library which contain the bundled HI ITC features ITC Framework Concepts The framework for ITC core is based on the application data interface (ADI) express interest and event architecture, with specific enhancements. ITC application developers are expected to be familiar with the use of the native ADI event mechanism, and its extensions for ITC purposes.

The ITC Event Model

Some of the unique features of the ITC event framework include:

- It allows the programmer to register interest on abstract event tokens rather than on dataitem instances or dataitem types. No dataitem instances or types are exported to the ITC application programmer.
- Unlike the set of predefined system event types in other event mechanisms, the ITC framework allows the application programmer to create new event types, and to describe conditions under which the event is generated. The data that is passed with these events is also determined by the application programmer.
- In addition, the ITC framework allows the application programmer to set filters on where and who it should receive events from.

The principal features of the ITC framework are discussed below.

ITC Event Tokens

Applications can express interest (or register event handlers) on specific types of events that are identified by unique event tokens. Similarly, applications can broadcast events identified by these tokens. These event tokens are cataloged in the database. For example, the event token for well selection events would be ITC_WELLSELECTION. Each event token has an associated event data structure. This data structure is instantiated by the sender of the event and is passed to all applications that have registered interest on the event.

A brief description of the implementation of event tokens follows to enable better understanding of the internals of the ITC framework.

A new type of dataitem serves as the event communicator for ITC events. The ITC event token is simply the Code of the aqi_Event dataitem instance. The attributes of this dataitem are:

| | |
|---|---|
| Code (vt_Atom) | Referenced from catalog |
| Value (vt_Datum) | The data that should be passed with the event |
| Extension attributes | The dataitem has an extension table, which stores specific attributes which apply to all ITC DIs of a given type. |

When an application registers an interest on an event, the ITC library internally sets an express interest on an appropriate itc_Event object, and listens for changes to the EventData attribute of this DI, and notifies the interested application when this occurs.

When an application transmits an event, the ITC library updates the EventData attribute of the ITC dataitem with the data passed to it by the caller, which sends out attribute events to all ITC clients interested in receiving that event.

ITC Event Filters

For every event type, applications can set filters on:

- What types of modules to receive events from (domain filters), and
- The extent of the database where it wants events from (scope filters).

Domain Filters

This indicates what kinds of module types an application is interested in receiving events from. This is indicated by the attribute Code of the Modules. For example, an interactive map application instance (IMAP) may want to receive ITC_WELLSELECTION events only from CrossView application instances (Module Code=="CrossView") and not from other types of applications. A NULL domain filter indicates that events should be received from all Module types.

Scope Filters

This indicates the extent of the all the processes and database granularities a module is interested in receiving events from. The various types of scope filters are:

| | |
|---|---|
| Project | Receive events from any module in the current project (or any module that is made visible from another project to the current project), including applications running on multiple ProcessManagers using the same project. (Note: at this time, communication between multiple ProcessManagers is not possible). |
| ProcessManager | Receive events from any module in the current process manager session. This is the default. |
| Module | Receive events only from a specific module instance in the same session. This module must be explicitly specified by the programmer. |
| SubModule | Receive events only from a specific subset, or sub-process, or sub-window of a given running module in the same session. This is the most restrictive filter, and will allow very specific connectivity, such as window to window communication. A module DI (represented on the ProcessManager graph) may have a set of children Module DIs to represent logically different sub-parts of the application. For example, the DataManager module may have a sub-module for each of its cloned browser windows. The sub-module must be explicitly specified by the programmer. |

Domain and containment filters may be combined. For example, the IMAP application may want to receive ITC_WELLSELECTION events only from CrossView applications running in its own session.

Application Connectivity and Pooling

The ITC event scope and domain filters are used to set up common name spaces that define pools to which applications may belong, and share certain events with each other by default. For every event type, a pool of applications is defined by a set of Modules that are connected to each other by ITC. Formally it is defined as follows:

Pool=[{Set of Transmitting modules}, {Set of Receiving modules}]

When an application starts up, ITC will identify the application pool it belongs to and will implicitly connect it to this pool of applications for the event types that it is interested in.

The connectivity is created using the following pieces of information:

- What event types an application is interested in listening to
- The scope at which it is interested in listening to these events
- For each interesting event, the types of Modules it wants to receive events from The application must provide the ITC framework all of the above information.

For example: in a Process Manager session, modules IMAP(M1), CrossView(C1) and DataManager(D1) are running. A new IMAP module (M2) is started, and it tells ITC that it is interested in receiving the following events:

EventType=ITC_DISELECTION, domain
  filter={DataManager}, Scope=Session

EventType=ITC_WELLSELECTION, domain
  filter={IMAP, CrossView}, Scope=Session

For the ITC_DISELECTION event, ITC will add M2 to the pool [{D1}, {M1}] (forming [{D1}, {M1, M2}] so that M2 can receive events from D1.

For the ITC_WELLSELECTION event, ITC will add M2 to the pool [{M1, C1}, {M1}], (forming [{M1, C1, M2}, {M1, M2}] so that it can receive events from M1 and C1.

itc_Event_Cat

The itc_Event_Cat catalog stores the names of various event types, their supertypes, valuetypes of event data structures. This catalog will be initially populated with a set of well known event types, and it is meant to be extended by application programmers to create new event tokens. The contents of this catalog will be maintained both in the project and baseline database accounts.

ITC API

ITC Application Programming Model

The ITC core package is set up to allow application programmers to create and manage multiple independent ITC connections from different parts of the same application. Each of these connections to the ITC library is called a session. Each session maintains information such as the list of events being sent and received, the callbacks and user data for these events, and so forth. This design is in the interest of reusability of application components, so that they can be easily plugged into different application programs. For example, each system editor or Well DataManager or utility popup window invoked from an application is coded so at to define its own set of ITC events and maintain its own connection with ITC. The application program that uses and invokes these reusable utilities does not have to worry about hooking up these components to ITC.

ITC API Data Structures

The ITC API data structures are described in the sections that follow.

itc_EventCallback_t

This is the prototype of the ITC event callback which will be called when an ITC event is generated. This callback is set using the function itc_RegisterInterest (described shortly).

itc_Status_t

This is an integer (Int32_t) that is used to store the return status of various ITC operations. All ITC status codes are listed in the file wk_itc/itc_msg.msg. For successful operations the status is ITC_OK, and different (such as ITC_ERROR) otherwise.

ITC status code are encoded in the wk_itc/itc_msg.msg. Typical values of status from various ITC functions are:

| | |
|---|---|
| ITC_OK | Call is successful. |
| ITC_SESSION_INACTIVE | The session handle is NULL or does not exist or if the session has already been closed or corrupted. |
| ITC_INVALID_EVENT | The EventToken is NULL or does not exist in itc_Event_Cat or does not have a legal valuetype. |
| ITC_EVENT_INACTIVE | The event cannot be received or sent by the session at this time. |
| ITC_ERROR | All other internal ITC errors. | itc_SessionObj_t

This is an opaque handle to an ITC session object. It is created when a new ITC session is opened (using itc_StartSession( )), and is used in subsequent ITC operations in the scope of the Session. It must NOT be freed by the application. A session is closed (and internally freed) using itc_CloseSession( ).

ITC Interest Scope Masks

These are a set of masks that may be OR'ed together to indicate the scope of interest as a an argument to itc_RegisterInterest( ). The following scope masks are defined:

| | |
|---|---|
| ITC_PMSCOPE | Events are received only from application modules in the scope of the same ProcessManager (the default) |
| ITC_PROJECTSCOPE | Events are received from application modules in the same project (as the receiving module) |

ITC API Function Prototypes

The sections that follow describe the ITC API function prototypes.

itc_Init

This function must be called by the ITC client used to initialize the ITC framework; it allocates memory for internal ITC data structures. This must be called before calling any other ITC function.

itc_Shutdown

Shuts down the ITC framework. Cleans up all ITC data structures, interests, etc. No ITC API function except itc_Init( ) may be called after shutdown. itc_Init( ) must be called to reinitialize the ITC framework.

itc_StartSession

This is used to open an independent connection with the ITC library. Each session maintains information about events that are being received and sent, the user callbacks and userdata, event filters etc. Multiple sessions may be created within an image, from different subparts of the application (such as editors, popup windows, etc.). This allows reusability of software components (such as editors or data managers) across applications, since they maintain their own ITC connections.

itc_CloseSession

This closes a session and cleans up all the data structures and memory allocated for that session, and also revokes all interests on all event types for that session. This should be called when a sub-part of an application finishes, e.g., an editor is closed.

itc_TransmitEvent

This transmits an ITC event. Note that if the transmission status for this event type is inactive (i.e., no events of this type may be transmitted from this Session, as set by the end user using ITC browsers), no ITC events will be transmitted for this token as a result of this call. The return status will be ITC_EVENT_INACTIVE.

itc_RegisterInterest

This registers an interest on an ITC event type. Note that if the reception status for this event type is inactive (i.e., no events of this type may be received in this Session, as set by the end user using ITC browsers), no ITC events will be received for this token till the reception status is set to active again. The return status will be ITC_EVENT_INACTIVE.

itc_RevokeInterest

This revokes interest on an ITC token that was registered using itc_RegisterInterest( ). Events of this type will no longer be received by the ClientModule. Interests that have been revoked must be re-expressed using itc_RegisterInterest( ).

itc_GetEventValueType

This obtains the valuetype of the event data structure that is associated with a given event type. The function looks up the itc_Event_Cat catalog to find this information.

ITC_DEBUG

Application programmers may set an environment variable ITC_DEBUG, which, if set, will cause the ITC library to print error, warning and informational messages to stderr. All ITC core code will also be protected by utl exception handlers.

ITC Framework—Further Details

Introduction 1.1 Purpose

The inter-task communications (ITC) facility is meant to provide an architecture and style guide for communication and connectivity between applications. This document attempts to provide the design of this framework.

1.2 Document Overview

This document is organized as follows:
1. In Chapter 2, we present an overview of the design of the ITC framework and introduce its main internal components and their inter-relationships. We also present an overview of the main pieces of external functionality of the ITC framework.
2. In Chapter 3, we discuss in detail the design of each of these ITC components and their functionality.
3. In Chapter 4, we present the important pieces of ITC functionality to illustrate the internal workings of the ITC framework.

Design Overview

This chapter presents a brief overview of the components in the ITC framework. The design of the components themselves is presented in the following chapter.

The ITC event framework is implemented on top of the ADI[1] express interest mechanism. However, the ITC event model extends the ADI event mechanism in several ways:

It allows the programmer to register interest on abstract event tokens rather than on dataitem instances or dataitem types. No dataitem instances or types are exported to the ITC application programmer.

Unlike the set of predefined system event types in the ADI event mechanism, the ITC framework allows the application programmer to create new event types, and to describe conditions under which the event is generated. The type of the data (or its valuetype) that is passed with these events is also determined by the application programmer.

In addition, the ITC framework allows the application programmer to set filters on where and who it should receive events from.

Internally, the ITC framework uses special dataitems (instances of the itc_Event dataitem type) to act as "event servers" for various types of ITC events. ITC user events are translated into ADI Attribute events on these dataitems. ITC dataitems are discussed in detail later.

[1]. In this document ADI refers to: Application Data Interface (ADI) by Pradeep Jain, disclosed in provisional application # 6/023,689 filed on Aug. 15, 1996.

2.1 Product Decomposition Description

The principal entities in the ITC core framework are:
1. An ITC Dataitem (itc_Event). Note that the ITC dataitem is for internal use by the ITC core library and is not exported to the application as part of the ITC public interface.
2. An ITC event catalog (itc_Event_Cat).
3. ITC API and classes (itc_Session, itc_Event, itc_ListenEvent, itc_SendEvent, itc_ListenObj). The ITC core code is designed to allow extensions so as to be able to support the ITC HI components that are developed as part of the ITC HI package.

(1) and (2) are packaged as part of the ADI package, and accessed using the public ADI interface. (3) is packaged in the form of an ITC core shared library and provides the public ITC API.

2.2 Component External Interface

The external interface to the ITC core is detailed in the ITC Core Framework document and will not be repeated here, except in the context of the design of the ITC components. In brief, there are four categories of ITC functions:
1. Setup. This includes ITC initialization, and shutdown
2. Opening and closing of ITC Sessions from the application program.
3. Registration of interest in events, with the provision of setting filters based on who events are received from.
4. Transmission of events.
5. Utility, such as querying for the valuetype of event data for event types.

Detail Component Design Description

This chapter discusses in detail the design of the ITC framework and its components.

3.1 ITC Programming Model

The ITC core package is set up to allow application programmers to create and manage multiple independent ITC connections from different parts of the same application. Each of these connections to the ITC library is called a Session. Each session maintains information such as the list of events being sent and received, the callbacks and user data for these events, etc. This design is in the interest of reusability of application components, so that they can be easily plugged into different application programs. For example, each system editor or Well DataManager or utility popup window invoked from an application is coded so at to define its own set of ITC events and maintain its own connection with ITC. The application program that uses and invokes these reusable utilities does not have to worry about hooking up these components to ITC.

Several Sessions may be created in an application. Each ITC Session will have its own ITC HI (standard ITC banner) for displaying the events and toggling their states independently of the other Sessions.

An ITC Session is created using the function itc_StartSession( ), and closed using the function itc_CloseSession( ).

3.2 Component Decomposition Description

In the following sections, we describe the design of the various ITC components. We will not discuss the ITC public data structures (itc_EventCallback_t, itc_SessionObj_t and itc_Status_t) and API since these are fully specified in the ITC core Framework. We will describe the underlying data structures and the architecture that support the public interface.

The components and data structures described are those required to support the ITC core API. The ITC HI API is described in another part of the document. The design of the core components (and the ITC core API) reflects hooks for HI purposes, which are strictly not needed for the ITC core itself. For example, the ITC core requires that Session objects and Interest instances be uniquely named strictly for HI and browsing purposes.

3.3 itc_Event DataItem

3.3.1 Purpose

This is a lightweight dataitem which is intended to act as the ADI event server for various ITC events. For every ITC event type, the ITC core library creates (when needed) an instance of an itc_Event dataitem contained directly by the Project dataitem. Application ITC events are translated into Attribute events on instances of these itc_Event dataitems.

3.3.2 Interface Description

The itc_Event datatype is a subclass of aqi_Entity and defines the following attributes:

1. Code—this identifies the type of the ITC event that the DI represents. All ITC event codes are cataloged in itc_Event_Cat (discussed shortly).
2. Value—this stores the current value of the event data associated with an event instance. The type of the Value attribute is obtained from Value_Type column of itc_Event_Cat in the tuple corresponding to the Code entry in that catalog. Thus all instances of itc_Event that have the same Code have the type (akin to a class attribute) derived from the itc_Event_Cat catalog.

3.3.3 Processing

As mentioned earlier, itc_Event dataitems act as event servers for various ITC events. When an ITC application expresses interest in an ITC event type X, the ITC core library locates the itc_Event DI with Code=X (or creates one if none exists, only one instance of itc_Event is created for each ITC event type), sets an ADI express interest on it, listens for changes to the Value attribute of this DI, and notifies the interested application when this occurs. This DI serves as the internal rendezvous point for various ITC based applications that have expressed interest on the same ITC event.

Similarly, when an application transmits an event with an event data, the ITC core library updates the Value attribute of the corresponding itc_Event DI with the event data passed to it. Applications which has expressed interest in the ITC event are internally notified by the ADI event mechanism and thereafter notified by ITC.

3.4 itc_Event_Cat

3.4.1 Purpose

The itc_Event_Cat catalog stores the names of various event types, their supertypes and valuetypes of event data structures. This catalog will be initially populated with a set of well known event types, and is meant to be extended by application programmers to create new event tokens and their corresponding event data types.

This catalog serves as the reference table for itc_Event dataitems. In order to create an itc_Event dataitem its Code must exist in the itc_Event_Cat and must have a legal valuetype entry in the Value_Type column.

3.4.2 Interface Description itc_Event_Cat is a subclass of aqi_Desc_Cat. Its relevant attributes are:

Code, NOT NULL//Event code, must be unique
  Value_Type, NOT NULL//valuetype format of the event data structure. This may be an aggregate format or name of a primitive valuetype
  Document_File, NOT NULL//name of file where Event is documented
  Super_Code, //Type of the parent event type, if any. E.g. ITC_WELLSELECTION is a subtype of the event ITC_DISELECTION
  Value_Type_Name, //name of the type, e.g. itc_CursorTrackEventData
  Header_File, //name of header file for valuetype
  HI_Name, //name used for display on HI. May be the same as Code

3.4.3 Description of itc_Event_Cat Attributes

3.4.3.1 Code (NOT NULL)

This is the name of the event token. It must be unique.

3.4.3.2 Value_Type (NOT NULL)

The Value_Type attribute describes the type of the event data structure that is passed when an event is generated. For a new, application-defined type, it lists the type of each field in the event data structure in the order in which they are declared in the C struct. For example, if the C data structure for itc_CursorTrackEventData is:

```
/*the ITC_CURSORTRACK event data structure*/
typedef struct
{
Float32_t Coord1; /*first coordinate*/
Float32_t Coord2; /*second coordinate*/
Float32_t Coord3; /*third coordinate*/
aqi_DataItem_t CoordSysDI; /*Coord sys. in which event
    is generated*/
}itc_CursorTrackEventData_st;
```

3.4.3.3 Document_File (NOT NULL)

The Document_File attribute indicates the name of the text file which contains documentation on the event: what its purpose is, conditions under which it will be generated, description of the event data structure and how to interpret it, the names of the header and source files that define the data structure etc. This is as an aid to developers who wish to use an event in their application. Note that this is NOT NULL attribute, therefore, every new event type MUST have a document file provided. Several events may be documented in a single file.

3.4.3.4 Super_Code (Optional)

This is the name of the event Code which is a super-type of the given Code. For example, the ITC_WELLSELECTION event is a specialization of ITC_DISELECTION event, so the Super_Code for ITC_WELLSELECTION would be ITC_DISELECTION. The SuperCode may be NULL.

3.4.3.5 Value_Type_Name (Optional)

The Value_Type_Name attribute describes the name of the application-defined type. Typically, the name should be the same as the name of the data structure (C struct) that defines the new type. For example, for the data structure itc_CursorTrackEventData_st described below, the Value_Type_Name should be itc_CursorTrackEventData.

3.4.3.6 Header_File (Optional)

The Header_File attribute indicates the name of a C header file where the C data structure for the new type is described. This file must be included by applications that want to use this event. Several related types may be included in a single header file, which may in turn include other header files.

3.4.3.7 Hi_Name

This represents a name for the event type which is suitable for display on the ITCHI Banner. This name will be used in the ITC HI package.

3.4.4 Defining Event Data Structures for Event Tokens

The mechanism for defining new event data structures is described in detail the ITC Core Framework and will not described here.

3.5 itc_Session Class

3.5.1 Purpose

The itc_Session class encapsulates information about connections from the application program to the ITC framework. It maintains the list of events that application sub-component (that has opened the Session) is interested in listening to and transmitting, their states (active or inactive), the callback functions and user data associated with these interests, etc. Hence, its instances serve as container objects for instances of other ITC classes (such as itc_ListenEvent and itc_SendEvent).

Several Sessions may be created in an image application from different components of the application. A new Session is created using the function itc_StartSession( ). An opaque handle (itc_SessionObj_t) to the itc_Session object is exported to the caller. All services from the ITC library requested by the caller must provide a valid itc_SessionObj handle. Sessions are named so that they can be browsed using the ITC HI package.

The itc_Session class also does validation of ITC event tokens and value types by referencing the itc_Event_Cat catalog.

3.5.2 Processing

This section describes the principal functions or pieces of ITC functionality that the itc_Session class is concerned with.

3.5.2.1 Creation and Initialization itc_Session objects are created by the application programmer using the public API function itc_CreateSession( ). This initializes the ITC framework (if it has not yet been initialized). It also installs itself in a static list of itc_Session objects for the application image for future validation.

3.5.2.2 Validation of Event Tokens

The itc_Session object validates (looks up the event token and its valuetype in the itc_Event_Cat) and registers an event token only—the first time it is encountered in an image—either at Session creation time, or when interest is expressed in an event token, or when the application transmits an event.

At creation time itc_Session initializes and creates the list of itc_SendEvent objects for ITC event types that the application optionally declares up-front to be transmitted from the Session. Each itc_SendEvent object corresponds to an ITC event type (or token). The itc_Session object validates these event tokens and their types, registers them and reports errors if tokens are invalid. Doing this upfront improves performance of event transmission, since the Session does not have to validate ITC pre-registered event tokens at event transmission time.

3.5.2.3 Creation and Maintenance of Other ITC Objects itc_Session objects serve as containers of the other ITC objects. It creates and maintains list of itc_ListenEvent objects, where each object corresponds to an ITC even token the application has expressed interest in via the Session. These are created using the member functions itc_Session::RegisterInterest( ) and itc_Session::RegisterNewListenEvent( ). When interest is revoked on an event token, the itc_ListenEvent object is removed from the Session using the functions itc_Session::RevokeInterest( ) and itc_Session::UnregisterListenEvent( ).

Similarly, the itc_Session object creates and maintains itc_SendEvent objects for each event transmitted from the Session.

3.5.2.4 Shutdown and Cleanup

An ITC Session is closed using the public API function itc_CloseSession( ). The itc_Session destructor cleans up all the itc_Listen/SendEvent objects, and removes itself from the list of Sessions in the application image. The static member function static itc_Session::Shutdown( ) closes all active ITC sessions in the image and shuts down the ITC framework.

3.6 itc_Event Class

3.6.1 Purpose

This is an abstract base class for the classes itc_ListenEvent and itc_SendEvent, which represent classes for listen and send events respectively.

It encapsulates data and methods common to both subclasses, such as the handle of the itc_Event dataitem, the active status (whether the event can be received or sent from the session) of the event, and code to locate (or create if necessary) an itc_Event DI in the database given its Code (or event token).

3.6.2 Processing

The principal functionality in the itc_Event class is the code to locate an itc_Event DI given the event type. It does so by querying for itc_Event dataitems with Code=Event-Type contained by the Project dataitem. If one is not found, it creates a new itc_Event DI with the given code.

Once an itc_Event DI has been established for a given event token, it is reused by other itc_Event objects in the same application image.

3.7 itc_SendEvent Class

3.7.1 Purpose

This is a subclass of class itc_Event. It encapsulates code and data required to transmit an ITC event.

There is one instance of itc_SendEvent created for every event token that is transmitted from the Session. This object is created the first time the event token is encountered for event transmission, and reused thereafter. itc_SendEvent objects are contained by the itc_Session object.

3.7.2 Processing

The principal functionality in the itc_SendEvent class is to transmit an ITC event. It does so by doing a PutAttribute of the Value attribute of the appropriate itc_Event DI with the event data that was supplied by the calling application.

3.8 itc_ListenEvent Class

3.8.1 Purpose

This is a subclass of class itc_Event. It encapsulates information about multiple interests that have been expressed on an ITC event token in a Session. This includes multiple interest objects (itc_ListenObj objects, discussed next) on the ITC event token, and their names.

There is one instance of itc_ListenEvent created for every ITC event token that the application has expressed interested in via the Session. This object is created the first time the event token is encountered for expressing interest, and reused thereafter. itc_ListenEvent objects are contained by the itc_Session object.

3.8.2 Processing

The principal functionality in the itc_ListenEvent class is to create and maintain interest objects every time interest is expressed on an ITC event token, and remove them when interest is revoked. This is done using the member functions itc_ListenEvent::RegisterInterest( ) and itc_ListenEvent::RevokeInterest( ).

Every time interest is expressed in an ITC event, the itc_ListenEvent object checks to see if the interest name already exists in the session. If not, it creates and caches a new itc_ListenObj object and returns the InterestId created by the ADI.

When interest is revoked in an interest instance, itc_ListenEvent deletes the corresponding itc_ListenObj object.

3.9 itc_ListenObj Class

3.9.1 Purpose

The itc_ListenObj class encapsulates all data associated with an instance of an interest on an ITC event token. Multiple interests (with different callbacks, userdata and reception filters) may be expressed on the same ITC event token in a Session. Each of these interests is represented by an instance of the itc_ListenObj class, which is created when interest is expressed on the token.

The itc_ListenObj class also has code to do the internal ADI express interest on the appropriate itc_Event dataitem. It also installs its own Attribute event callback handler which in turn calls the programmer event callback associated with the interest.

itc_ListenObj instances are contained by itc_ListenEvent instance that represents the event token on which interest has been expressed.

3.9.2 Processing

The principal functionality of the itc_ListenObj class are as follows:

1. Setting ADI express interest on the itc_Event dataitem. It uses the itc_Event DI located by the containing itc_ListenEvent object to set an AQI express interest on it and installs its own event handler. This event handler is notified by the ADI when attribute events happen on the itc_Event DI. The handler function extracts the value and valuetype of the Value attribute from the event data and in turn calls the programmer supplied ITC event handler (instance of itc_EventCallback_t) with these values.
2. Revoke ADI interest on the itc_Event DI when the programmer revokes interest on the ITC interest instance
3. Set up reception filters. If the programmer has supplied a list of ModuleTypes to solicit events from, then itc_ListenObj queries the database for all active Modules of those types in the same PM session. It also sets a AQI attribute event class express interest on type qModule_Run so that when new modules of those types are instantiated or activated or deactivated later from the PM, the list of active modules is updated. This is done by the utility function itc_GetActiveModules( ).
4. Invoke programmer callback and filter ADI events using reception filters. Reception filtering is done by checking to see if the originating module belongs in the list of allowed Modules or Module types, if any have been specified. If so, the value and type of the Value attribute of the itc_event DI is extracted from the apu_Event data structure and is used to invoke the programmer callback.

Process Description

In this chapter we discuss and illustrate principal ITC functionality in terms of the ITC entities.

4.1 Registration of Interest on Event Token

An itc_ListenObj object is created within an itc_ListenEvent object for every successful call to itc_RegisterInterest( ). If the event is inactive (for event reception) at the time itc_RegisterInterest( ) is called, the itc_ListenObj object is put in a list of pending objects and ADI express interest on the ITC DI is deferred till the event status becomes active again.

4.2 Revocation of Interest on Event Token

The itc_ListenObj object corresponding to the interest is deleted, and the interest is revoked on the ITC DI.

4.3 Transmission of Event

The ITC Session object looks up an itc_SendEvent object corresponding to the event token. If one has not been created (i.e. the event was not previously registered with the Session for transmission. and is being transmitted for the first time), the Session object creates one and caches it.

4.4 Reception of ITC Events

This happens when an Event on the Value attribute of the ITC DI is received by itc_ListenObj object. The itc_ListenObj::HandleInterestCB method checks to see if the event filters (if any) match, and if so, call the application's callback with the value and valuetype of the Value attribute received as part of the event data.

4.5 Inactivation of Reception on Event

This happens when the end user marks an event type inactive for reception. This is different from a call to itc_RevokeInterest( ) by the application programmer. In this case, all the itc_ListenObj objects contained by the corresponding itc_ListenEvent object are inactivated by revoking the ADI interest on the ITC DI for the event. This prevents reception of any further ADI events on those ITC DIs in that Session. The inactive itc_ListenObj objects are held in a pending list, so that they may be activated in the future again.

4.6 Activation of Reception on Event

This happens when the end user marks an (inactive) event type active again for reception. In this case, all the pending itc_ListenObj objects in itc_ListenEvent::PendingListenObjs are activated again. The itc_ListenObj::Activate( ) function calls aqi_ExtendInterest( ) on the ITC event DIs using the old InterestId if interest had been revoked before.

ITC Human Interface

Introduction

This document describes the human interface part of the ITC Framework. By human interface we mean what the user will see and will manipulate in order to perform various inter applications communications. The purpose of the ITC HI is:

- to detail the specific ITC features that we want the user to be responsible for controlling
- to standardize the users view of ITC through all the applications
- to provide a shared library which the bundled HI ITC features The idea of the ITC HI package is to keep the inter-application communication as simple and as transparent as possible. The goal is to give to the user the feeling that the different pieces of the system and the different applications are all configured to help him to do his/her interpretation more easily. We want to try to make the user forget that different applications belong to different worlds. We are looking for a direct, easy to manipulate and intuitive communication interface.

Here are the steps we have followed to arrive at this model:
Use real world user scenarios to derive requirements.
Think simple and practical rather than overwhelm the user with functionalities.
Evaluate the proposed architecture in front of awkward situations. For example, in the middle of a difficult interpretation, a user selects a well in CrossView and expects to see it in Interactive Map. It doesn't happen! How hard is it for the user to figure it out? to understand what's going on? to solve the problem?

In this section when we talk about events or messages, we are talking about user events or user messages. The distinction between them is the following:

| System events | Carry information which may change the state of the database. For example, a DataItem deletion must generate or be seen as a system event. These events should be handled by applications. For the sake of database integrity, their management doesn't go up to the user level. |
| User events | Carry information which change or modify a display or a graphic representation. For example, a well selection may generate or be seen as a user event. The type, the number, the characteristics of these events can vary from one application to an other. Application developers decide what events their application will send and receive and how the application will react after reception of one or several of them. |

Concepts

Every application using the ITC HI package could be in two distinct states: open or closed.

| Open state | The application receives user events coming from other ITC events generators and reacts accordingly. The application also sends its events through the system. As a result, two applications both with an 'open state' will communicate. Assuming that they have a non empty intersection of their own user event list. |
| Closed state | The application is isolated from the outside world. It sends and receives nothing. |

With only this simple model most of the user scenarios can be resolved. But to make this model more powerful and also to address performance issues we introduce two other functionalities:

The ability to apply a filter on the send or receive lists of events. At any time the user can decide to stop listening to some events from this application and to stop sending some other events.

Broadcast: This functionality allows the user to send the current state (this term is described in details later) of an application. For example, if a user decide to experiment some ideas in an application A but doesn't want to propagate them to application B, he will turn his application A to a closed state. After a while, he decides to propagate these experiments to the application B. The broadcast functionality will allow him to send the complete state of application A with one action.

The major points that we address with this model are:

| Feedback | At any time the user can get the communication state (on or off) of every application. |
| Security | If a special mode of a currently open application needs a long user interaction (e.g. creation of segments in CrossView) the system should provide the developer with API functions to close (or lock) the application. |
| Knowledge | At any time the user should be able to get the list of user events understood by every application. |
| Light Human Interface | The layout of ITC interactors must stay very small. Eventually every single application and even some simple dialog boxes will have some ITC capabilities in GeoFrame. As a result, the ITC user interface should not 'eat' a lot of real estate. |

ITC Banner

The control and the feedback of the ITC HI are located in an ITC banner. Every application that wants to use HI compliant ITC mechanisms has to include this banner in its general layout. The code for the HI of this banner and the management of it will be produced as part as the ITC package.

State Icon

Shows the user what is the current state of this application regarding communications. This icon has three states: open, closed and locked.

| Open state | The application receives user events coming from other ITC event generators and reacts accordingly. The application also sends their events through the system. As a result, two applications both with an 'open state' will communicate. Assuming that they have a non empty intersection of their own user event list. A click on an open icon turns it to closed. |
| Closed state | The application is isolated from all ITC participants. It sends and receives nothing. A click on a closed icon turns it to open. |
| Locked state | This state is only set programmatically. It turns the application to a closed state and insensitizes the icon. |

Broadcast Icon

A click on this icon will send the current state of the application through the system. By current state we mean the current status of the information that generates user events. The transmission of the events associated to this current state passes through the current filter setup (see below) and is dependant of the state icon (e.g: a broadcast when the door is closed or when every Send toggles are off is a noop).

For example, a click on the broadcast icon of the Interactive Map application could generate the following events: Wells A, B, C selected, Boreholes s, d, e selected and fault markers off.

There is no general definition of what we call the current state. As far the API is concerned (see API section of this document) the application will provide a callback to fire when the user will click on the broadcast icon. It is the responsibility of the application developer to:

Have a definition of current state in their context, in terms of ITC tokens, close enough to the above general one.

To give a strong feedback to the user about this current state and about what will happen after a click on the broadcast icon. For example, if from a Map representation a broadcast action sends the currently selected wells and boreholes, then the graphical representation of those must be very different than the unselected ones (different color, different symbol, and so forth).

Filter Icon

A click on this icon will pop up the standard Filter dialog box. The list of events displayed in this dialog is set by the application developer. All event instances must be unique. From that list the ITC HI package translates user inputs in proper filtering actions at the ITC core level. The user controls whether he/she wants to send or receive the events by turning on or off the different toggles and the current ITC Session is configured accordingly. The toggle All allows the user to set to on (or off) all the toggles in a column:

ITC HI API

The ITC core package is set up to allow you to create and manage multiple independent ITC connections from different parts of the same application. A high level layer of this ITC package provides you with functionalities to set the ITC human interface.

You can create several sessions in a single application. Each ITC session could have its own ITC HI setup for displaying the events and letting the user toggles states independently from the other sessions.

ITC HI API Data Structures

The following sections describes the ITC HI API data structures.

Some of the following structures use ITC API structures (itc_EventCallback_t, itc_SessionObj_t, itc_Status_t).

itc_hi_Toggle_State_t

This is an integer that is used to store the state of a given toggle in the Filter dialog box. Values for this state are:

| | |
|---|---|
| ITC_ON | The state of the toggle is on. |
| ITC_OFF | The state of the toggle is off. |
| ITC_NONE | No toggle. | itc_hi_State_t

This is an integer that is used to store the current communication state of the application. This value is directly linked with the shape of the state icon:

| | |
|---|---|
| ITC_OPEN | Correspond to the open state |
| ITC_CLOSED | Correspond to the closed state |
| ITC_LOCKED | Correspond to the locked state |
| ITC_NOTVALID | Error case | itc_hi_EventInfo_t

This is the prototype of the structure which contains the description of an event dealing with the ITC HI package. A list of itc_hi_EventInfo_t instances is needed for using the function itc_hi_FilterAndSession.

itc_hi_FilterInfo_t

This is the prototype of the structure which contains the description of the ITC event Filter information. A list of itc_hi_FilterInfo_t instances is needed for using the function itc_hi_Filter.

itc_hi_t

This is an opaque handle to an ITC banner. It is created when a new ITC banner is opened (using itc_hi_FilterAndSession( ), or itc_hi_Filter( )), and is used in subsequent ITC operations in the scope of this ITC HI session. It must NOT be freed by the application. A banner is destroyed (and internally freed) using itc_hi_Delete( ).

itc_hi_Widgets_t

This is the prototype of the structure which contains the subset of Widgets used for the Banner layout and the Filter dialog box which are accessible. This handle must NOT be freed or be changed by the application. It is destroyed (and internally freed) using itc_hi_Delete( ).

ITC HI API Function Prototypes

The sections that follow describe the ITC human interface function prototypes.

itc_hi_FilterAndSession

This function creates the ITC banner and the associated Filter dialog box. The ITC banner is composed with a state icon, a broadcast icon and a filter icon.

The state icon could be in three different states: open, closed, locked (set programmatically)

A click on the broadcast icon activates the given Broadcast Callback. If this Callback is NULL there is no Broadcast icon.

A click on the filter icon will pop up the Filter dialog box.

This function starts an ITC Session and according the event state passed as arguments, registers the appropriate ITC interest.

itc_hi_Filter

This function creates an ITC banner and the associated Filter dialog box to control a set of ITC events already registered in a given ITC Session.

itc_hi_Delete

This function destroys an ITC banner, cleans up all the data structures and memory allocated for that ITC HI session, and also revokes all interests on all event types for that session.

itc_hi_TransmitEvent

This function transmits an ITC event. The type of the event to sent is retrieved with the Event HI Name. For a given event, the HI Name should be the one defined in itc_hi_EventInfo_t or itc_hi_FiterInfo_t structures. This mechanism allows the developer to register several times the same ITC Event Token with different HI names.

itc_hi_GetWidgets

This function returns a handle of the structure which contains the accessible Widgets used for the Banner layout and Filter dialog box.

itc_hi_GetSession

This function returns an handle to the ITC Session which maintains information about events that are manage by the ITC Banner obtained from itc_hi_FilterAndSession( ) or itc_hi_Filter( ).

itc_hi_GetState

This function returns the current state of the ITC HI.

itc_hi_LockBanner

This function closes programmatically the application. The 'locked' icon is displayed and the application doesn't receive nor send any events.

itc_hi_UnlockBanner

This function unlocks programmatically the application. The icon retrieves the shape that it had before the 'lock' call and the application retrieves also its previous communication state.

itc_hi_SwitchState

This function switches the Banner State from open to closed (and vice versa).

itc_hi_Broadcast

A call to this function will perform the same action than a click on the ITC banner's broadcast icon.

itc_hi_PopupFilter

This callback pops up the Filter dialog box.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. Apparatus including at least one processor for intercommunicating between a first client application and a second client application, comprising:
   (a) setup means including predefinition storage means for selectively predefining and storing one or more events, one or more interest objects corresponding respectively to the one or more events, and one or more functions corresponding respectively to the one or more events, the one or more events including a particular event;
   (b) input means for receiving an input from an operator corresponding to the practice of the particular event by the operator in the first client application and for presenting one or more functions to the operator in response to receipt of a second event; and
   (c) transmission and reception means for:
      (1) receiving an interest object corresponding to the particular event transmitted from the second client application via a server to be stored in the predefinition storage means;
      (2) transmitting a set of information associated with the particular event stored in the predefinition storage means directly to the second client application without going through the server when the particular event is practiced by the first client application in response to the input provided by the operator via the input means;
      (3) receiving a second particular event from the second client application; and
      (4) transmitting a second interest object corresponding to the second particular event to the server, the server retransmitting the interest object to the second client application, the second client application transmitting information concerning the second particular event directly to the first client application without going through the server when a user practices the second particular event on the second client application.

2. The apparatus of claim 1, wherein:
   the setup means including filter and session means, the filter and session means comparing the interest object received by the transmission and reception means with the one or more interest objects stored in the predefinition storage means and identifying the particular event when the received interest object corresponds to one of the one or more interest objects stored in the predefinition storage means,
   the transmission and reception means transmitting information concerning the particular event stored in the predefinition storage means directly to the second client application without going through the server when the particular event is identified by the filter and session means and the particular event is practiced by the first client application in response to the input provided by the operator via the input means.

3. Client application apparatus, comprising:
   storage means for storing a plurality of events, a plurality of functions associated, respectively, with the plurality of events, and a plurality of interest objects associated, respectively, with the plurality of events;
   transmission and reception means for:
      transmitting a first set of one or more of the plurality of interest objects to other client applications via a server;
      receiving a second set of one or more of the plurality of interest objects from the other client applications via the server;
      transmitting one or more of the plurality of events corresponding to the second set of interest objects directly to the other client applications, without going through a server, when a user of a client application practices one or more of the plurality of events; and
      receiving one or more of the plurality of events, corresponding to the first set of interest objects, sent directly from the other client applications when an operator of one or more of the other client applications practices one or more of the plurality of events;
   a workstation based system including a display screen; and
   input means for making a events-to-be-transmitted selection for which of the plurality of events stored in the storage means will be transmitted to the other client applications and for making a events-to-be-received selection for which of the plurality of events stored in the storage means will be received from the other client applications and generating a signal in response thereto representative of the events-to-be-transmitted selection and of the events-to-be-received selection; and
   the input means comprising a visual display on the display screen, the visual display including an open state status icon means for generating an open state status signal when the open state status icon means is clicked on by an operator, the open state status signal indicating that all of the plurality of events stored in the storage means can be transmitted by said transmission and reception means to the other client applications or can be received in the transmission and reception means from said other client applications when the open state status icon means is clicked on by the operator; and wherein the transmission and reception means is responsive to the signal from the input means to transmit the events-to-be-transmitted selection of events and to receive the events-to-be-received selection of events.

4. The client application apparatus of claim 3, wherein the client application apparatus comprises a workstation based system including a display screen and wherein the input means comprises:

a visual display on the display screen, the visual display including a closed state status icon means for generating a closed state status signal when the closed state status icon means is clicked on by an operator, the closed state status signal indicating that none of the plurality of events stored in the storage means can be transmitted by said transmission and reception means to the other client applications or can be received in the transmission and reception means from said other client applications when the closed state status icon means is clicked on by the operator.

5. The client application apparatus of claim 3, wherein the client application apparatus comprises a workstation based system including a display screen and wherein the input means comprises:

a visual display on the display screen, the visual display including an event filter icon means for generating a subwindow on the display screen when the event filter icon means is clicked on by an operator, the subwindow including the plurality of events, the subwindow adapted to receive an input from the operator, the subwindow generating signals in response to the input from the operator indicating the events-to-be-transmitted selection and the events-to-be-received selection.

6. A workstation based system comprising:

a display screen for displaying one or more windows;

a plurality of client applications for presenting the one or more windows on the display screen for viewing by an operator, each of the client applications including:

icon generating means for generating an icon in the window on the display screen of each client application, the icon being operative responsive to a signal generated in response to input from the operator;

storage means for storing a plurality of events and a corresponding plurality of functions and a corresponding plurality of interest objects;

transmission and reception means for receiving one or more of the interest objects from one or more of the other client applications via a server;

comparison means responsive to the input signal from the icon for comparing the one or more interest objects received in the transmission and receptions means with the plurality of interest objects stored in the storage means and identifying one or more events stored in the storage means when the one or more interest objects received in the transmission and reception means corresponds to one or more of the plurality of interest objects storage in the storage means;

the comparison means selecting at least one of the one or more events stored in the storage means, identified by the comparison means, in response to the input signal from the icon;

framework means responsive to the selection of at least one of the one or more events by the comparison means for transmitting the at least one of the one or more events from the client application directly to the other client applications, without going through the server; and the transmission and reception means further for:

transmitting a second interest object of the one or more interest objects corresponding to a second event of the one or more events to the one of the other client applications via the server; and receiving the second event of the one or more events directly from the one of the other client applications without going through the server when the second event of the one or more events is practiced by the one of the other client applications in response to input provided by the other operator.

7. The workstation based system of 6, wherein the icon generating means generates an open state status icon, the comparison means selecting all of the one or more events stored in the storage means, the framework means transmitting all of the one or more events to the other client applications.

8. The workstation based system of 6, wherein the icon generating means generates a closed state status icon, the comparison means selecting none of the one or more events stored in the storage means, the framework means transmitting none of the one or more events to the other client applications.

9. The workstation based system of 6, wherein the icon generating means generates an event filter icon, the comparison means selecting either some or all of the one or more events stored in the storage means, the framework means transmitting the selected events to the other client applications.

* * * * *